(12) United States Patent
Hayashi et al.

(10) Patent No.: US 10,708,764 B2
(45) Date of Patent: Jul. 7, 2020

(54) TERMINAL APPARATUS AND BASE STATION APPARATUS

(71) Applicant: SHARP KABUSHIKI KAISHA, Sakai, Osaka (JP)

(72) Inventors: Takashi Hayashi, Sakai (JP); Shoichi Suzuki, Sakai (JP); Tatsushi Aiba, Sakai (JP); Wataru Ouchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/082,693

(22) PCT Filed: Feb. 24, 2017

(86) PCT No.: PCT/JP2017/007075
§ 371 (c)(1),
(2) Date: Sep. 6, 2018

(87) PCT Pub. No.: WO2017/154618
PCT Pub. Date: Sep. 14, 2017

(65) Prior Publication Data
US 2019/0090126 A1    Mar. 21, 2019

(30) Foreign Application Priority Data

Mar. 10, 2016  (JP) ................................. 2016-046646
Apr. 14, 2016  (JP) ................................. 2016-080869

(51) Int. Cl.
*H04W 8/24*   (2009.01)
*H04W 16/14*  (2009.01)
(Continued)

(52) U.S. Cl.
CPC ............. *H04W 8/24* (2013.01); *H04W 16/14* (2013.01); *H04W 72/04* (2013.01);
(Continued)

(58) Field of Classification Search
None
See application file for complete search history.

(56) References Cited

U.S. PATENT DOCUMENTS

2015/0365152 A1* 12/2015 Frenne ................. H04B 7/0626
370/252
2016/0366618 A1  12/2016 Quan et al.

FOREIGN PATENT DOCUMENTS

WO    2015/127592 A1    9/2015

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP TS 36.213 V12.4.0 (Dec. 2014).
(Continued)

*Primary Examiner* — Chi H Pham
*Assistant Examiner* — Raul Rivas
(74) *Attorney, Agent, or Firm* — ScienBiziP, P.C.

(57) ABSTRACT

The present invention relates to a terminal apparatus and a base station apparatus that enable efficient communication. To perform efficient uplink transmission by using a non-allocated frequency band or a shared frequency band. A terminal apparatus includes a reception unit configured to receive a message of terminal capability enquiry and a transmission unit that transmits terminal capability information in a case that the message has been received. In a case that the terminal capability information includes first information indicating that uplink LAA is supported, the transmission unit transmits a first PUSCH of a first resource allocation type or a second resource allocation type in a cell that is other than an LAA secondary cell, whereas in the LAA secondary cell, transmits a second PUSCH of a third resource allocation type.

6 Claims, 17 Drawing Sheets

(51) Int. Cl.
H04W 74/02 (2009.01)
H04W 72/04 (2009.01)
H04W 72/12 (2009.01)
H04W 72/14 (2009.01)

(52) U.S. Cl.
CPC ... *H04W 72/0446* (2013.01); *H04W 72/1284* (2013.01); *H04W 72/1289* (2013.01); *H04W 72/14* (2013.01); *H04W 74/02* (2013.01)

(56) References Cited

OTHER PUBLICATIONS

"3rd Generation Partnership Project; Technical Specification Group Radio Access Network; Study on Licensed-Assisted Access to Unlicensed Spectrum; (Release 13)", 3GPP TR 36.889 V1.0.1 (Jun. 2015).

Ericsson, "Leftover UE capabilities for LAA", [online], 3GPP TSG-RAN WG2#93 R2-161552, Internet<URL:http://www.3gpp.org/ftp/tsg_ran/WG2_RL2/TSGR2_93/Docs/R2-161552.zip>, Feb. 15, 2016.

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.19.0(Dec. 2015), Dec. 2015, p. 96.

Interdigital Communications, "On UL data transmission for eLAA", [online], 3GPPTSG-RAN WG1#84 R1-161079, Internet<URL:http://www.3gpp.org/ftp/tsg_ran/WG1_RL1/TSGR1_84/Docs/R1-161079.zip>, Feb. 15, 2016.

NTT Docomo, Inc., "Discussion on UL scheduling design for eLAA", [online], 3GPP TSG-RAN WG1#84 R1-160947, Internet<URL:http://www.3gpp.org/ftp/tsg_ran/WG1_RL1/TSGR1_84/Docs/R1-160947.zip>, Feb. 15, 2016.

Motorola, "DCI formats for uplink non-contiguous RB allocations", [online], 3GPPTSG-RAN WG1#60 R1-101109, Internet<URL:http://www.3gpp.org/ftp/tsg_ran/WG1_RL1/TSGR1_60/Docs/R1-101109.zip>, Feb. 22, 2010.

LG Electronics, "PUSCH transmission in LAA", R1-160625, 3GPP TSG RAN WG1 meeting #84, Feb. 15-19, 2016.

* cited by examiner

OCCASION WHEN CCA FOR DOWNLINK TRANSMISSION IS PERFORMED

OCCASION WHEN FIRST CCA FOR UPLINK TRANSMISSION IS PERFORMED

OCCASION WHEN SECOND CCA FOR UPLINK TRANSMISSION IS PERFORMED

OCCASION WHEN CCA FOR UPLINK TRANSMISSION IS PERFORMED

START TIMING FOR FIRST UPLINK LBT

OCCASION WHEN CCA FOR UPLINK TRANSMISSION IS PERFORMED

START TIMING FOR FIRST UPLINK LBT

TERMINAL APPARATUS AND BASE STATION APPARATUS

TECHNICAL FIELD

Embodiments of the present invention relate to a terminal apparatus and a base station apparatus that enable efficient communication.

This application claims priority based on JP 2016-046646 filed on Mar. 10, 2016 and JP 2016-080869 filed on Apr. 14, 2016, the contents of which are incorporated herein by reference.

BACKGROUND ART

The 3rd Generation Partnership Project (3GPP), which is a standardization project, standardized the Evolved Universal Terrestrial Radio Access (hereinafter, referred to as E-UTRA), in which high-speed communication is realized by adopting an Orthogonal Frequency-Division Multiplexing (OFDM) communication scheme and flexible scheduling using a unit of prescribed frequency and time called resource block.

Moreover, the 3GPP discusses Advanced E-UTRA, which realizes higher-speed data transmission and has upper compatibility with E-UTRA. E-UTRA relates to a communication system based on a network in which base station apparatuses have substantially the same cell configuration (cell size); however, regarding Advanced E-UTRA, discussion is made on a communication system based on a network (different-type radio network, Heterogeneous Network) in which base station apparatuses (cells) having different configurations coexist in the same area. In this regard, E-UTRA is also referred to as "LTE (Long Term Evolution)", and Advanced E-UTRA is also referred to as "LTE-Advanced". Furthermore, LTE may be a collective name including LTE-Advanced.

A Carrier Aggregation (CA) technique and a Dual Connectivity (DC) technique are specified, in which, in a communication system where cells (macro cells) having large cell radii and cells (small cells) having smaller cell radii than those of the macro cells coexist as in a heterogeneous network, a terminal apparatus performs communication by connecting to a macro cell and a small cell simultaneously (NPL 1).

Meanwhile, NPL 2 studies Licensed-Assisted Access (LAA). According to LAA, a non-allocated frequency band (Unlicensed spectrum) used by a wireless Local Area Network (LAN) is used as LTE. More specifically, the non-allocated frequency band is configured as a secondary cell (secondary component carrier). Connection, communication, and/or a configuration of the secondary cell(s) used as LAA are assisted by a primary cell (primary component carrier) configured to an allocated frequency band (Licensed spectrum). LAA widens a frequency band that is available for LTE, and thus wide band transmission is enabled. In this regard, LAA is used in a shared frequency band (shared spectrum) shared between prescribed operators.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 12), 3GPP TS 36.213 V 12.4.0 (2014-12).

NPL 2: 3rd Generation Partnership Project; Technical Specification Group Radio Access Network; Study on Licensed-Assisted Access to Unlicensed Spectrum; (Release 13), 3GPP TR 36.889 V1.0.1 (2015-6).

SUMMARY OF INVENTION

Technical Problem

According to LAA, in a case that a non-allocated frequency band or a shared frequency band is used, the frequency band is shared between other systems and/or other operators. However, LTE is not designed on the premise that a non-allocated frequency band or a shared frequency band is used for uplink transmission. Therefore, a non-allocated frequency band or a shared frequency band cannot be used for uplink transmission.

The present invention provides a terminal apparatus and a base station apparatus that enable efficient control of a cell using a non-allocated frequency band or a shared frequency band.

Solution to Problem (1) To accomplish the object described above, the present invention is contrived to provide the following means. Specifically, a terminal apparatus according to an aspect of the present invention includes: a reception unit configured to receive a message of terminal capability enquiry; and a transmission unit configured to transmit terminal capability information in a case that the message has been received, and in a case that the terminal capability information includes first information indicating that uplink Licensed Assisted Access (LAA) is supported, the transmission unit transmits, in a cell that is other than an LAA secondary cell, a first Physical Uplink Shared Channel (PUSCH) of a first resource allocation type or a second resource allocation type, and in the LAA secondary cell, transmits a second PUSCH of a third resource allocation type.

(2) A terminal apparatus according to another aspect of the present invention is such that, in the terminal apparatus described above, a first DCI format used for scheduling the first PUSCH includes a resource allocation type field indicating a resource allocation type of the PUSCH, a second DCI format used for scheduling the second PUSCH does not include the resource allocation type field, and resource allocation information for the third resource allocation type indicates a resource block set.

(3) A base station apparatus according an aspect of the present invention includes: a transmission unit configured to transmit a message of terminal capability enquiry; and a reception unit configured to receive terminal capability information in a case that the message has been transmitted, and in a case that the terminal capability information includes first information indicating that uplink Licensed Assisted Access (LAA) is supported, the base station apparatus transmits, for a cell that is other than an LAA secondary cell, a first Downlink Control Channel (DCI) format used for scheduling a first Physical Uplink Shared Channel (PUSCH) of a first resource allocation type or a second resource allocation type, and for the LAA secondary cell, transmits a second DCI format used for scheduling a second PUSCH of a third resource allocation type.

(4) A base station apparatus according to another aspect of the present invention is such that, in the base station apparatus described above, the transmission unit includes, in the first DCI format used for scheduling the first PUSCH, a resource allocation type field indicating a resource allocation type of the PUSCH, and transmits the first DCI format, and transmits the second DCI format used for scheduling the second PUSCH without including the resource allocation type field in the second DCI format, and resource allocation information for the third resource allocation type indicates a resource block set.

Advantageous Effects of Invention

The present invention can provide improved transmission efficiency in a radio communication system in which a base station apparatus and a terminal apparatus communicate.

DESCRIPTION OF EMBODIMENTS

First Embodiment

A first embodiment of the present invention will be described below. A description will be given by using a communication system (cellular system) in which a base station apparatus (base station, NodeB, or eNodeB (cNB)) and a terminal apparatus (terminal, mobile station, a user device, or User equipment (UE)) communicate in a cell.

A physical channel and a physical signal substantially used in EUTRA and Advanced EUTRA will be described. The "channel" refers to a medium used to transmit a signal, and the "physical channel" refers to a physical medium used to transmit a signal. In the present embodiment, the physical channel may be used synonymously with "signal." In the future EUTRA and Advanced EUTRA, the physical channel may be added or its constitution and format type may be changed or added; however, the description of the present embodiment will not be affected even in a case where the channel is changed or added.

In EUTRA and Advanced EUTRA, scheduling of a physical channel or a physical signal is managed by using a radio frame. One radio frame is 10 ms in length, and one radio frame is constituted of 10 subframes. In addition, one subframe is constituted of two slots (i.e., one subframe is 1 ms in length, and one slot is 0.5 ms in length). Moreover, scheduling is managed by using a resource block as a minimum unit of scheduling for allocating a physical channel. The "resource block" is defined by a given frequency domain constituted of a set of multiple subcarriers (e.g., 12 subcarriers) on a frequency axis and a domain constituted of a specific transmission time slot (one slot).

In the EUTRA and Advanced EUTRA, a frame structure type is defined. Frame structure type 1 is applicable to Frequency Division Duplex (FDD). Frame structure type 2 is applicable to Time Division Duplex (TDD).

Figure 1:
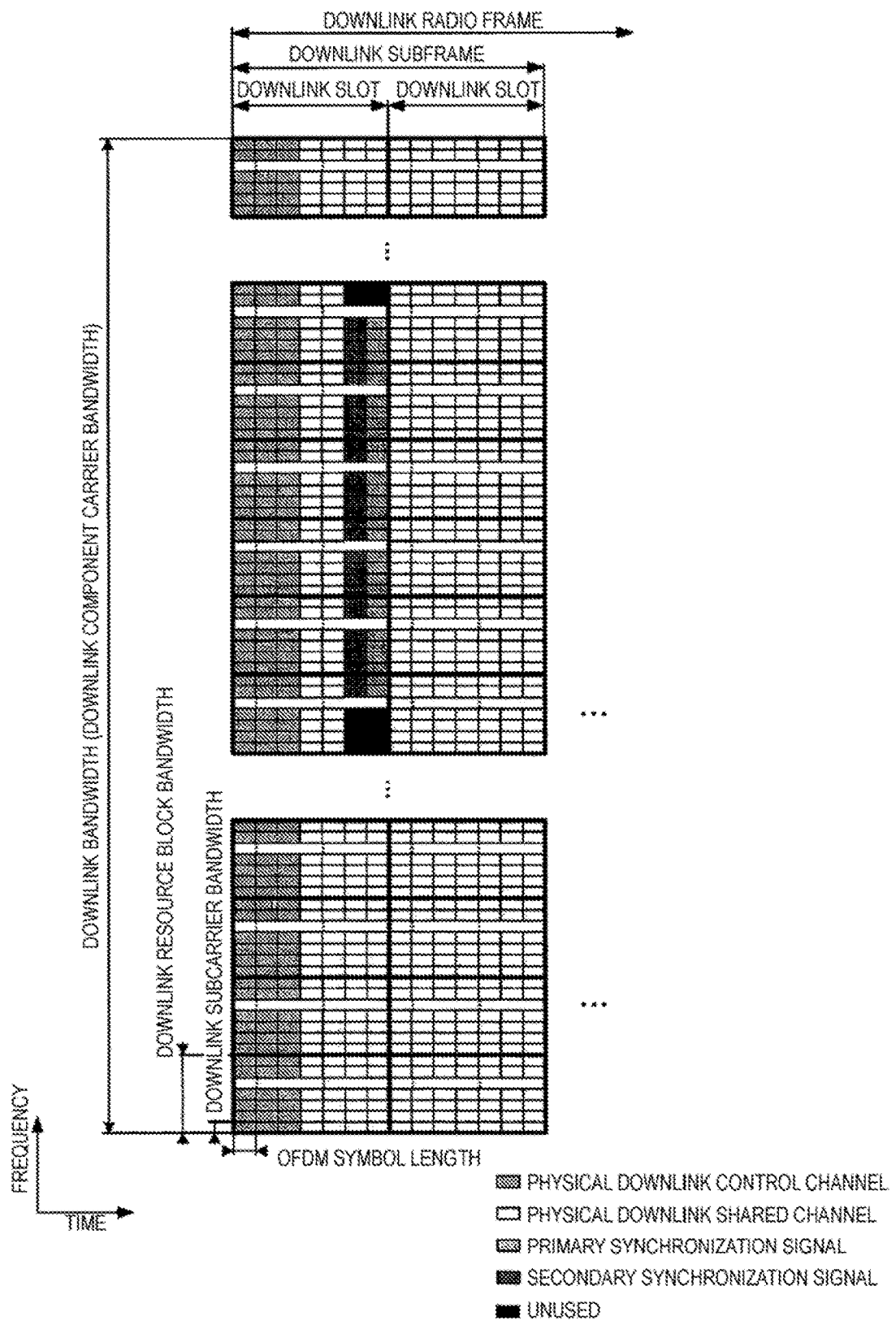
FIG. 1 is a diagram illustrating an example of a downlink radio frame configuration according to a present embodiment.

FIG. 1 is a diagram illustrating an example of a downlink radio frame configuration according to the present embodiment. In the downlink, an OFDM access scheme is used. Transmission of a downlink signal and/or on a downlink physical channel in the downlink is referred to as a downlink transmission. In the downlink, a PDCCH, an EPDCCH, a Physical Downlink Shared CHannel (PDSCH), and the like are allocated. A downlink radio frame is constituted by a downlink Resource Block (RB) pair. This downlink RB pair is a unit for allocation of a downlink radio resource and the like and is based on the frequency band of a predefined width (RB bandwidth) and a time duration (two slots=1 subframe). Each of the downlink RB pairs is constituted of two downlink RBs (RB bandwidth×slot) that are contiguous in time domain. Each of the downlink RBs is constituted of 12 subcarriers in frequency domain. Further, in the time domain, one slot is constituted of seven OFDM symbols in a case that a normal cyclic prefix (CP) is added, while one slot is constituted of six OFDM symbols in a case that a cyclic prefix that is longer than the normal cyclic prefix is added. A region defined by a single subcarrier in the frequency domain and a single OFDM symbol in the time domain is referred to as "Resource Element (RE)". A physical downlink control channel is a physical channel on which downlink control information such as a terminal apparatus identifier, physical downlink shared channel scheduling information, physical uplink shared channel scheduling information, and a modulation scheme, coding rate, and retransmission parameter are transmitted. Note that although a downlink subframe in a single Component Carrier (CC) is described here, a downlink subframe is defined for each CC and downlink subframes are approximately synchronized between the CCs.

In the downlink, synchronization signals are assigned. The synchronization signals are used to adjust timings for downlink signals and/or channels mainly between a base station apparatus transmitting downlink signals and/or channels and a terminal apparatus receiving downlink signals and/or channels. Specifically, at the terminal apparatus, a synchronization signal is used to adjust timings of receiving radio frames or subframes, or OFDM symbols. At the terminal apparatus, a synchronization signal is also used to detect a center frequency of a component carrier. At the terminal apparatus, a synchronization signal is also used to detect the CP length of an OFDM symbol. At the terminal apparatus, a synchronization signal is also used to identify the cell (base station apparatus) from which the synchronization signal has been transmitted. In other words, at the terminal apparatus, a synchronization signal is used to detect a cell identity of the cell from which the synchronization signal has been transmitted. Note that, at the terminal apparatus, a synchronization signal may be used to perform Automatic Gain Control (AGC). Note that, at the terminal apparatus, a synchronization signal may be used to adjust a timing of processing symbol to be used for Fast Fourier Transform (FFT). Note that, at the terminal apparatus, a synchronization signal may be used to calculate Reference Signal Received Power (RSRP). Note that a synchronization signal may be used to secure a channel on which the synchronization signal is to be transmitted.

A primary synchronization signal (first primary synchronization signal) and a secondary synchronization signal (first secondary synchronization signal) are transmitted on the downlink to promote cell searches. Cell search is a procedure performed by the terminal apparatus to acquire time and frequency synchronization with the cell to detect a physical layer cell ID of the cell. E-UTRA cell search supports a flexible and general transmission bandwidth corresponding to six or more resource blocks.

Figure 9:
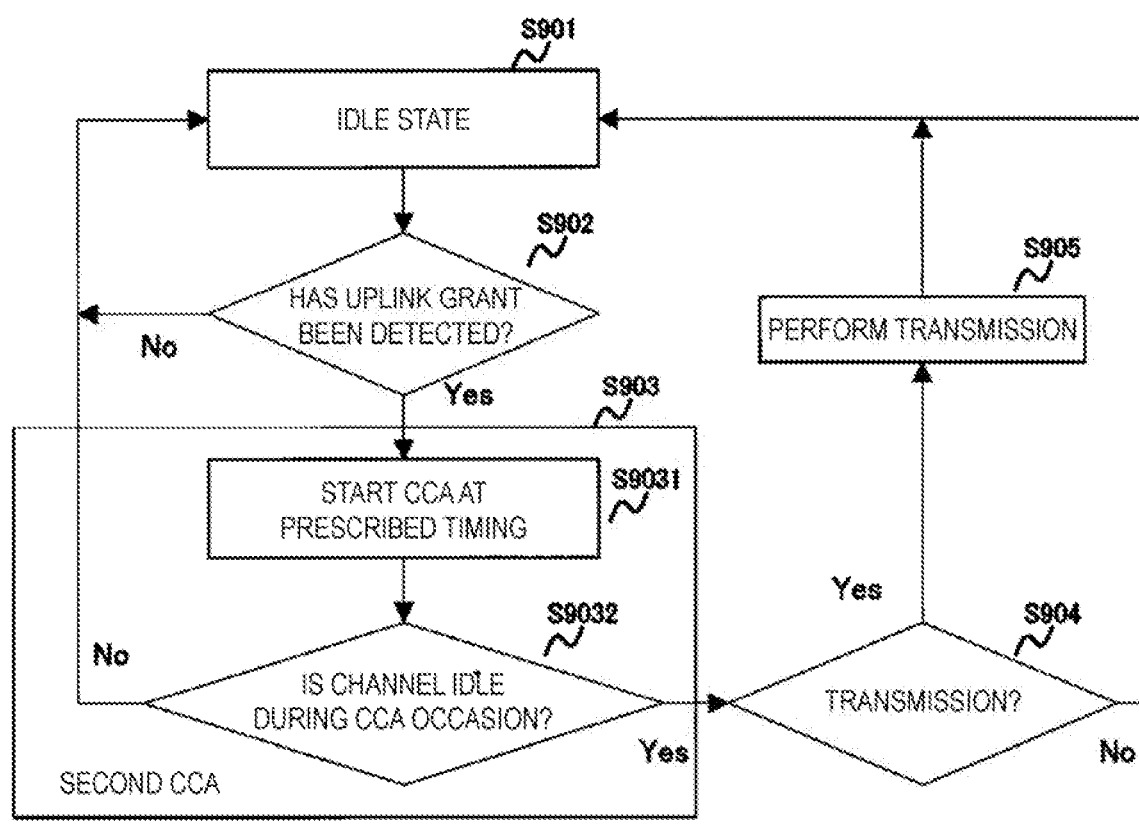
FIG. 9 is a diagram illustrating an example of a procedure of CCA for an uplink transmission according to the present embodiment.

A specific example of assignment (arrangement, mapping) of the primary synchronization signal and the secondary synchronization signal will be described. FIG. 9 illustrates mathematical expressions for determining a subcarrier and an OFDM symbol on which a synchronization signal is assigned. When k and l are defined as indices specifying resource elements in the frequency domain and the time domain, respectively, the primary synchronization signal and the secondary synchronization signal are defined by the mathematical expressions (0-a), (1-a) and (2) in FIG. 9. Here, $N_{RB}^{DL}$ denotes the number of resource blocks specified based on configuration information about the downlink bandwidth, $N_{sc}^{RB}$ denotes a frequency domain resource block size corresponding to the number of subcarriers per resource block, and $N_{symb}^{DL}$ denotes the number of OFDM symbols per downlink slot. Here, $a_{k,l}$ denotes a symbol in a resource element (k, l), d denotes a sequence, and n takes a value from 0 to $2N_M-1$. Moreover, mod denotes a function representing a remainder, and A mod B denotes a remainder in a case that A is divided by B. Here, for the primary synchronization signal and the secondary synchronization signal, $N_M$ is 31. Here, for the primary synchronization signal and the secondary synchronization signal, h is 1.

The Primary Synchronization Signal (PSS) and the Secondary Synchronization Signal (SSS) illustrated in FIG. 1 are transmitted using 62 subcarriers (62 resource elements) around a center frequency regardless of the downlink bandwidth (a system bandwidth of the downlink, a downlink transmission bandwidth). A direct-current subcarrier (DC subcarrier) corresponding to the center of the subcarriers within the system bandwidth is not used as the primary synchronization signal or the secondary synchronization signal. Five subcarriers (five resource elements) at each of opposite ends of each of the primary synchronization signal and the secondary synchronization signal are reserved and not used for transmission of the primary synchronization signal or the secondary synchronization signal. The resource elements including the five resource elements at each end in addition to the above-described 62 resource elements are referred to as the primary synchronization signal and the secondary synchronization signal.

The primary synchronization signal is generated based on a Zadoff-Chu sequence (ZC sequence) in the frequency domain. Here, Nzc denotes a sequence length of the Zadoff-Chu sequence, and u denotes a root index (Zadoff-Chu root sequence index). The primary synchronization signal is generated based on three types of root indices. Each of the root indices is associated with three specific identifiers derived from the cell identity (cell ID, physical-layer cell identity). In frame structure type 1, the primary synchronization signal is assigned to the last OFDM symbols of slot 0 (i.e., the first slot of subframe 0) and slot 10 (i.e., the first slot of subframe 5). In frame structure type 2, the primary synchronization signal is assigned to the third OFDM symbols of the first slots of subframes 1 and 6.

The secondary synchronization signal is defined by a combination of two sequences each having a length of 31. A sequence used for the secondary synchronization signal is obtained by interleaving and combining the two sequences each having a length of 31. The sequence resulting from the combining is scrambled with a scramble sequence provided by the primary synchronization signal. The sequence having a length of 31 is generated based on an M sequence. The sequence having a length of 31 is generated based on 168 specific physical layer cell identity groups derived from the cell identity. The scramble sequence provided by the primary synchronization signal is an M sequence generated based on three specific identifiers. Mapping of the sequence of the secondary synchronization signal on the resource elements depends on a frame structure. In frame structure type 1, the secondary synchronization signal is assigned to the second OFDM symbol from the last OFDM symbol of slot 0 (i.e., the first slot of subframe 0) and slot 10 (i.e., the first slot of subframe 5). In frame structure type 2, the secondary synchronization signal is assigned to the last OFDM symbols of slot 1 (i.e., the second slot of subframe 0) and slot 11 (i.e., the second slot of subframe 5).

Although not illustrated here, a physical broadcast information channel may be allocated and a downlink Reference Signal (RS) may be assigned, to a downlink subframe. Examples of a downlink reference signal are a Cell-specific RS (CRS), which is transmitted through the same transmission port as that for a PDCCH, a Channel State Information RS (CSI-RS, non-zero power CSI-RS, NZP CSI-RS), which is used to measure Channel State Information (CSI), a terminal-specific RS (UE-specific RS (URS)), which is transmitted through the same transmission port as that for one or some PDSCHs, and a Demodulation RS (DMRS), which is transmitted through the same transmission port as that for an EPDCCH. Moreover, carriers on which no CRS is mapped may be used. In this case, a similar signal (referred to as "enhanced synchronization signal") to a signal corresponding to one or some transmission ports (e.g., only transmission port 0) or all the transmission ports for the CRSs can be inserted into one or some subframes (e.g., the first and sixth subframes in the radio frame) as time and/or frequency tracking signals. The terminal-specific reference signals transmitted at the same transmission port as part of PDSCHs are also referred to as terminal-specific reference signals or DMRSs associated with PDSCHs. The demodulation reference signals transmitted at the same transmission port as the EPDCCHs are also referred to as DMRSs associated with the EPDCCHs.

Although not illustrated here, in the downlink subframe, Zero Power CSI-RS (ZP CSI-RS) mostly used for rate matching of the PDSCH, which is transmitted simultaneously with the downlink subframe, and CSI Interference Management (CSI-IM) mostly used for interference measurement of channel state information may be mapped. The zero power CSI-RS and the CSI-IM may be arranged on resource elements where the non-zero power CSI-RS can be mapped. The CSI-IM may be configured to overlap the non-zero CSI-RS.

Although not illustrated, Discovery Signals (DSs) may be arranged in downlink subframes. In a certain cell, a DS (DS Occasion) is constituted of a time period (DS period) of a prescribed number of contiguous subframes. The prescribed number is one to five according to FDD (Frame structure type 1) and two to five according to TDD (Frame structure type 2). The prescribed number is configured by the RRC signaling. The prescribed number is one in the LAA secondary cell operation (frame structure type 3) and is constituted of a time period corresponding to a length of 12 OFDM symbols in a non-empty subframe. The terminal apparatus is configured to have an occasion when the DS period is measured. The configuration of the occasion when the DS period is measured is also referred to as a Discovery signals measurement timing configuration (DMTC). The occasion (DMTC Occasion) when the terminal apparatus measures the DS period is configured by an occasion corresponding to 6 ms (six subframes). The terminal assumes that the DS is transmitted (is mapped or occurs) per subframe configured by a parameter dmtc-Periodicity configured by the RRC signaling. The terminal assumes a presence of the DS configured to include signals described below in downlink subframes.

(1) A CRS of antenna port 0 in a DwPTS of all downlink subframes and all special subframes in the DS period.

(2) A PSS in a first subframe of the DS period according to FDD. A PSS in the second subframe of the DS period according to TDD.

(3) A SSS in the first subframe of the DS period.

(4) A non-zero power CSI-RS in a zero or more subframes of the DS period. This non-zero power CSI-RS is configured by the RRC signaling.

The terminal performs measurements based on the configured DS. The measurements are performed by using the CRS of the DS or the non-zero power CSI-RS of the DS. The configuration related to the DS can configure multiple non-zero power CSI-RSs.

In the LAA secondary cell operation (frame structure type 3), the terminal apparatus can measure the received signal strength indicator (RSSI) and the channel occupancy in a prescribed occasion. The RSSI is a mean value of transmit/receive power observed in a prescribed OFDM symbol. The channel occupancy is a percentage of the number of samples for which the RSSIs exceed a configured threshold to the entire number of samples in a configured occasion. The terminal apparatus is configured to have an occasion when the RSSI and channel occupancy are measured. The configuration of the occasion when the RSSI and the channel occupancy are measured is also referred to as an RSSI and channel occupancy measurement timing configuration (RMTC).

Figure 2:
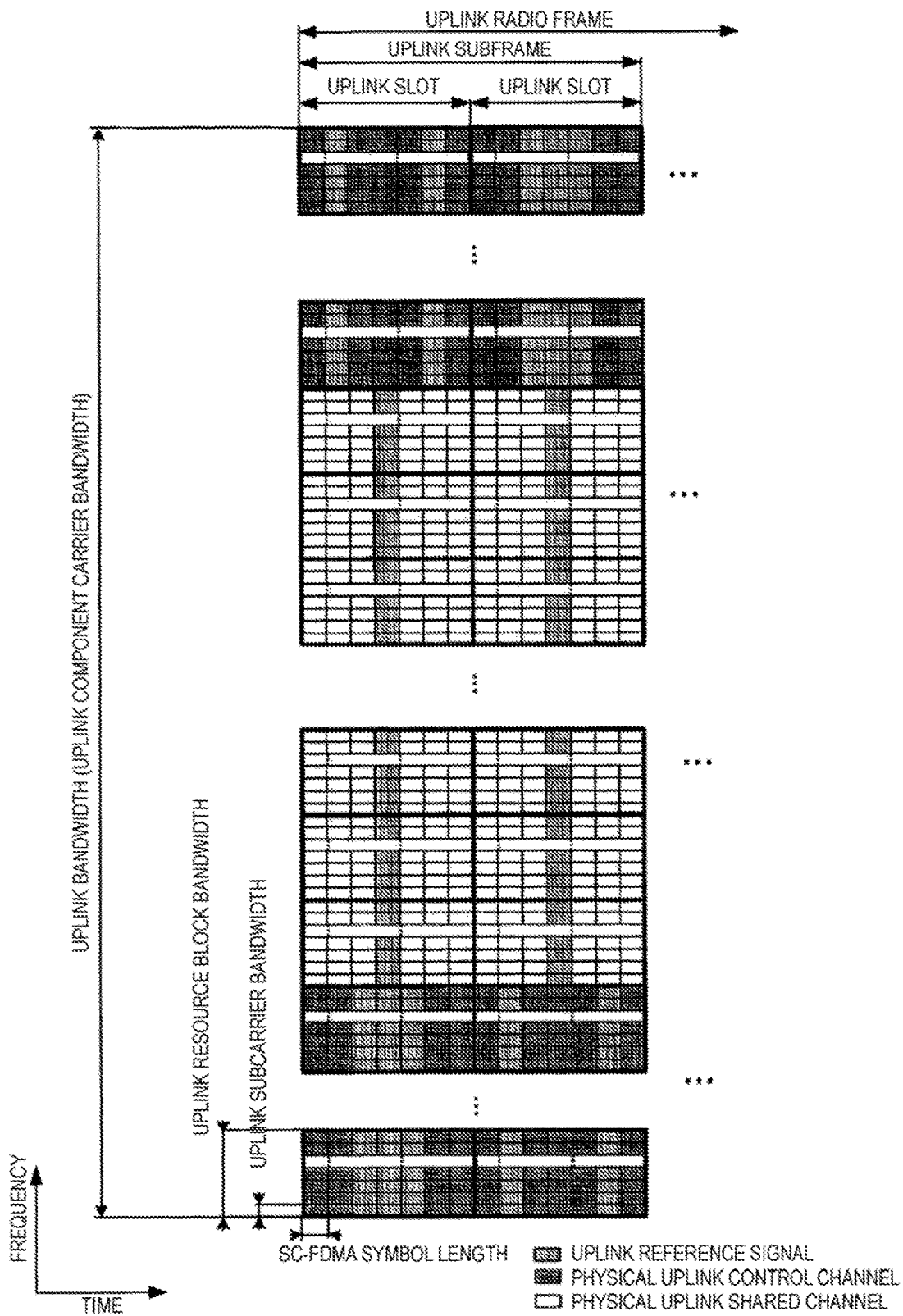
FIG. 2 is a diagram illustrating an example of an uplink radio frame configuration according to the present embodiment.

FIG. 2 is a diagram illustrating an example of an uplink radio frame configuration according to the present embodiment. An SC-FDMA scheme is used in the uplink. Transmission of an uplink signal and/or on an uplink physical channel in the uplink is referred to as an uplink transmission. That is, the uplink transmission can be rephrased as transmission of a PUSCH. In the uplink, a Physical Uplink Shared Channel (PUSCH), a PUCCH, and the like are allocated. An uplink reference signal is assigned to one or some of PUSCHs and PUCCHs. An uplink radio frame is constituted of uplink RB pairs. This uplink RB pair is a unit for allocation of uplink radio resources and the like and is constituted by the frequency band of a predefined width (RB bandwidth) and a predetermined time duration (two slots=1 subframe). Each of the uplink RB pairs is constituted of two uplink RBs (RB bandwidth×slot) that are contiguous in the time domain. Each of the uplink RB is constituted of 12 subcarriers in the frequency domain. In the time domain, one uplink RB is constituted of seven SC-FDMA symbols in a case that a normal cyclic prefix is added, while the uplink RB is constituted of six SC-FDMA symbols in a case that a cyclic prefix that is longer than the normal cyclic prefix is added. Note that although an uplink subframe in a single CC is described here, an uplink subframe is defined for each CC. For compensation of propagation delay and the like, the beginning of the radio frame in the uplink (uplink subframe) is adjusted to precede the beginning of the radio frame in the downlink (downlink subframe), with respect to the terminal apparatus.

A synchronization signal is constituted by three kinds of primary synchronization signals and secondary synchronization signals constituted by 31 kinds of codes that are interleaved in the frequency region. 504 patterns of cell identifiers (Physical Cell IDs; Physical Cell Identities; PCIs) for identifying base station apparatuses, and frame timing for radio synchronization are indicated by the combinations of the primary synchronization signals and the secondary synchronization signals. The terminal apparatus identifies the physical cell ID of a received synchronization signal by cell search.

The Physical Broadcast Channel (PBCH) is transmitted for the notification (configuration) of a control parameter (broadcast information i.e., System information) commonly used among the terminal apparatuses within the cell. The radio resource in which broadcast information is transmitted is announced on the physical downlink control channel to the terminal apparatuses in the cell. Broadcast information not announced on the physical broadcast information channel is transmitted, as a layer-3 message (system information) for announcing the broadcast information of the physical downlink shared channel, by the announced radio resource.

Broadcast information to be notified includes, for example, a Cell Global Identifier (CGI), which indicates a cell-specific identifier, a Tracking Area Identifier (TAI) for managing standby areas in paging, random access configuration information (such as a transmission timing timer), and shared radio resource configuration information, neighboring cell information and uplink access control information of the cell.

A downlink reference signal is classified into a plurality of types according to its use. For example, cell-specific RSs (Cell-specific reference signals) are pilot signals transmitted with prescribed power from each cell and are downlink reference signals periodically repeated in the frequency domain and the time domain under a prescribed rule. The terminal apparatus receives the cell-specific RS and thus measures the reception quality of each cell. The terminal apparatus also uses a cell-specific RS as a reference signal for demodulation of a physical downlink control channel or a physical downlink shared channel transmitted at the same time as a cell-specific RS. A sequence distinguishable among the cells can be used for a sequence for a cell-specific RS.

The downlink reference signal is also used for estimation of downlink channel fluctuation. A downlink reference signal used for estimation of downlink channel fluctuations is referred to as "Channel State Information Reference Signal (CSI-RS)". A downlink reference signal individually configured for the terminal apparatus is referred to as UE-specific Reference Signal (URS), a Demodulation Reference Signal (DMRS), or a Dedicated RS (DRS), and is referred to for a channel compensation process for demodulating an enhanced physical downlink control channel or a physical downlink shared channel.

The Physical Downlink Control Channel (PDCCH) occupying one or several OFDM symbols (e.g., 1 to 4 OFDM symbols) from the start of each subframe is transmitted. The Enhanced Physical Downlink Control Channel (EPDCCH) is a physical downlink control channel allocated to the OFDM symbols to which the Physical Downlink Shared Channel (PDSCH) is allocated. The PDCCH or EPDCCH is used for notifying each terminal apparatus of radio resource allocation information according to scheduling determined by the base station apparatus and information indicating an adjustment amount for an increase or decrease in transmit power. In the following, even in a case that the Physical Downlink Control CHannel (PDCCH) alone is described, both physical channels, that is, the PDCCH and the EPDCCH, are included unless otherwise noted.

The terminal apparatus needs to monitor a physical downlink control channel addressed to the terminal apparatus itself, and receive the physical downlink control channel addressed to the terminal apparatus itself, before transmitting and/or receiving downlink data or a layer-2 message or layer-3 message, which is higher-layer control information (such as a paging or handover command), and thus acquire, from the physical downlink control channel, radio resource allocation information called uplink grant (uplink assignment) in a case of transmission and downlink grant (downlink assignment) in a case of reception. Note that it is also possible to constitute the physical downlink control channel so that the physical downlink control channel is to be transmitted in the dedicated resource block domain allocated to each terminal apparatus by the base station apparatus, instead of transmission through OFDM symbols described above. Note that the uplink grant can be rephrased as a DCI format used for scheduling the PUSCH (uplink DCI format). Note that the downlink grant can be rephrased as a DCI format used for scheduling the PDSCH (downlink DCI format). The subframe for which the PDSCH is scheduled is a subframe for which the DCI format indicating reception of the PDSCH has been received. The subframe for which the PUSCH is scheduled is indicated in association with the subframe for which the DCI format indicating transmission of the PUSCH has been received. For example, for FDD cells, the subframe for which the PUSCH is scheduled is the fourth subframe following the subframe for which the DCI format indicating transmission of the PUSCH has been received. In other words, each of the subframes for which the PUSCH and the PDSCH are scheduled is associated with the subframe for which the DCI format indicating the transmission or reception of the channel has been received.

The Physical Uplink Control Channel (PUCCH) is used for an acknowledgment in response to reception of downlink data transmitted on the physical downlink shared channel (HARQ-ACK; Hybrid Automatic Repeat reQuest-Acknowledgment or ACK/NACK; Acknowledgment/Negative Acknowledgment), downlink channel (Channel State) Information (CSI), and uplink radio resource allocation request (radio resource request, Scheduling Request (SR)).

CSI includes a Channel Quality Indicator (CQI) of the serving cell corresponding to the CSI, a Precoding Matrix Indicator (PMI), a Precoding Type Indicator (PTI), and a Rank Indicator (RI), which can be used respectively for specifying (representing) a preferable modulation scheme and coding rate, a preferable precoding matrix, a preferable PMI type, and a preferable rank. Indication may be used as a notation for each Indicator. Moreover, the CQI and the PMI are classified into wideband CQI and PMI assuming transmission using all the resource blocks in a single cell, and subband CQI and PMI assuming transmission using some contiguous resource blocks (subbands) in a single cell. Moreover, the PMI includes a normal type of PMI representing a single suitable precoding matrix with a single PMI, and another type of PMI representing a single suitable precoding matrix with two kinds of PMIs, which are a first PMI and a second PMI.

For example, the terminal apparatus 1 reports a CQI index that satisfies a condition that an error probability of one PDSCH transport occupying a group of downlink physical resource blocks and determined by a combination of a modulation scheme and a transport block size corresponding to the CQI index, does not exceed a prescribed value (for example, 0.1).

Note that each of the downlink physical resource blocks used to calculate the CQI, the PMI, and/or the RI is referred to as a CSI reference resource.

The terminal apparatus 1 reports the CSI to the base station apparatus 2. The CSI reporting includes periodic CSI reporting and aperiodic CSI reporting. In the periodic CSI reporting, the terminal apparatus 1 reports the CSI at a timing configured by a higher layer. In the aperiodic CSI reporting, the terminal apparatus 1 reports the CSI at a timing based on CSI request information included in the received uplink DCI format (uplink grant) or a random access response grant.

The terminal apparatus 1 reports the CQI and/or the PMI and/or the RI. Note that the terminal apparatus 1 need not report the PMI and/or the RI depending on a configuration made by a higher layer. The configuration made by the higher layer includes, for example, a transmission mode, a feedback mode, a reporting type, and a parameter indicating whether to report the PMI/RI.

Moreover, for the terminal apparatus 1, there may be configured one or multiple CSI processes for one serving cell. The CSI process is configured in association with the CSI reporting. One CSI process is associated with one CSI-RS resource and one CSI-IM resource.

The Physical Downlink Shared Channel (PDSCH) is also used to notify the terminal apparatus of a response to random access (Random Access Response (RAR)) and broadcast information (system information) that is not notified by paging or on the physical broadcast information channel, in addition to downlink data, as a layer-3 message. Radio resource allocation information of the physical downlink shared channel is indicated by a physical downlink control channel. The physical downlink shared channel is allocated to OFDM symbols other than the OFDM symbols used to transmit a physical downlink control channel and is transmitted. In other words, the physical downlink shared channel and the physical downlink control channel are time division multiplexed in a single subframe.

The Physical Uplink Shared Channel (PUSCH) mainly transmits uplink data and uplink control information which may also include uplink control information such as CSI and ACK/NACK. Moreover, the physical uplink shared channel is also used such that the terminal apparatus notifies the base station apparatus of uplink data as well as a layer-2 message and a layer-3 message, which are higher-layer control information. Radio resource allocation information of the physical uplink shared channel is provided by a physical downlink control channel, as in a case of downlink.

An Uplink Reference Signal (also referred to as "uplink pilot signal" or "uplink pilot channel") includes a Demodulation Reference Signal (DMRS) to be used by the base station apparatus to demodulate the physical uplink control Channel PUCCH and/or physical uplink shared Channel PUSCH, and a Sounding Reference Signal (SRS) to be mainly used by the base station apparatus to estimate an uplink channel state. Moreover, sounding reference signals are categorized into a periodic Sounding Reference Signal (Periodic SRS), which is transmitted periodically, or an Aperiodic Sounding Reference Signal (Aperiodic SRS), which is transmitted in a case that transmission is instructed by the base station apparatus. The demodulation reference signal used for demodulating the physical uplink shared channel PUSCH is also referred to as UL DMRS.

The UL DMRS is generated mainly based on a Zadoff-Chu sequence (ZC sequence). For the sequence length of the Zadoff-Chu sequence used for the UL DMRS, used is a maximum value among prime numbers that are equal to or less than the number of allocated subcarriers.

A Physical Random Access Channel (PRACH) is a channel used for the notification (configuration) of a preamble sequence and includes a guard time. The preamble sequence is configured such that multiple sequences are sued for notifying information to the base station apparatus. For example, in a case that 64 sequences are available, 6-bit information can be provided to the base station apparatus. A physical random access channel is used by the terminal apparatus as means for accessing the base station apparatus.

The terminal apparatus uses the physical random access channel to request an uplink radio resource in a case that no physical uplink control channel is configured for an SR or to request the base station apparatus for a transmission timing adjustment information (also referred to as Timing Advance (TA) command) necessary for matching uplink transmission timing to a reception timing window of the base station apparatus, for example. Moreover, the base station apparatus can request the terminal apparatus to start a random access procedure, by using a physical downlink control channel.

The random access response is response information from the base station apparatus for random access by the terminal apparatus. The random access response is included in the PDSCH scheduled based on control information for the PDCCH having CRC scrambled with RA-RNTI, and the PDSCH is transmitted from the base station apparatus. The random access response includes transmission timing adjustment information, the uplink grant (the uplink grant included in the random access response is also referred to as a random access response grant), and Temporary C-RNTI information, which is a temporary identifier of the terminal apparatus.

A layer-3 message is a message exchanged between the Radio Resource Control (RRC) layers of the terminal apparatus and the base station apparatus and handled in a protocol for a Control-plane (CP (C-Plane)), and may be used synonymously with RRC signaling or RRC message. A protocol handling user data (uplink data and downlink data) is referred to as "User-plane (UP (U-Plane))" in contrast to "control plane". Here, a transport block that is transmission data in the physical layer includes C-Plane messages and U-Plane data in higher layers. Detailed descriptions of other physical channels are omitted.

A communicable range (communication area) at each frequency controlled by a base station apparatus is regarded as a cell. Here, the communication area covered by the base station apparatus may be different in size and shape for each frequency. Moreover, the covered area may be different for each frequency. A radio network, in which cells having different types of base station apparatuses or different cell radii are located in a mixed manner in the area with the same frequency and/or different frequencies to form a single communication system, is referred to as a heterogeneous network.

The terminal apparatus operates by regarding the inside of a cell as a communication area. In a case that the terminal apparatus moves from a cell to a different cell, the terminal apparatus moves to an appropriate different cell through a cell reselection procedure at the time of having no radio connection (during no communication) and through a handover procedure at the time of having radio connection (during communication). A suitable cell in general indicates a cell for which it is determined that access from the terminal apparatus is not prohibited based on information specified by the base station apparatus, and that has a downlink reception quality satisfying a predefined condition.

Moreover, the terminal apparatus and the base station apparatus may employ a technique for aggregating the frequencies (component carriers or frequency band) of a plurality of different frequency bands through Carrier Aggregation and treating the resultant as a single frequency (frequency band). A component carrier is categorized as an uplink component carrier corresponding to the uplink and a downlink component carrier corresponding to the downlink. In this specification, "frequency" and "frequency band" may be used synonymously.

For example, in a case that each of five component carriers having frequency bandwidths of 20 MHz are aggregated through Carrier Aggregation, a terminal apparatus capable of performing Carrier Aggregation performs transmission and/or reception by assuming that the aggregated carriers have a frequency bandwidth of 100 MHz. Note that component carriers to be aggregated may have contiguous frequencies or frequencies some or all of which are discontiguous. For example, assuming that available frequency bands include an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band.

It is also possible to aggregate multiple contiguous or discontiguous component carriers of the same frequency bands. The frequency bandwidth of each component carrier may be narrower (e.g., 5 MHz or 10 MHz) than the receivable frequency bandwidth (e.g., 20 MHz) of the terminal apparatus, and the frequency bandwidth of component carriers to be aggregated may be different from each other. Each frequency bandwidth may be equal to any of the frequency bandwidth of known cells in consideration of backward compatibility, but may be a frequency bandwidth different from any of the frequency bands of the known cells.

Moreover, component carriers (carrier types) without backward compatibility may be aggregated. Note that the number of uplink component carriers to be allocated to (configured for or added for) the terminal apparatus by the base station apparatus may be the same as or may be fewer than the number of downlink component carriers.

A cell constituted of an uplink component carrier in which an uplink control channel is configured for a radio resource request and a downlink component carrier having a cell-specific connection with the uplink component carrier is referred to as "Primary cell (PCell)". A cell constituted of component carriers other than those of the primary cell is referred to as "Secondary cell (SCell)". The terminal apparatus receives a paging message, detects update of broadcast information, carries out an initial access procedure, configures security information, and the like in a primary cell, and need not perform these operations in secondary cells.

Although a primary cell is not a target of Activation and Deactivation controls (in other words, considered as being activated at any time), a secondary cell has activated and deactivated states, the change of which is explicitly specified by the base station apparatus or is made based on a timer configured for the terminal apparatus for each component carrier. The primary cell and secondary cell are collectively referred to as "serving cell".

Carrier Aggregation achieves communication using multiple component carriers (frequency bands) using multiple cells, and is also referred to as cell aggregation. The terminal apparatus may have radio connection with the base station apparatus via a relay station device (or repeater) for each frequency. In other words, the base station apparatus of the present embodiment may be replaced with a relay station device.

The base station apparatus manages a cell, which corresponds to an area where terminal apparatuses can communicate with the base station apparatus, for each frequency. A single base station apparatus may manage multiple cells. Cells are classified into multiple types of cells depending on the size of the area (cell size) that allows for communication with terminal apparatuses. For example, cells are classified into macro cells and small cells. Moreover, small cells are classified into femto cells, pico cells, and nano cells depending on the size of the area. In a case that a terminal apparatus can communicate with a certain base station apparatus, the cell configured so as to be used for the communication with the terminal apparatus is referred to as "Serving cell" while the other cells not used for the communication are referred to as "Neighboring cell", among the cells of the base station apparatus.

In other words, in Carrier Aggregation, a plurality of serving cells thus configured include one primary cell and one or a plurality of secondary cells.

A primary cell is a serving cell in which an initial connection establishment procedure has been carried out, a serving cell in which a connection re-establishment procedure has been started, or a cell indicated as a primary cell during a handover procedure. The primary cell operates at a primary frequency. At the point in time when a connection is (re)established, or later, a secondary cell may be configured. Each secondary cell operates at a secondary frequency. The connection may be referred to as an RRC connection. For the terminal apparatus supporting CA, a single primary cell and one or more secondary cells are aggregated.

In the present embodiment, Licensed Assisted Access (LAA) is used. According to LAA, an allocated frequency is configured to (used for) the primary cell, and a non-allocated frequency is configured to at least one of secondary cells. The secondary cell(s) to which the non-allocated frequency is configured is assisted by the primary cell or the secondary cell(s) to which the allocated frequency is configured. For example, the primary cell(s) or the secondary cell to which the allocated frequency is configured performs the configuration and/or announces control information by the RRC signaling, MAC signaling and/or PDCCH signaling to the secondary cell(s) to which the non-allocated frequency is configured. In the present embodiment, a cell assisted by the primary cell or the secondary cell(s) is also referred to as "LAA cell". The LAA cell can be aggregated (assisted) with the primary cell and/or the secondary cell(s) by Carrier Aggregation. The primary cell or the secondary cell(s) which assists the LAA cell is also referred to as "assist cell". In particular, operation of LAA in a secondary cell is also referred to as "LAA secondary cell operation", and this secondary cell is also referred to as an "LAA secondary cell". Note that the LAA secondary cell is synonymous with a serving cell to which frame structure type 3 is applied, a serving cell that is operated using band 46 defined in an unlicensed band of a 5 GHz band, or a serving cell for which a configuration specific to the LAA secondary cell (LAA-SCellConfiguration) is configured.

The LAA cell may be aggregated (assisted) by the primary cell and/or the secondary cell(s) by dual connectivity.

A basic configuration (architecture) of dual connectivity will be described below. For example, the description will be given in a case that a terminal apparatus 1 connects to multiple base stations 2 (for example, a base station apparatus 2-1 and a base station apparatus 2-2) at the same time. The base station apparatus 2-1 is a base station apparatus constituting a macro cell, and the base station apparatus 2-2 is a base station apparatus constituting a small cell. The terminal apparatus 1 connecting to the base station apparatuses 2 at the same time by using the plurality of cells belonging to the plurality of base station apparatuses 2 as described above is referred to as "dual connectivity". The cells belonging to the respective base station apparatuses 2 may be operated at the same frequency or different frequencies.

Note that Carrier Aggregation is different from dual connectivity in that a single one of the base station apparatuses 2 manages a plurality of cells and the frequencies of the respective cells are different from each other. In other words, Carrier Aggregation is a technique for connecting the single terminal apparatus 1 and a single one of the base station apparatus 2 via a plurality of cells having different frequencies, while dual connectivity is a technique for connecting the single terminal apparatus 1 and the plurality of base station apparatuses 2 via a plurality of cells having the same frequency or different frequencies.

The terminal apparatus 1 and base station apparatuses 2 can apply a technique used for Carrier Aggregation, to dual connectivity. For example, the terminal apparatus 1 and base station apparatuses 2 may apply a technique of allocation of a primary cell and secondary cells or activation/deactivation, to cells connected through dual connectivity.

In dual connectivity, the base station apparatus 2-1 or base station apparatus 2-2 is connected to MME and SGW via a backbone network. The MME is a host control station device corresponding to a Mobility Management Entity (MME) and has the functions of managing mobility and performing authentication control (security control) for the terminal apparatus 1, and configuring routes for user data to the base station apparatuses 2. The SGW is a host control station device corresponding to a Serving Gateway (S-GW) and has the functions of transmitting user data according to the route for user data to the terminal apparatus 1 configured by the MME.

Moreover, in dual connectivity, the connection route between the base station apparatus 2-1 or base station apparatus 2-2 and the SGW is referred to as an "SGW interface". Moreover, the connection route between the base station apparatus 2-1 or base station apparatus 2-2 and the MME is referred to as "MME interface". Moreover, the connection route between the base station apparatus 2-1 and base station apparatus 2-2 is referred to as "base station interface". The SGW interface is also referred to as an S1-U interface in EUTRA. Moreover, the MME interface is also referred to as "S1-MME interface" in EUTRA. Moreover, the base station interface is also referred to as "X2 interface" in EUTRA.

An example of an architecture for enabling dual connectivity will be described. In dual connectivity, the base station apparatus 2-1 and the MME are connected via the MME interface. Moreover, the base station apparatus 2-1 and the SGW are connected via the SGW interface. Moreover, the base station apparatus 2-1 provides, to the base station apparatus 2-2, the communication route to the MME and/or SGW via the base station interface. In other words, the base station apparatus 2-2 is connected to the MME and/or the SGW via the base station apparatus 2-1.

Moreover, another example of another architecture for enabling dual connectivity will be described. In dual connectivity, the base station apparatus 2-1 and the MME are connected via the MME interface. Moreover, the base station apparatus 2-1 and the SGW are connected via the SGW interface. The base station apparatus 2-1 provides, to the base station apparatus 2-2, the communication route to the MME via the base station interface. In other words, the base station apparatus 2-2 is connected to the MME via the base station apparatus 2-1. Moreover, the base station apparatus 2-2 is connected to the SGW via the SGW interface.

Note that a constitution in which the base station apparatus 2-2 and the MME are directly connected via the MME interface may be employed.

On the basis of description from a different point of view, dual connectivity is an operation whereby a prescribed terminal apparatus consumes radio resources provided from at least two different network points (master base station apparatus (MeNB or Master cNB) and secondary base station apparatus (SeNB or Secondary eNB)). In other words, in dual connectivity, a terminal apparatus is configured to establish an RRC connection to at least two network points. In dual connectivity, the terminal apparatus may be connected via a non-ideal backhaul in RRC connected (RRC_CONNECTED) state.

In dual connectivity, a base station apparatus that is connected to at least the S1-MME and that acts as the mobility anchor of the core network is referred to as "master base station apparatus". Moreover, a base station apparatus that is not the master base station apparatus and that provides supplemental radio resources to the terminal apparatus is referred to as "secondary base station apparatus". A group of serving cells that is associated with the master base station apparatus may be referred to as "Master Cell Group" (MCG), and a group of serving cells that is associated with the secondary base station apparatus may be referred to as "Secondary Cell Group" (SCG). Note that the cell groups may be serving cell groups.

In dual connectivity, the primary cell belongs to the MCG. Moreover, in the SCG, the secondary cell corresponding to the primary cell is referred to as "Primary Secondary Cell" (pSCell). Note that the pSCell may be referred to as "special cell" or "Special Secondary Cell" (Special SCell). Some of the functions (for example, functions for transmitting and/or receiving a PUCCH) of the PCell (the base station apparatus constituting the PCell) may be supported by the Special SCell (the base station apparatus constituting the Special SCell). Additionally, some of the functions of the PCell may be supported in the pSCell. For example, the function for transmitting a PDCCH may be supported by the pSCell. Additionally, the function for performing a PDCCH transmission may be supported in the pSCell by using a search space different from a Common Search Space (CSS) or a UE-specific Search Space (USS). For example, the search space different from a USS is a search space determined based on a value defined in the specification, a search space determined based on an RNTI different from a C-RNTI, a search space determined based on a value configured by a higher layer that is different from the RNTI, or the like. Moreover, the pSCell may constantly be in a starting state. Moreover, the pSCell is a cell capable of receiving the PUCCH.

In dual connectivity, the Data Radio Bearer (DRB) may be individually allocated to the MeNB and the SeNB. On the other hand, the Signalling Radio Bearer (SRB) may be allocated only to the MeNB. In dual connectivity, a duplex mode may be configured individually for the MCG and the SCG or the PCell and the pSCell. In dual connectivity, the MCG and the SCG or the PCell and the pSCell need not necessarily be synchronized with each other. In dual connectivity, a plurality of parameters for timing adjustment (TAG or Timing Advance Group) may be configured for each of the MCG and the SCG. In other words, the terminal apparatus is capable of performing uplink transmission at a plurality of different timings in each CG.

In dual connectivity, the terminal apparatus is allowed to transmit UCI corresponding to the cells in the MCG only to the MeNB (the PCell) and to transmit UCI corresponding to the cells in the SCG to SeNB (the pSCell) only. For example, the UCI is an SR, HARQ-ACK, and/or CSI. Additionally, in each UCI transmission, a transmission method using the PUCCH and/or the PUSCH is applied to each cell group.

All signals can be transmitted and/or received in the primary cell, but some signals may not be transmitted and/or received in the secondary cell. For example, a Physical Uplink Control Channel (PUCCH) is transmitted only in the primary cell. Additionally, unless a plurality of Timing Advance Groups (TAGs) are configured between the cells, a Physical Random Access Channel (PRACH) is transmitted only in the primary cell. Additionally, a Physical Broadcast Channel (PBCH) is transmitted only in the primary cell. Additionally, a Master Information Block (MIB) is transmitted only in the primary cell. Signals that can be transmitted and/or received in the primary cell are transmitted and/or received in the primary secondary cell. For example, the PUCCH may be transmitted in the primary secondary cell. Additionally, the PRACH may be transmitted in the primary secondary cell, regardless of whether a plurality of TAGs are configured or not. Additionally, the PBCH and the MIB may be transmitted in the primary secondary cell.

In the primary cell, Radio Link Failure (RLF) is detected. In the secondary cell, even in a case where conditions for the detection of RLF are in place, the detection of the RLF is not recognized. However, in the primary secondary cell, the RLF is detected in the case where the conditions are in place. In a case that an RLF is detected in the primary secondary cell, the higher layer of the primary secondary cell announces, to the higher layer of the primary cell, that the RLF has been detected. Semi-Persistent Scheduling (SPS) or Discontinuous Reception (DRX) may be used in the primary cell. The same DRX as in the primary cell may be used in the secondary cell. Fundamentally, in the secondary cell, the MAC configuration information/parameters are shared with the primary cell/primary secondary cell of the same call group. Some of the parameters (for example, sTAG-Id) may be configured for each secondary cell. Some of the timers or counters may be applied only to the primary cell and/or the primary secondary cell. A timer or counter to be applied may be configured only to the secondary cell.

In an example where dual connectivity is applied to the LAA cell, the MCG (base station apparatus 2-1) is a base station apparatus which constitutes the primary cell. The SCG (base station apparatus 2-2) is a base station apparatus which constitutes the LAA cell. In other words, the LAA cell is configured as pSCell of the SCG.

In another example where dual connectivity is applied to the LAA cell, the MCG is the base station apparatus which constitutes the primary cell, and the SCG is the base station apparatus which constitutes the pSCell and the LAA cell. In other words, the LAA cell is assisted by the pSCell in the SCG. Note that in a case that the secondary cell is further configured to the SCG, the LAA cell may be assisted by the secondary cell.

In still another example where dual connectivity is applied to the LAA cell, the MCG is the base station apparatus which constitutes the primary cell and the LAA cell, and the SCG is the base station apparatus which constitutes the pSCell. In other words, the LAA cell is assisted by the primary cell in the MCG. Note that in a case that the secondary cell is further configured to the MCG, the LAA cell may be assisted by the secondary cell.

Figure 3:
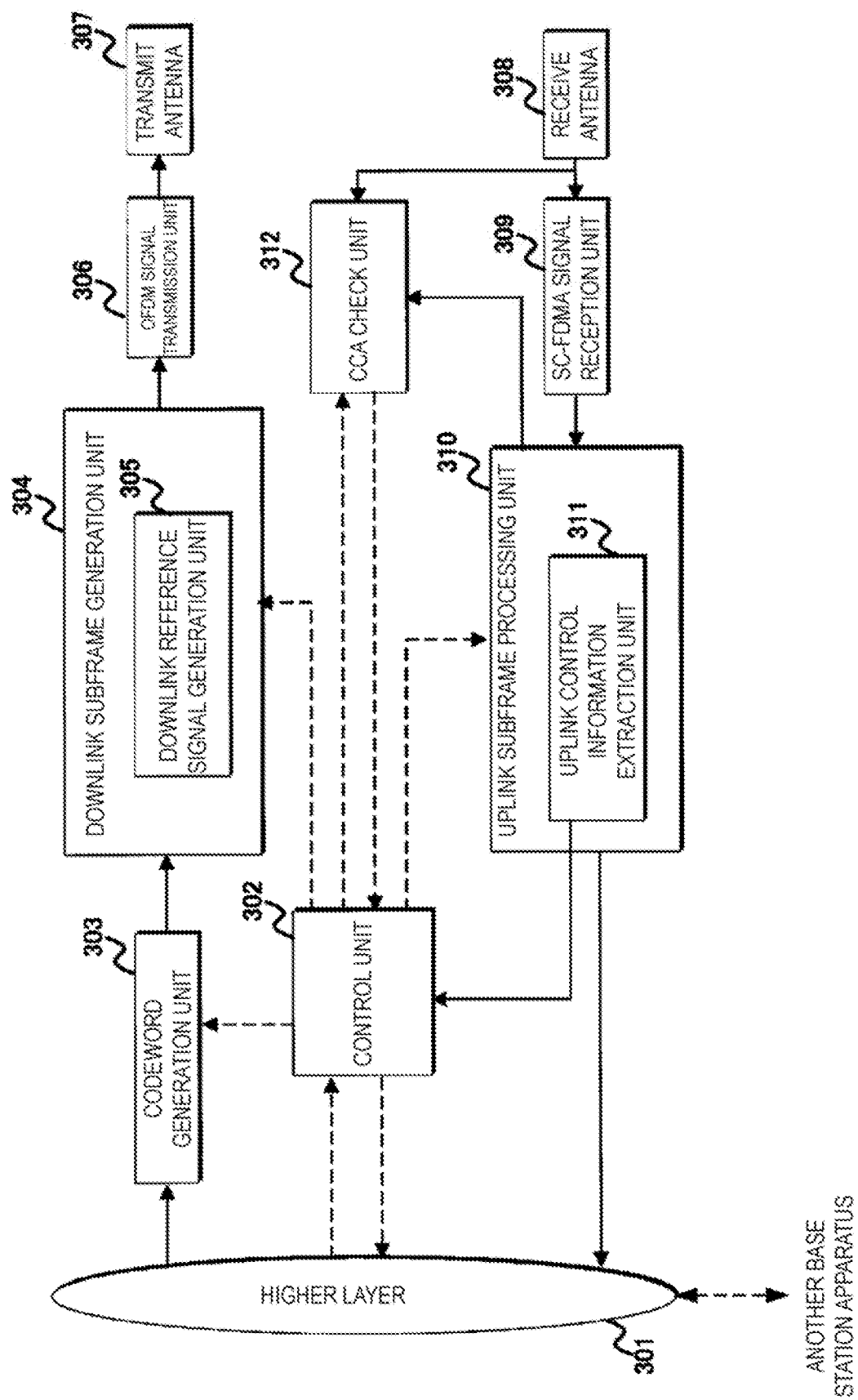
FIG. 3 is a schematic diagram illustrating an example of a block configuration of a base station apparatus 2 according to the present embodiment.

FIG. 3 is a schematic diagram illustrating an example of a block configuration of a base station apparatus 2 according to the present embodiment. The base station apparatus 2 includes a higher layer (higher-layer control information notification unit, higher layer processing unit) 301, a control unit (base station control unit) 302, a codeword generation unit 303, a downlink subframe generation unit 304, an OFDM signal transmission unit (downlink transmission unit) 306, a transmit antenna (base station transmit antenna) 307, a receive antenna (base station receive antenna) 308, an SC-FDMA signal reception unit (CSI reception unit) 309, and an uplink subframe processing unit 310. The downlink subframe generation unit 304 includes a downlink reference signal generation unit 305. Moreover, the uplink subframe processing unit 310 includes an uplink control information extraction unit (CSI acquisition unit) 311.

Figure 4:
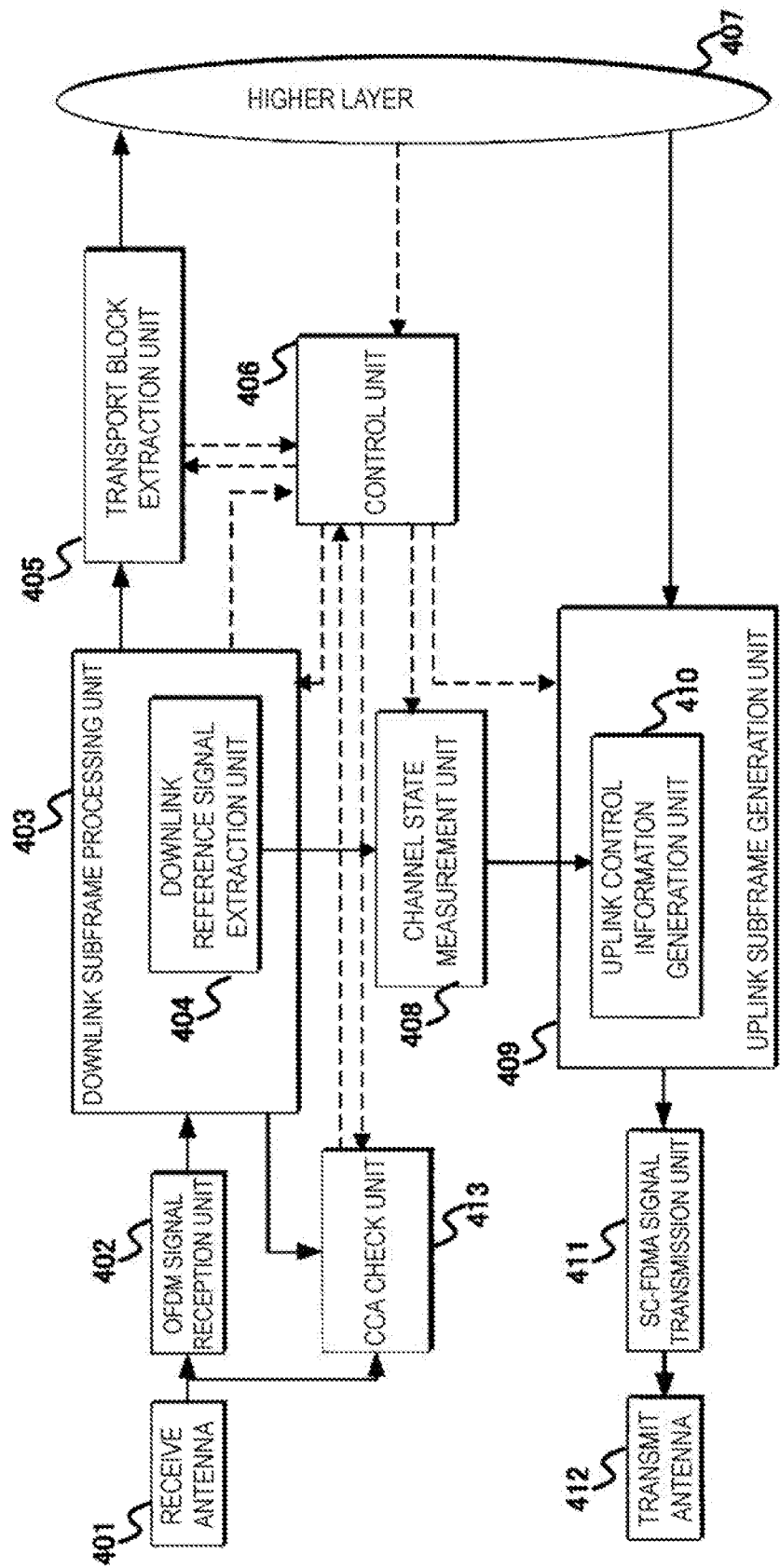
FIG. 4 is a schematic diagram illustrating an example of a block configuration of a terminal apparatus 1 according to the present embodiment.

FIG. 4 is a schematic diagram illustrating an example of a block configuration of a terminal apparatus 1 according to the present embodiment. The terminal apparatus 1 includes a receive antenna (terminal receive antenna) 401, an OFDM signal reception unit (downlink reception unit) 402, a downlink subframe processing unit 403, a transport block extraction unit (data extraction unit) 405, a control unit (terminal control unit) 406, a higher layer (higher-layer control information acquisition unit, higher layer processing unit) 407, a channel state measurement unit (CSI generation unit) 408, an uplink subframe generation unit 409, an SC-FDMA signal transmission unit (UCI transmission unit) 411, and a transmit antenna (terminal transmit antenna) 412. The downlink subframe processing unit 403 includes a downlink reference signal extraction unit 404. Moreover, the uplink subframe generation unit 409 includes an uplink control information generation unit (UCI generation unit) 410.

First, a flow of downlink data transmission and/or reception will be described with reference to FIG. 3 and FIG. 4. In the base station apparatus 2, the control unit 302 holds a Modulation and Coding Scheme (MCS) indicating a modulation scheme, a coding rate, and the like in the downlink, a downlink resource allocation indicating RBs to be used for data transmission, and information to be used for HARQ control (a redundancy version, an HARQ process number, and a new data indicator) and controls the codeword generation unit 303 and the downlink subframe generation unit 304, based on these elements. Downlink data (also referred to as a downlink transport block) transmitted from the higher layer 301 is processed through error correction coding, rate matching, and the like in the codeword generation unit 303 under the control of the control unit 302 and then, a codeword is generated. Two codewords at maximum are transmitted at the same time in a single subframe in a single cell. The control unit 302 instructs the downlink subframe generation unit 304 to generate a downlink subframe. First, a codeword generated in the codeword generation unit 303 is converted into a modulation symbol sequence through a modulation process, such as Phase Shift Keying (PSK) modulation or Quadrature Amplitude Modulation (QAM). Moreover, a modulation symbol sequence is mapped onto REs of some RBs, and a downlink subframe for each antenna port is generated through a precoding process. In this operation, the transmission data sequence transmitted from the higher layer 301 includes higher-layer control information, which is control information about the higher layer (e.g., dedicated (individual) Radio Resource Control (RRC) signaling). Furthermore, the downlink reference signal generation unit 305 generates a downlink reference signal. The downlink subframe generation unit 304 maps the downlink reference signal to the REs in the downlink subframes in accordance with an instruction from the control unit 302. The OFDM signal transmission unit 306 modulates the downlink subframe generated by the downlink subframe generation unit 304 to an OFDM signal, and then transmits the OFDM signal through the transmit antenna 307. Although a configuration of including one OFDM signal transmission unit 306 and one transmit antenna 307 is illustrated as an example here, a configuration of including multiple OFDM signal transmission units 306 and multiple transmit antennas 307 may be employed for transmitting downlink subframes through multiple antenna ports. Furthermore, the downlink subframe generation unit 304 may also have a capability of generating physical-layer downlink control channels, such as a PDCCH and an EPDCCH to map the channels to REs in downlink subframes. Multiple base station apparatuses (base station apparatus 2-1 and base station apparatus 2-2) transmit separate downlink subframes. Note that the base station apparatus 2 that operates in the LAA cell is configured to include a CCA check unit 312 configured to determine whether the channel is idle or busy. The CCA check unit 312 is implemented with a method for determination using power received through the receive antenna 308, a method for a determination depending on whether a specific signal from the uplink subframe processing unit 310 has been detected, and the like. A determination result from the CCA check unit 312 is transmitted to the control unit 302 and used to control the transmission.

In the terminal apparatus 1, an OFDM signal is received by the OFDM signal reception unit 402 through the receive antenna 401, and an OFDM demodulation process is performed on the signal. The downlink subframe processing unit 403 first detects physical-layer downlink control channels, such as a PDCCH and an EPDCCH. More specifically, the downlink subframe processing unit 403 decodes the signal by assuming that a PDCCH and an EPDCCH have been transmitted in the regions to which the PDCCH and the EPDCCH can be allocated, and checks Cyclic Redundancy Check (CRC) bits added in advance (blind decoding). In other words, the downlink subframe processing unit 403 monitors a PDCCH and an EPDCCH. In a case that the CRC bits match an ID (a single terminal-specific identifier assigned to a single terminal, such as a Cell-Radio Network Temporary Identifier (C-RNTI) or a Semi Persistent Scheduling-C-RNTI (SPS-C-RNTI), or a Temporary C-RNTI) assigned by the base station apparatus beforehand, the downlink subframe processing unit 403 recognizes that a PDCCH or an EPDCCH has been detected and extracts a PDSCH by using control information included in the detected PDCCH or EPDCCH. The control unit 406 holds an MCS indicating a modulation scheme, a coding rate, and the like in the downlink based on the control information, a downlink resource allocation indicating RBs to be used for downlink data transmission, and information to be used for HARQ control, and controls the downlink subframe processing unit 403, the transport block extraction unit 405, and the like, in accordance with these elements. More specifically, the control unit 406 performs control so as to carry out an RE mapping process in the downlink subframe generation unit 304, an RE demapping process and demodulation process corresponding to the modulation process, and the like. The PDSCH extracted from the received downlink subframe is transmitted to the transport block extraction unit 405. Furthermore, the downlink reference signal extraction unit 404 in the downlink subframe processing unit 403 extracts the downlink reference signal from the downlink subframe. The transport block extraction unit 405 extracts a transport block that has been subjected to a rate matching process, a rate matching process corresponding to error correction coding, error correction decoding, and the like in the codeword generation unit 303, and transmits the extracted transport block to the higher layer 407. The transport block includes higher-layer control information, and the higher layer 407 notifies the control unit 406 of a necessary physical-layer parameter, based on the higher-layer control information. The plurality of base station apparatuses 2 (base station apparatus 2-1 and base station apparatus 2-2) transmit separate downlink subframes, and the terminal apparatus 1 receives the downlink subframes. Hence, the above-described processes may be carried out for the downlink subframe of each of the plurality of base station apparatuses 2. In this situation, the terminal apparatus 1 may recognize or may not necessarily recognize that multiple downlink subframes have been transmitted from the multiple base station apparatuses 2. In a case that the terminal apparatus 1 does not recognize the subframes, the terminal apparatus 1 may simply recognize that multiple downlinks subframes have been transmitted in multiple cells. Moreover, the transport block extraction unit 405 determines whether the transport block has been detected correctly, and transmits a determination result to the control unit 406. Note that the terminal apparatus 1 that operates in the LAA cell is configured to include a CCA check unit 413 configured to determine whether the channel is idle or busy. The CCA check unit 413 is implemented with a method for determination using power received through the receive antenna 401, a method for determination depending on whether a specific signal from the downlink subframe processing unit 403 has been detected, and the like. A determination result from the CCA check unit 413 is transmitted to the control unit 406 and used to control the transmission.

Next, a flow of uplink signal transmission and/or reception will be described. In the terminal apparatus 1, the control unit 406 instructs a downlink reference signal extracted by the downlink reference signal extraction unit 404 to be transmitted to the channel state measurement unit 408, and then instructs the channel state measurement unit 408 to measure the channel state and/or interference, and further to calculate CSI, based on the measured channel state and/or interference. The control unit 406 instructs the uplink control information generation unit 410 to generate an HARQ-ACK (DTX (not transmitted yet), ACK (detection success), or NACK (detection failure)) and to map the HARQ-ACK to a downlink subframe, based on a determination result of whether the transport block is correctly detected. The terminal apparatus 1 performs these processes on the downlink subframe of each of multiple cells. In the uplink control information generation unit 410, a PUCCH including the calculated CSI and/or HARQ-ACK is generated. In the uplink subframe generation unit 409, the PUSCH including the uplink data transmitted from the higher layer 407 and the PUCCH generated by the uplink control information generation unit 410 are mapped to RBs in an uplink subframe, and an uplink subframe is generated. The uplink subframe is subjected to the SC-FDMA modulation in the SC-FDMA signal transmission unit 411 to generate an SC-FDMA signal, and the SC-FDMA signal transmission unit 411 transmits the SC-FDMA signal via the transmit antenna 412.

Here, the terminal apparatus 1 performs (derives) channel measurement for calculating the value of the CQI, based on the CRS or the CSI-RS (non-zero power CSI-RS). Whether the terminal apparatus 1 derives the channel measurement, based on the CRS or the CSI-RS, is determined according to higher layer signaling. Specifically, in a transmission mode configured with the CSI-RS, the terminal apparatus 1 derives the channel measurement for calculating the CQI, based only on the CSI-RS. Specifically, in a transmission mode not configured with the CSI-RS, the terminal apparatus 1 derives the channel measurement for calculating the CQI, based on the CRS. The RS used for the channel measurement for calculating the CSI is also referred to as a first RS.

Here, the terminal apparatus 1 performs (derives) interference measurement for calculating the CQI, based on CSI-IM or a second RS, in a case that this is configured by the higher layer. Specifically, in a transmission mode configured with the CSI-IM, the terminal apparatus 1 derives the interference measurement for calculating the CQI, based on the CSI-IM. Specifically, in the transmission mode configured with the CSI-IM, the terminal apparatus 1 derives the interference measurement for calculating the value of the CQI corresponding to the CSI process, based only on the CSI-IM resource associated with the CSI process. The RS or IM used for the channel measurement for calculating the CSI is also referred to as a second RS.

Note that the terminal apparatus 1 may perform (may derive) the interference measurement for calculating the CQI, based on the CRS. For example, the terminal apparatus 1 may derive the interference measurement for calculating the CQI, based on the CRS, in a case that the CSI-IM is not configured.

Note that the channel and/or interference used to calculate the CQI may similarly be used as a channel and/or interference for calculating the PMI or RI.

The PUSCH is scheduled by the uplink grant. The uplink grant is defined by, for example, DCI format 0 and DCI format 4.

One DCI format 0 is used for scheduling the PUSCH in one uplink cell.

A Carrier indicator, a Flag for format 0/format 1A differentiation, a Frequency hopping flag, a Resource block assignment and hopping resource allocation, a Modulation and coding scheme and redundancy version, a New data indicator, a TPC command for scheduled PUSCH, a Cyclic shift for DMRS and OCC index, a UL index, a Downlink Assignment Index (DAI), a CSI request, an SRS request, and a Resource allocation type are transmitted using DCI format 0.

DCI format 0 has the same payload size as DCI format 1A, which is a type of downlink assignment. Accordingly, the number of blind decoding of the PDCCH can be reduced.

One DCI format 4 is used to schedule the PUSCH for multiple antenna port transmission modes in one UL cell.

A Carrier indicator, a Resource block assignment, a TPC command for scheduled PUSCH, a Cyclic shift for DMRS and OCC index, a UL index, a Downlink Assignment Index (DAI), a CSI request, a Modulation and coding scheme and redundancy version, a New data indicator, and a Precoding information and number of layers are transmitted using DCI format 4.

Note that in an uplink DCI format for scheduling transmission of a PUSCH in the LAA cell, a field of the HARQ process corresponding to the PUSCH is included. In accordance with information of the HARQ process, in the LAA cell, a terminal apparatus can perform HARQ synthesis of the PUSCH in a non-synchronous manner.

For the downlink assignment, a first downlink resource allocation type (downlink resource allocation type 0), a second downlink resource allocation type (downlink resource allocation type 1), and a third downlink resource allocation type (downlink resource allocation type 2) are defined.

Downlink resource allocation type 0 indicates virtual resource blocks, which have been allocated non-contiguously to a scheduled terminal apparatus, in a bitmap format. A smallest unit of virtual resource blocks that can be allocated is referred to as a Resource Block Group (RBG). The resource block group is defined as a set of contiguous virtual resource blocks of a value from 1 to 4. An RBG size is determined in association with a system bandwidth. A total number of RBGs is determined by the system bandwidth of the downlink and the RBG size. The RBGs are labeled with an index in ascending order from the lowest frequency. One bit in the bitmap format corresponds to one RBG.

Downlink resource allocation type 1 indicates virtual resource blocks within the set of virtual resource blocks allocated non-contiguously to the scheduled terminal apparatus. The set of virtual resource blocks is configured from an RBG subset.

Information of downlink resource allocation type 1 is constituted by three fields. The first filed is used to indicate the RBG subset selected from among multiple RBG subsets. The second field is used to indicate a shift amount of a resource allocation interval within a subset. The third field is a bitmap, and a bit in the bitmap corresponds to one virtual resource block in the RBG subset selected by the first field. In a case that a value of a bit in the bitmap is 1, a corresponding virtual resource block is allocated to the terminal apparatus.

Downlink resource allocation type 2 indicates one set of one or multiple virtual resource blocks contiguously allocated to the scheduled terminal apparatus. A resource allocation field included in uplink resource allocation type 0 is constituted by a single value corresponding to a beginning (starting position) of resource blocks and a length of contiguously allocated resource blocks. This single value is also referred to as a resource indication value (RIV).

The fields of the resource allocation types included in the DCI format are commonly used in the resource allocation types. A type of a downlink resource allocation type to be applied is determined based on a type of DCI format. For example, in a case that an indication is given using any of DCI format 1A, 1B, 1C or 1D, downlink resource allocation type 2 is applied, whereas in a case that an indication is given using another DCI format than the aforementioned DCI formats, downlink resource allocation type 0 or 1 is applied. Further, a type of a downlink resource allocation type is determined based on a prescribed indicator (field) included in a DCI format. For example, in a case that an indicator included in a DCI format indicates type 0, downlink resource allocation type 0 is applied, and in a case that the indicator indicates type 1, downlink resource allocation type 1 is applied.

For the uplink grant (uplink DCI format), a first uplink resource allocation type (uplink resource allocation type 0) and a second uplink resource allocation type (uplink resource allocation type 1) are defined.

In a case that no resource allocation type bit is present in an uplink DCI format, only resource allocation type 0 is supported. In a case that a resource allocation type bit is present in an uplink DCI format, a resource allocation type indicated by the bit is applied.

Uplink resource allocation type 0, similarly to downlink resource allocation type 2, indicates one set of one or multiple virtual resource blocks contiguously allocated to the scheduled terminal apparatus. A resource allocation field included in uplink resource allocation type 0 is constituted by a single value corresponding to a beginning (starting position) of resource blocks and a length of contiguously allocated resource blocks. This single value is also referred to as a resource indication value (RIV).

Uplink resource allocation type 1 indicates two sets of one or multiple virtual resource blocks contiguously allocated to the scheduled terminal apparatus. The resource allocation field included in uplink resource allocation type 1 is constituted of a single index in which the respective starting positions and ending positions (resource blocks) of the two sets are combined. A set of one or multiple resource blocks allocated to a single terminal apparatus, which are contiguous in the frequency domain, is also referred to as a "cluster".

Details of the LAA cell will be described below.

The frequency used by the LAA cell is shared with other communication systems and/or other LTE operators. To share the frequency, the LAA cell needs fairness with the other communication systems and/or the other LTE operators. For example, a communication method used by the LAA cell needs a fair frequency sharing technique (method). In other words, the LAA cell is a cell which performs a communication method (communication procedure) to which the fair frequency sharing technique is applicable (used).

An example of the fair frequency sharing technique is Listen-Before-Talk (LBT). Before a certain base station or a certain terminal transmits a signal by using a frequency (a component carrier, a carrier, a cell, a channel, or a medium), LBT measures (detects) interference power (an interference signal, receive power, a receive signal, noise power and a noise signal) or the like of the frequency, to identify (detect, assume or determine) whether the frequency is in an idle state (a free state, a non-congested state, Absence or Clear) or a busy state (an occupied state, a congested state, Presence or Occupied). In a case that the frequency being in the idle state is identified based on LBT, the LAA cell can transmit a signal at a prescribed timing of the frequency. In a case that the frequency being in the busy state is identified based on LBT, the LAA cell does not transmit a signal at the prescribed timing of the frequency. LBT controls and prevents an interference with signals to be transmitted by other communication systems and/or other base stations including other LTE operators and/or terminals. Note that LBT performed by the base station apparatus before a downlink transmission is referred to as downlink LBT and that LBT performed by the terminal apparatus before an uplink transmission is referred to as uplink LBT. Furthermore, LBT performed by the terminal apparatus for sidelink transmissions may be referred to as sidelink LBT.

An LBT procedure is defined as a mechanism to which Clear Channel Assessment (CCA) check is applied before a certain base station or terminal uses the frequency (channel). The CCA performs power detection or signal detection for determining presence of absence of another signal in the channel to identify whether the frequency is in the idle state or the busy state. Note that in the present embodiment, a definition of CCA may be equivalent to a definition of LBT. Note that, in the present embodiment, CCA is also referred to as carrier sense.

CCA can use various methods as a method for determining the presence or absence of another signal. For example, CCA makes the determination based on whether the interference power at a certain frequency exceeds a certain threshold. Moreover, for example, CCA makes the determination based on whether the receive power of a prescribed signal or channel at a certain frequency exceeds a certain threshold. The threshold may be defined in advance. The threshold may be configured by a base station or another terminal. The threshold may be determined (configured) based on at least another value (parameter) such as transmit power (maximum transmit power). Moreover, for example, CCA makes the determination, based on whether a prescribed channel at a certain frequency has been decoded.

The LBT procedure includes Initial CCA (ICCA, single sensing, LBT category 2, Frame-Based Equipment (FBE)) allowing a signal to be transmitted after a CCA check is performed once, and Extended CCA (ECCA, multiple sensing, LBT category 3/4, Load-Based Equipment (LBE)) allowing a signal to be transmitted after the CCA check is performed a prescribed number of times. A period in which the CCA check is performed by ICCA is referred to as an ICCA period or an ICCA slot length, and lasts, for example, 34 microseconds. Furthermore, a period in which the CCA check is performed by ECCA is referred to as an ECCA period or an ECCA slot length, and lasts, for example, 9 microseconds. Note that the prescribed number of times is also referred to as a backoff counter (counter, random number counter, ECCA counter). Furthermore, a period in which the CCA check is performed after the frequency changes from the busy state to the idle state is referred to as a defer period or an ECCA defer period, and lasts, for example, 34 microseconds.

Figure 6:
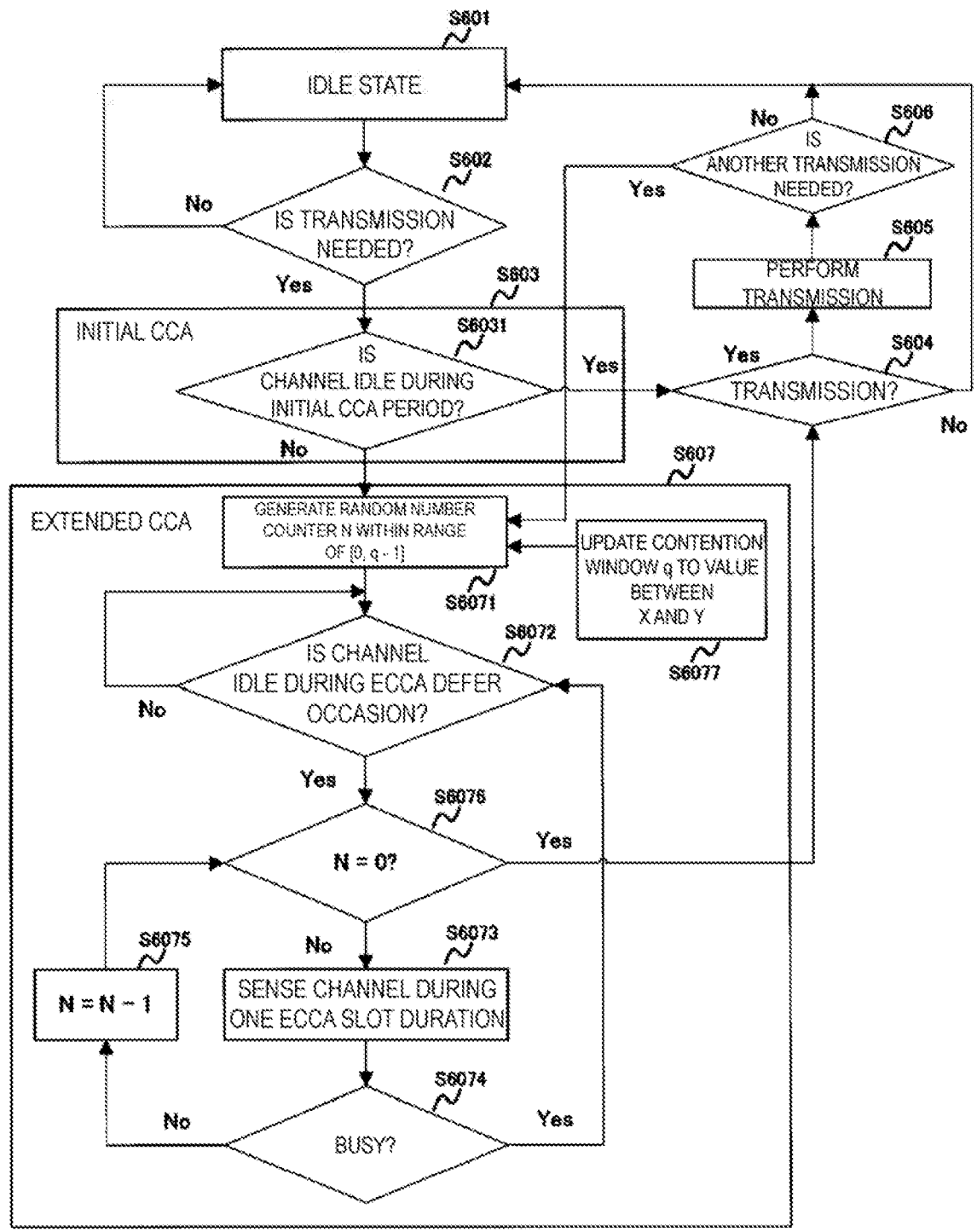
FIG. 6 is a diagram illustrating an example of a procedure of CCA for a downlink transmission according to a present embodiment.
Figure 7A:
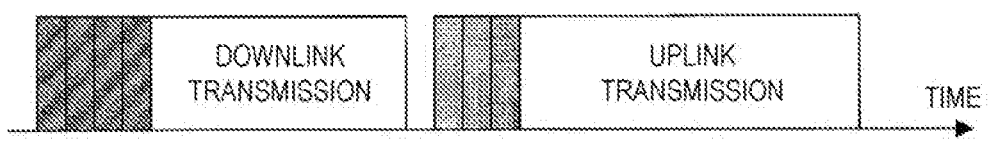
FIGS. 7A to 7C are diagrams illustrating an example of a relationship between an interval, between a downlink transmission and an uplink transmission, and types of CCA according to the present embodiment.
Figure 7B:
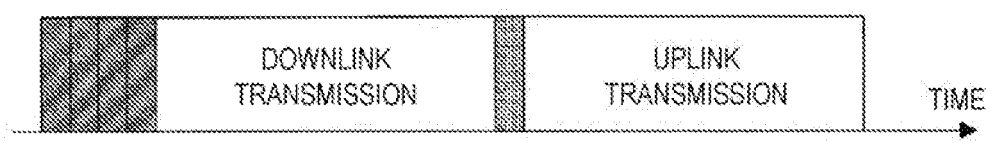
Figure 7C:
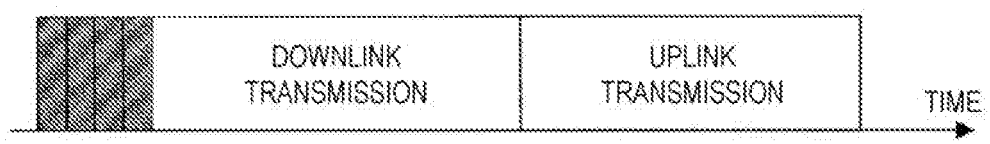
Figure 7C:
Figure 7C:
Figure 7C:

FIG. 6 illustrates an example of an LBT (LBT category 4, LBE) procedure for a downlink transmission. In a case that the need arises to transmit, to the terminal apparatus, certain information (data, a buffer, load, traffic) in the downlink while the channel is in the idle state (S601) of waiting for a downlink transmission, the base station apparatus determines whether the transmission is needed (S602) and proceeds to initial CCA (S603). In the Initial CCA, the base station apparatus performs the CCA check during an initial CCA period to sense whether the channel is idle or busy (S6031). In a case of determining that the channel is idle as a result of the initial CCA (S603), the base station apparatus acquires the right to access the channel and proceeds to a transmission operation. Then, the base station apparatus determines whether to actually perform a downlink transmission at that timing (S604), and in a case of determining to perform the downlink transmission, the base station apparatus performs the downlink transmission (S605). After performing the downlink transmission, the base station apparatus determines whether any information that needs another downlink transmission is still present (remains) (S606). In a case that no information that needs another downlink transmission has been generated yet (remains), the channel returns to the idle state (S601). On the other hand, in a case that the initial CCA (S603) results in the determination that the channel is busy or that the determination of whether any information that needs another downlink transmission is still present (remains)(S606) results in the determination that information that needs another downlink transmission is still present (remains), the base station apparatus proceeds to the extended CCA (S607). In the extended CCA, first, the base station apparatus randomly generates a counter value N within the range from 0 to q−1 (S6071). The base station apparatus then senses whether the channel is idle or busy in the ECCA defer occasion (S6072). In a case of determining that the channel is busy in the ECCA defer occasion, the base station apparatus senses again whether the channel is idle or busy in the ECCA defer occasion (S6072). On the other hand, in a case of determining that the channel is idle in the ECCA defer occasion, then the base station apparatus senses the channel (medium) during one ECCA slot duration (S6073) to determine whether the channel is idle or busy (S6074). The base station apparatus decrements the counter value N by one (S6075) in a case of determining that the channel is idle, and returns to the process of sensing the channel in the ECCA defer occasion (S6072) again in a case of determining that the channel is busy. The base station apparatus then determines whether the counter value is 0 (S6076), and in a case that the counter value is 0, proceeds to a transmission process (S604, S605). On the other hand, in a case that the counter value is not 0, the base station apparatus senses the channel (medium) during one ECCA slot duration again (S6073). Note that, in a case that the counter value N is generated, a value in a contention window q is updated to a value between X and Y according to a channel state (S6077).

The value in the contention window q is determined, for example, based on the HARQ-ACK response in the PDSCH transmitted by the base station apparatus, a power value obtained by sensing of the channel by the base station apparatus, reporting of RSRP, RSRQ, and/or RSSI, or the like. The value in the contention window q is, by way of example, exponentially increased. Furthermore, the maximum value X and the minimum value Y used to determine the value in the contention window q are parameters configured by the higher layer.

In the LBT procedure in FIG. 6, the extended CCA may not be performed. Specifically, in a case of determining that the channel is busy as a result of the initial CCA (S603), the base station apparatus may return to the idle state (S601) instead of proceeding to the extended CCA process (S607). Furthermore, even in a case that, after a downlink transmission, information that needs another downlink transmission is still present (S606), the base station apparatus may return to the idle state (S601) instead of proceeding to the extended CCA process (S607). LBT involving such a process is also referred to as LBT category 2. LBT involving such a process may be applied as LBT for a DS transmission, a PDSCH transmission with a time length of 1 ms or shorter, or a transmission only of the PDCCH, for example.

Note that CCA in the LAA cell does not need to be recognized by the terminal connected with (configured to) the LAA cell.

In a case that the terminal apparatus 1 can detect a transmission after CCA is completed in the LAA cell, the terminal apparatus 1 may assume that consecutive transmissions are performed for several subframes after detection of the first transmission. Several subframes for consecutive transmissions are also referred to as a transmission burst. In particular, several subframes for consecutive PDSCH transmissions are referred to as a PDSCH transmission burst. The PDSCH transmission burst may include a channel other than the PDSCH and/or a signal. For example, the PDSCH transmission burst may include the PDSCH and the DS and be transmitted. Moreover, in particular, several subframes for which only the DS is transmitted are referred to as a DS transmission burst. The number of subframes for consecutive transmissions through the transmission burst may be configured for the terminal apparatus 1 by using an RRC message. In the present embodiment, the transmission burst of the downlink signal or channel is also referred to as a downlink transmission, and the transmission burst of the uplink signal or channel is also referred to as an uplink transmission.

In a case of detecting a reservation signal included in the beginning of the transmission burst, the terminal apparatus can sense the transmission burst. The terminal apparatus regards several subframes following the subframe in which the reservation signal has been detected, as a transmission burst. In a case that a first synchronization signal, a second synchronization signal, or a third synchronization signal described below is detected, instead of the reservation signal, the terminal apparatus can determine the following several subframes as a transmission burst.

Furthermore, the terminal apparatus can sense a transmission burst in a case of decoding information included in the DCI and relating to a subframe indicating a transmission burst. The DCI is included in the PDCCH or EPDCCH allocated in the CSS for notification. Alternatively, the DCI may be included in the PDCCH or EPDCCH allocated in the USS for notification.

The LAA cell may be defined as a cell different from a secondary cell which uses the allocated frequency. For example, the LAA cell is configured differently from the configuration of the secondary cell which uses the allocated frequency. Part of parameters configured to the LAA cell is not configured to the secondary cell which uses the allocated frequency. Part of the parameters configured to the secondary cell which uses the allocated frequency is not configured to the LAA cell. In the present embodiment, the LAA cell is described as a cell different from the primary cell and the secondary cell(s), but the LAA cell may be defined as one of the secondary cells. Secondary cells of the related art are also referred to as "first secondary cells", and the LAA cell is also referred to as "second secondary cell". A primary cell and secondary cell(s) of the related art are also referred to as "first serving cells", and the LAA cell is also referred to as "second serving cell".

The LAA cell may be different from a frame structure type of the related art. For example, a first frame structure type (FDD, frame structure type 1) or a second frame structure type (TDD, frame structure type 2) are used for (configured to) the serving cells in the related art, and a third frame structure type (frame structure type 3) is used for (configured to) the LAA cell. Note that either an LAA cell of the first frame structure type or an LAA cell of the second frame structure type may be used (may be configured).

Moreover, the third frame structure type may preferably be a frame structure type corresponding to a TDD cell that can perform transmissions at the same frequency both in the uplink and in the downlink while having characteristics of an FDD cell. For example, the third frame structure type may have uplink subframes, downlink subframes, and special subframes but may be similar to the FDD cell in terms of an interval from reception of the uplink grant until a transmission of the PUSCH scheduled in the uplink grant or an interval from reception of the PDSCH to HARQ feedback to the PDSCH.

Furthermore, the third frame structure type may preferably be a frame structure type independent of a TDD uplink/downlink (TDD UL/DL) configuration in the related art. For example, the uplink subframes, the downlink subframes, and the special subframes may be aperiodically configured for the radio frame. For example, the uplink subframes, the downlink subframes, and the special subframes may be determined based on the PDCCH or the EPDCCH.

In the third frame structure type, 10 subframes (all subframes) of the radio frame can be used for a downlink transmission. In the third frame structure type, 10 subframes (all subframes) of the radio frame may be used for an uplink transmission. Note that subframe #0 and subframe #5 of the radio frame may not be usable for an uplink transmission. In other words, in the third frame structure type, subframes #0 and #5 of the radio frame may be used only for a downlink transmission.

A downlink transmission is occupied by one or multiple contiguous non-empty subframes. The downlink transmission may be started from any position of a subframe. The end of the downlink transmission corresponds to a boundary of subframes (a boundary between OFDM symbol #0 and OFDM symbol #13 of the preceding subframe) or is determined by a length of the DwPTS. Note that the end of the downlink transmission may correspond to a boundary between OFDM symbol #12 and OFDM symbol #13. Note that the end of the downlink transmission may correspond to a boundary between slots (a boundary between OFDM symbol #6 and OFDM symbol #7).

An uplink transmission is occupied by one or multiple contiguous non-empty subframes. It is preferred that the uplink transmission be started from a boundary between subframes. Note that the uplink transmission may also be started from any position in a subframe. The end of the uplink transmission corresponds to a boundary of subframes (a boundary between SC-FDMA symbol #0 and SC-FDMA symbol #13 of the preceding subframe), a last boundary of the SC-FDMA symbol (a boundary between SC-FDMA symbol #12 and the SC-FDMA #13) or the second to the last boundary of SC-FDMA symbol (a boundary between SC-FDMA symbol #11 and SC-FDMA symbol #12).

Note that the end of the uplink transmission may correspond to a boundary between slots (a boundary between SC-FDMA symbol #6 and SC-FDMA symbol #7). Note that a subframe in which a transmission is started from a boundary of the subframe and the transmission is ended at a boundary of the subframe is referred to as "full subframe". On the other hand, a subframe in which a transmission is started at a position other than a boundary of the subframe or the transmission is ended at a position other than a boundary of the subframe is referred to as "partial subframe".

In the LAA cell, a subframe for which a transmission of the PUSCH is indicated by the uplink grant is recognized by the terminal apparatus as being an uplink subframe. On the other hand, in the LAA cell, a subframe for which a transmission of the PUSCH is not indicated by the uplink grant is recognized by the terminal apparatus as being a downlink subframe or an empty subframe.

Alternatively, in the LAA cell, in a case that the channel is idle as sensed through LBT for an uplink transmission, the terminal apparatus recognizes that the subframe and the next subframe are uplink subframes. On the other hand, in the LAA cell, in a case that the channel is busy as sensed through LBT for an uplink transmission, the terminal apparatus recognizes that the subframe and the next subframe are downlink subframes.

Alternatively, a PDCCH with DCI CRC (CRC with DCI) scrambled by a CC-RNTI includes information indicating an uplink subframe, and a subframe indicated by the information as an uplink subframe is recognized by the terminal apparatus as being an uplink subframe. On the other hand, a subframe not indicated by the information in the PDCCH as an uplink subframe is recognized by the terminal apparatus as being a downlink subframe or an empty subframe. The information is, for example, information indicating a position of the uplink transmission and/or a length of the uplink transmission. Note that the information may not be included in the PDCCH with the DCI CRC scrambled by the CC-RNTI, and may be included and transmitted in a resource of a PHICH.

In the LAA cell, for the uplink subframe, the PDCCH with DCI CRC scrambled by the CC-RNTI may not be monitored.

Note that in the LAA cell, a subframe for which configuration of an occupancy OFDM symbol is indicated by the PDCCH with DCI CRC (CRC with DCI) scrambled by the CC-RNTI is recognized by the terminal apparatus as being a downlink subframe and is not recognized as being an uplink subframe. The occupancy OFDM symbol is an OFDM symbol used for transmission of a downlink physical channel and/or a downlink physical signal.

Here, the non-allocated frequency is a frequency different from the allocated frequency that is allocated as a dedicated frequency to a prescribed operator. For example, the non-allocated frequency is a frequency used by a wireless LAN. For example, the non-allocated frequency is a frequency which is not configured to the LTE in the related art, and the allocated frequency is a frequency which can be configured by the LTE in the related art. In the present embodiment, the frequency configured to the LAA cell is described as the non-allocated frequency, but is not limited to this. In other words, the non-allocated frequency can be replaced with a frequency configured to the LAA cell. For example, the non-allocated frequency is a frequency which cannot be configured to the primary cell, and is a frequency which can be configured only to the secondary cell(s). For example, the non-allocated frequency includes a frequency shared with multiple operators. For example, the non-allocated frequency is a frequency which is configured only to a cell configured, assumed and/or processed differently from the primary cell or secondary cell(s) of the related art.

The LAA cell may be a cell which uses a different method from the method of the related art for structures of radio frames, physical signals and/or physical channels according to LTE, and a communication procedure.

For example, in the LAA cell, prescribed signals and/or channels configured (transmitted) by the primary cell and/or the secondary cell(s) are not configured (transmitted). The prescribed signals and/or channels include the CRS, the DS, the PDCCH, the EPDCCH, the PDSCH, the PSS, the SSS, the PBCH, a PHICH, a PCFICH, the CSI-RS and/or an SIB, or the like. For example, the signals and/or the channels that are not configured in the LAA cell are as follows. In addition, the signals and/or the channels described below may be used in combination. Note that in the present embodiment, the signals and/or the channels that are not configured in the LAA cell may also be read as signals and/or channels whose transmissions from the LAA cell are not expected by the terminal.

(1) In the LAA cell, control information of a physical layer is not transmitted on the PDCCH, but is transmitted only on the EPDCCH.

(2) In the LAA cell, the CRS, the DMRS, the URS, the PDCCH, the EPDCCH and/or the PDSCH are not transmitted in subframes which are activated (on-state) or all subframes, and the terminal does not assume this transmission in all subframes.

(3) In the LAA cell, the terminal assumes transmission of the DSs, the PSSs and/or the SSSs in subframes which are activated (on-state).

(4) In the LAA cell, information of CRS mapping is announced to the terminal for each subframe, and the terminal assumes the CRS mapping based on the information. For example, according to the assumption of the CRS mapping, the CRS is not mapped onto all resource elements of the corresponding subframe. According to the assumption of the CRS mapping, the CRS is not mapped onto part of resource elements (e.g., all resource elements in two head OFDM symbols) of the corresponding subframe. According to the assumption of the CRS mapping, the CRSs are mapped onto all resource elements of the corresponding subframe. For example, the information of the CRS mapping is announced from the corresponding LAA cell or a cell different from the corresponding LAA cell. The information of the CRS mapping is included in the DCI and is announced on the PDCCH or the EPDCCH.

For example, in the LAA cell, the prescribed signals and/or channels which is not configured (transmitted) by the primary cell and/or the secondary cell(s) is configured (transmitted).

For example, in the LAA cell, only downlink component carrier or subframe is defined, and only downlink signal and/or channel are transmitted. In other words, in the LAA cell, uplink component carrier or subframe is not defined, and uplink signal and/or channel is not transmitted.

For example, in the LAA cell, a Downlink Control Information (DCI) format which can be supported is different from a DCI format which can support the primary cell and/or the secondary cell(s). The DCI format which supports only the LAA cell is defined. The DCI format which supports the LAA cell includes control information which is only valid for the LAA cell.

The terminal apparatus can recognize the LAA cell, based on a parameter provided by the higher layer. For example, the terminal apparatus can recognize a cell (band) in the related art or the LAA cell (LAA band), based on a parameter indicative of the center frequency of the component carrier. In this case, information about the center frequency is associated with the type of the cell (band).

For example, in the LAA cell, the assumption of the signals and/or channels is different from the secondary cells in the related art.

First, the assumption of the signals and/or channels in the secondary cells of the related art will be described. A terminal that satisfies part or all of the following conditions assumes that the PSS, the SSS, the PBCH, the CRS, the PCFICH, the PDSCH, the PDCCH, the EPDCCH, the PHICH, the DMRS and/or the CSI-RS may not be transmitted by the secondary cell except transmission of the DS. The terminal assumes that the DS is always transmitted by the secondary cell. The assumption continues to a subframe in which an activation command (a command for activation) is received by the terminal in the secondary cell at a certain carrier frequency.

(1) The terminal supports a configuration (parameter) associated with the DS.

(2) RRM measurements based on the DS is configured to the terminal in the secondary cell.

(3) The secondary cell is deactivated (deactivated state).

(4) Reception of the MBMS by a higher layer is not configured to the terminal in the secondary cell.

Furthermore, in a case that the secondary cell is activated (activated state), the terminal assumes that the PSS, the SSS, the PBCH, the CRS, the PCFICH, the PDSCH, the PDCCH, the EPDCCH, the PHICH, the DMRS and/or the CSI-RS are transmitted by the secondary cell in a configured prescribed subframe or all subframes.

Next, an example of the assumption of the signals and/or channels in the LAA cell will be described. A terminal that satisfies part or all of the following conditions assumes that the PSS, the SSS, the PBCH, the CRS, the PCFICH, the PDSCH, the PDCCH, the EPDCCH, the PHICH, the DMRS and/or the CSI-RS may not be transmitted together with transmission of the DS by the LAA cell. The assumption continues to a subframe in which an activation command (a command for activation) is received by the terminal in the secondary cell at a certain carrier frequency.

(1) The terminal supports a configuration (parameter) associated with the DS.

(2) RRM measurements based on the DS is configured to the terminal in the LAA cell.

(3) The LAA cell is deactivated (deactivated state).

(4) Reception of the MBMS by a higher layer is not configured to the terminal in the LAA cell.

Furthermore, another example of the assumption of the signals and/or channels in the LAA cell will be described. In a case that the LAA cell is deactivated (deactivated state), the assumption of the signals and/or channels in the LAA cell is the same as the assumption of the signals and/or channels in the secondary cells in the related art. In a case that the LAA cell is activated (activated state), the assumption of the signals and/or channels in the LAA cell is different from the assumption of the signals and/or channels in the secondary cells in the related art. In a case that, for example, the LAA cell is activated (activated state), the terminal assumes that the LAA cell may not transmit the PSS, the SSS, the PBCH, the CRS, the PCFICH, the PDSCH, the PDCCH, the EPDCCH, the PHICH, the DMRS and/or the CSI-RS except a prescribed subframe configured to the LAA cell. Details will be described below.

Furthermore, the description has been given of a case that CCA is performed on one subframe, but a time (period) for performing CCA is not limited to this. The period for performing CCA may vary per LAA cell, per CCA timing, or per execution of CCA. For example, CCA is performed at a time based on a prescribed time slot (a time interval or a time domain). This prescribed time slot may be defined or configured based on a time obtained by dividing one subframe by the prescribed number. The prescribed time slot may be determined or configured by the prescribed number of subframes.

Furthermore, in the present embodiment, a field size in the time domain such as a time (time slot) for performing CCA or a time in which the channel and/or signal are transmitted (can be transmitted) in a certain subframe can be expressed by using a prescribed time unit. For example, the field size in the time domain is expressed by some time units $T_s$. $T_s$ is $1/(15000 \times 2048)$ seconds. For example, one subframe time is $30720 \times T_s$ (one millisecond). For example, one ICCA slot length or defer period is $1044 \times T_s$ (approximately 33.98 microseconds) or $1045 \times T_s$ (approximately 34.02 microseconds). For example, one ECCA slot length is $276 \times T_s$ (approximately 8.984 microseconds) or $277 \times T_s$ (approximately 9.017 microseconds). For example, one ECCA slot length is $307 \times T$. (approximately 9.993 microseconds) or $308 \times T_s$ (approximately 10.03 microseconds).

Furthermore, whether the LAA cell can transmit the channel and/or signal (including the reservation signal) from an intermediate symbol in a certain subframe may be configured for the terminal or the LAA cell. For example, information indicating whether such transmission is possible in the configuration on the LAA cell is configured to the terminal by the RRC signaling. The terminal switches processing associated with reception (monitoring, recognition, and decoding) at the LAA cell based on the information.

Furthermore, subframes in which symbols can be transmitted from an intermediate symbol (also including subframes in which symbols up to the intermediate symbol can be transmitted) may be all subframes in LAA cell. Furthermore, subframes in which symbols can be transmitted from the intermediate symbol may be subframes defined in advance for the LAA cell or configured subframes.

Furthermore, subframes in which symbols can be transmitted from the intermediate symbol (also including subframes in which symbols up to the intermediate symbol can be transmitted) can be configured, announced or determined based on an UpLink/DownLink configuration (UL/DL configuration) according to TDD. For example, such subframes are subframes announced (designated) as special subframes by the UL/DL configuration. Each of the special subframes in the LAA cell is a subframe including at least one of the three fields, a Downlink Pilot Time Slot (DwPTS), a Guard Period (GP), and an Uplink Pilot Time Slot (UpPTS). The configuration on the special subframe in the LAA cell may be configured or announced by the RRC signaling or PDCCH or EPDCCH signaling. This configuration configures a length in time of at least one of the DwPTS, the GP and the UpPTS. Furthermore, this configuration is index information indicating candidates of the predetermined length in time. Furthermore, for this configuration, the same length in time as the DwPTS, the GP and the UpPTS used for the special subframe configuration configured to the TDD cells in the related art can be used. In other words, the length in time in which transmission is possible in a certain subframe is determined based on one of the DwPTS, the GP and the UpPTS.

Further, in the present embodiment, the reservation signal may be a signal that can be received by a LAA cell different from the LAA cell that transmits the reservation signal. For example, the LAA cell different from the LAA cell that transmits the reservation signal is the LAA cell (neighboring LAA cell) neighboring to the LAA cell that transmits the reservation signal. For example, the reservation signal includes information of a transmission state (use state) of a prescribed subframe and/or symbol in the LAA cell. In a case that the LAA cell different from the LAA cell that transmits a certain reservation signal receives the reservation signal, the LAA cell having received the reservation signal recognizes the transmission state of the prescribed subframe and/or symbol, based on the reservation signal, and performs scheduling according to the state.

Furthermore, the LAA cell having received the reservation signal may perform LBT before transmitting a channel and/or signal. This LBT is performed based on the received reservation signal. For example, during this LBT, the channels and/or the signals transmitted (assumed to be transmitted) from the LAA cell having transmitted the reservation signal are taken into consideration, scheduling including resource allocation and MCS selection is performed.

Furthermore, in a case that the LAA cell having received the reservation signal performs scheduling of transmitting the channels and/or signals based on the reservation signal, it is possible to announce information of such scheduling to one or more LAA cells including the LAA cell having transmitted this reservation signal according to a prescribed method. For example, the prescribed method is a method for transmitting the prescribed channel and/or signal including the reservation signal. Furthermore, for example, the prescribed method is a method for performing announcement via a backhaul such as an X2 interface.

Furthermore, according to Carrier Aggregation and/or dual connectivity, a terminal of the related art can configure up to five serving cells. However, the terminal according to the present embodiment can extend a maximum number of serving cells that can be configured. In other words, the terminal according to the present embodiment can configure more than five serving cells. For example, the terminal according to the present embodiment can configure up to 16 or 32 serving cells. For example, the more than five serving cells configured by the terminal according to the present embodiment include the LAA cell. Furthermore, all of the more than five serving cells configured by the terminal according to the present embodiment may be the LAA cell.

Furthermore, in a case that the more than five serving cells can be configured, a configuration on part of the serving cells may be different from the configuration of the serving cells in the related art (i.e., the secondary cell(s) in the related art). For example, differences of this configuration are as follows. The configurations described below may be used in combination.

(1) To the terminal, up to five serving cells in the related art are configured, and up to 11 or 27 serving cells different from serving cells in the related art are configured. In other words, to the terminal, in addition to a primary cell of the related art, up to four secondary cells of the related art are configured, and up to 11 or 27 secondary cells different from the secondary cells of the related art are configured.

(2) The configuration on the serving cells (secondary cells) different from the serving cells of the related art includes configurations on an LAA cell. For example, to the terminal, in addition to the primary cell in the related art, up to four secondary cells that do not include the configuration on the LAA cell are configured, and up to 11 or 27 secondary cells different from the secondary cells in the related art are configured.

Furthermore, in a case that the more than five serving cells can be configured, the base station (including the LAA cell) and/or the terminal can perform different processing or assumption compared to the case that up to five serving cells are configured. For example, differences of the processing and assumption are as follows. The processing or the assumption described below may be used in combination.

(1) Even in the case that the more than five serving cells are configured, the terminal assumes that the PDCCH, the EPDCCH and/or the PDSCH are simultaneously transmitted (received) from the five serving cells at maximum. Consequently, the terminal can use the same method as the method of the related art, for reception of the PDCCH, the EPDCCH and/or the PDSCH and transmission of HARQ-ACK for the PDSCH.

(2) In the case that the more than five serving cells are configured, a combination (group) of cells for bundling of HARQ-ACKs for the PDSCHs in these serving cells are configured to the terminal. For example, all serving cells, all secondary cells, all LAA cells or all secondary cells different from the secondary cells in the related art include information (configuration) on bundling of HARQ-ACKs between the serving cells. For example, the information of the bundling of HARQ-ACKs between the serving cells is an identifier (an index or an ID) for performing the bundling. For example, the bundling is performed on the HARQ-ACKs over cells having the same identifier to be bundled. This bundling is performed according to a logical AND operation for the target HARQ-ACKs. Furthermore, the maximum number of identifiers to be bundled can be five. Furthermore, the maximum number of identifiers to be bundled can be five including the number of cells that does not perform bundling. In other words, the number of groups to perform bundling over the serving cells can be five at maximum. Consequently, the terminal can use the same method as the method of the related art, for reception of the PDCCH, the EPDCCH and/or the PDSCH and transmission of HARQ-ACK for the PDSCH.

(3) In the case that the more than five serving cells are configured, a combination (group) of cells for multiplexing of HARQ-ACKs for the PDSCHs in these serving cells are configured to the terminal. In the case that the combination (group) of the cells for multiplexing of the HARQ-ACKs for the PDSCHs is configured, the multiplexed HARQ-ACKs are transmitted on the PUCCH or the PUSCH based on the group. The maximum number of serving cells to be multiplexed is defined or configured for each group. The maximum number is defined or configured based on the maximum number of serving cells configured to the terminal. For example, the maximum number is the same as the maximum number of serving cells configured to the terminal, or half the maximum number of serving cells configured to the terminal. Furthermore, the maximum number of PUCCHs to be simultaneously transmitted is defined or configured based on the maximum number of serving cells to be multiplexed in each group and the maximum number of serving cells configured to the terminal.

In other words, the number of configured first serving cells (i.e., the primary cell and/or the secondary cell(s)) is a prescribed number (i.e., five) or less. A total of the configured first serving cells and second serving cell (i.e., LAA cell) exceeds the prescribed number.

Next, terminal capability associated with LAA will be described. The terminal announces (transmits) information (terminal capability) on capability of the terminal to the base station by the RRC signaling, based on a command from the base station. The terminal capability of a certain function (feature) is announced (transmitted) in a case that the function (feature) is supported, and is not announced (transmitted) in a case that the function (feature) is not supported. Furthermore, the terminal capability of the certain function (feature) may be information indicating whether testing and/or mounting this function (feature) has been finished. For example, the terminal capability according to the present embodiment is as follows. The terminal capability described below may be used in combination.

(1) The terminal capability associated with support of the LAA cell, and the terminal capability associated with support of a configuration of more than five serving cells are independently defined. For example, the terminal that supports the LAA cell supports the configuration of the more than five serving cells. In other words, the terminal that does not support the configuration of the more than five serving cells does not support the LAA cell. In this case, the terminal that supports the configuration of the more than five serving cells may or may not support the LAA cell.

(2) The terminal capability associated with support of the LAA cell, and the terminal capability associated with support of a configuration of more than five serving cells are independently defined. For example, the terminal that supports the configuration of the more than five serving cells supports the LAA cell. In other words, the terminal that does not support the LAA cell does not support the configuration of the more than five serving cells. In this case, the terminal that supports the LAA cell may or may not support the configuration of the more than five serving cells.

(3) The terminal capability associated with downlink in the LAA cell, and the terminal capability associated with uplink in the LAA cell are independently defined. For example, the terminal that supports the uplink in the LAA cell supports the downlink in the LAA cell. In other words, the terminal that does not support the downlink in the LAA cell does not support the uplink in the LAA cell. In this case, the terminal that supports the downlink in the LAA cell may or may not support the uplink in the LAA cell.

(4) The terminal capability associated with support of the LAA cell includes support of a transmission mode configured only to the LAA cell.

(5) The terminal capability associated with the downlink according to the configuration of the more than five serving cells, and the terminal capability associated with the uplink according to the configuration of the more than five serving cells serving cells are independently defined. For example, the terminal that supports the uplink according to the configuration of the more than five serving cells supports the downlink according to the configuration of the more than five serving cells. In other words, the terminal that does not support the downlink according to the configuration of the more than five serving cells does not support the uplink according to the configuration of the more than five serving cells. In this case, the terminal that supports the downlink according to the configuration of the more than five serving cells may or may not support the uplink according to the configuration of the more than five serving cells.

(6) Regarding the terminal capability according to the configuration of the more than five serving cells, terminal capability that supports a configuration of 16 downlink serving cells (component carriers) at maximum, and terminal capability that supports a configuration of 32 downlink serving cells at maximum are independently defined. Furthermore, the terminal that supports the configuration of 16 downlink serving cells at maximum supports the configuration of at least one uplink serving cell. The terminal that supports the configuration of 32 downlink serving cells at maximum supports the configuration of at least two uplink serving cells. That is, the terminal that supports the configuration of 16 downlink serving cells at maximum may not support the configuration of two or more uplink serving cells.

(7) The terminal capability associated with the support of the LAA cell is announced based on a frequency (band) used by the LAA cell. In a case that, for example, the terminal announces a supported frequency or a frequency combination, and the announced frequency or frequency combination includes at least one frequency used by the LAA cell, the terminal implicitly announces that this terminal supports the LAA cell. In other words, in a case that the announced frequency or frequency combination does not include the frequency used by the LAA cell at all, the terminal implicitly announces that this terminal does not support the LAA cell.

Furthermore, the present embodiment has described a case where the LAA cell transmits the PDCCH or the EPDCCH for announcing the DCI for the PDSCH transmitted from this LAA cell (i.e., a case of self scheduling), but is not limited to this. The method described in the present embodiment is applicable also in a case that, for example, a serving cell different from the LAA cell transmits the PDCCH or the EPDCCH for announcing the DCI for the PDSCH transmitted from the LAA cell (i.e., a case of cross carrier scheduling).

Furthermore, in the present embodiment, the information for recognizing the symbols in which the channels and/or signals are transmitted may be based on the symbols in which the channels and/or signals are not transmitted. For example, this information is information indicating the last symbol of the symbols in which the channels and/or signals are not transmitted. Furthermore, the information for recognizing the symbols in which the channels and/or signals are transmitted may be determined based on other information or parameters.

Furthermore, in the present embodiment, the symbols in which the channels and/or signals are transmitted may be independently configured (announced or defined) to the channels and/or signals. In other words, the information for recognizing the symbols in which the channels and/or signals are transmitted, and the announcement method of the information can be independently configured (announced or defined) to the channels and/or signals. For example, the information for recognizing the symbols in which the channels and/or signals are transmitted, and the announcement method of the information may be independently configured (announced or defined) for the PDSCH and the EPDCCH.

Furthermore, in the present embodiment, symbols/subframes in which the channels and/or signals are not transmitted (cannot be transmitted) may be symbols/subframes in which the channels and/or signals are not assumed to be transmitted (be able to be transmitted) from a viewpoint of the terminal. That is, the terminal can regard that the LAA cell does not transmit the channels and/or signals in the symbols/subframes.

Furthermore, in the present embodiment, the symbols/subframes in which the channels and/or signals are transmitted (can be transmitted) may be symbols/subframes in which the channels and/or signals assumed to be transmitted from the viewpoint of the terminal. In other words, the terminal can regard that the LAA cell may or may not transmit the channels and/or signals in the symbols/subframes.

Furthermore, in the present embodiment, the symbols/subframes in which the channels and/or signals are transmitted (can be transmitted) may be symbols/subframes in which the channels and/or signals are assumed to be surely transmitted from the viewpoint of the terminal. That is, the terminal can regard that the LAA cell surely transmits the channels and/or signals in the symbols/subframes.

Next, an example of a configuration of a downlink reference signal in the LAA cell will be described.

Figure 5:
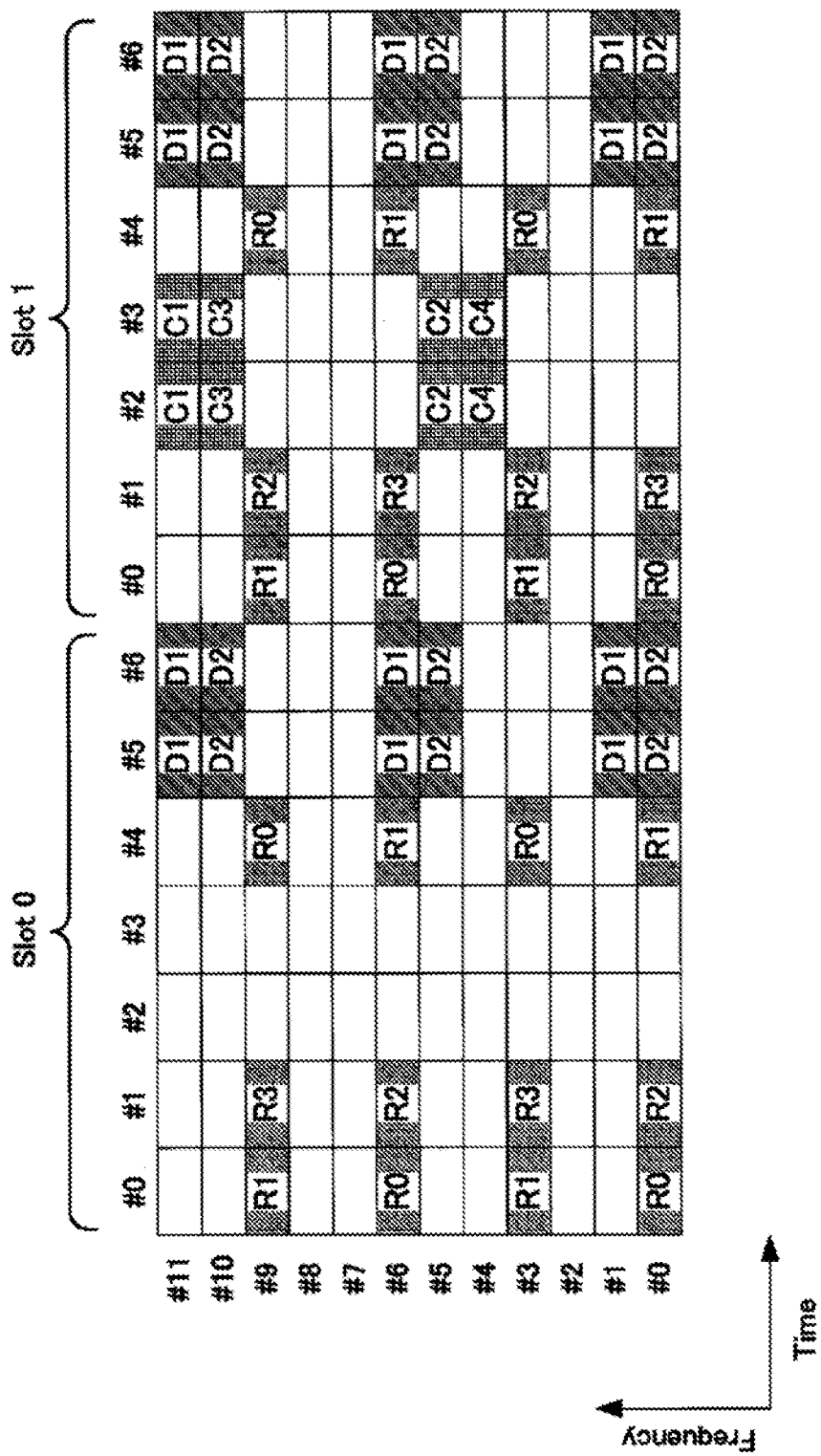
FIG. 5 is a diagram illustrating an example of a downlink signal configuration according to the present embodiment.

FIG. 5 is a diagram illustrating an example of the configuration of the downlink reference signal. By way of example, the CRSs can be mapped to REs R0 to R3. R0 denotes examples of the REs on which the CRS of antenna port 0 is mapped, R1 denotes examples of the REs on which the CRS of antenna port 1 is mapped, R2 denotes examples of the REs on which the CRS of antenna port 2 is mapped, and R3 denotes examples of the REs on which the CRS of antenna port 3 is mapped. Note that the CRSs may be shifted, for mapping, in the frequency direction according to a parameter associated with the cell identity. Specifically, an index k for which the RE specifies mapping is increased based on a value of $N^{cell}_{ID}$ mod 6. Here, Nell denotes the value of the physical cell identity. The DMRSs can be mapped to REs D1 and D2. D1 denotes examples of the REs on which the DMRSs of antenna ports 7, 8, 11, 13 are mapped, and D2 denotes examples of the REs on which the DMRSs of antenna ports 9, 10, 12, 14 are mapped. The CSI-RSs can be mapped to REs C1 to C4. C0 denotes examples of the REs on which the CSI-RSs of antenna ports 15, 16 are mapped, C1 denotes examples of the REs on which the CSI-RSs of antenna ports 17, 18 are mapped, C2 denotes examples of the REs on which the CSI-RSs of antenna ports 19, 20 are mapped, and C3 denotes examples of the REs on which the CSI-RSs of antenna ports 21, 22 are mapped. Note that the CSI-RS may be mapped to the RE at OFDM symbol #5 or #6 in slot 0 and to the RE at OFDM symbol #1, #2, or #3 in slot 1. The REs on which the CSI-RS is mapped are indicated based on a parameter provided by the higher layer.

Next, the relationship between a downlink transmission, an uplink transmission, and LBT will be described.

FIG. 7 illustrates an example of the relationship between the interval between a downlink transmission and an uplink transmission and types of LBT on the time axis according to the present embodiment. In FIG. 7A, a case where the downlink transmission and the uplink transmission are sufficiently distant from each other on the time axis is illustrated. In the case where the downlink transmission and the uplink transmission are sufficiently distant from each other, for example, the interval between the downlink transmission and the uplink transmission is at least one subframe (1 millisecond). In such a case, there is no channel state (channel sensing result) correlation between the downlink transmission and the uplink transmission, thus leading to the need to perform LBT involving sufficient carrier sensing on each transmission. Here, LBT performed before the uplink transmission in FIG. 7A is referred to as first uplink LBT. In FIG. 7B, a case where the downlink transmission and the uplink transmission are slightly distant from each other on the time axis is illustrated. In the case where the downlink transmission and the uplink transmission are slightly distant from each other, for example, the interval between the downlink transmission and the uplink transmission corresponds to several symbols (several tens of microseconds to several hundred microseconds). In such a case, CCA performed before the downlink transmission may be considered to allow the channel state (channel sensing result) to be also maintained before the uplink transmission. Thus, the terminal apparatus may perform simplified CCA before transmitting an uplink signal. Here, LBT performed before the uplink transmission in FIG. 7B is referred to as second uplink LBT. In FIG. 7C, a case where the downlink transmission and the uplink transmission are not substantially distant from each other on the time axis is illustrated. In the case where the downlink transmission and the uplink transmission are not substantially distant from each other, for example, the interval between the downlink transmission and the uplink transmission is several microseconds to several tens of microseconds, such as 34 microseconds or 40 microseconds. In such a case, a channel is reserved for the uplink transmission by the downlink transmission, and thus, the downlink transmission and the uplink transmission may be regarded as one transmission burst. Thus, the terminal apparatus may perform an uplink transmission without performing CCA. As in these examples, the uplink signal and/or channel can be efficiently transmitted also in the LAA cell by changing the LBT procedure to be performed, according to the interval between the downlink transmission and the uplink transmission.

The uplink transmission and the downlink transmission in FIG. 7 may be interchanged with each other. In other words, downlink LBT may be omitted in a case that the uplink transmission and the downlink transmission are not substantially distant from each other on the time axis.

Details of uplink LBT will be described below.

"Before performing an uplink transmission" or "before transmitting the uplink" means before an indicated timing (subframe) for the uplink transmission.

In the first uplink LBT, the CCA check is performed multiple times using the backoff counter before the indicated timing for the uplink transmission. The terminal apparatus attempts the CCA check the number of times equal to a value in the backoff counter. In a case that all the CCA checks result in the determination that the channel is idle, the terminal apparatus can acquire the right to access the channel to transmit the uplink.

Figure 8:
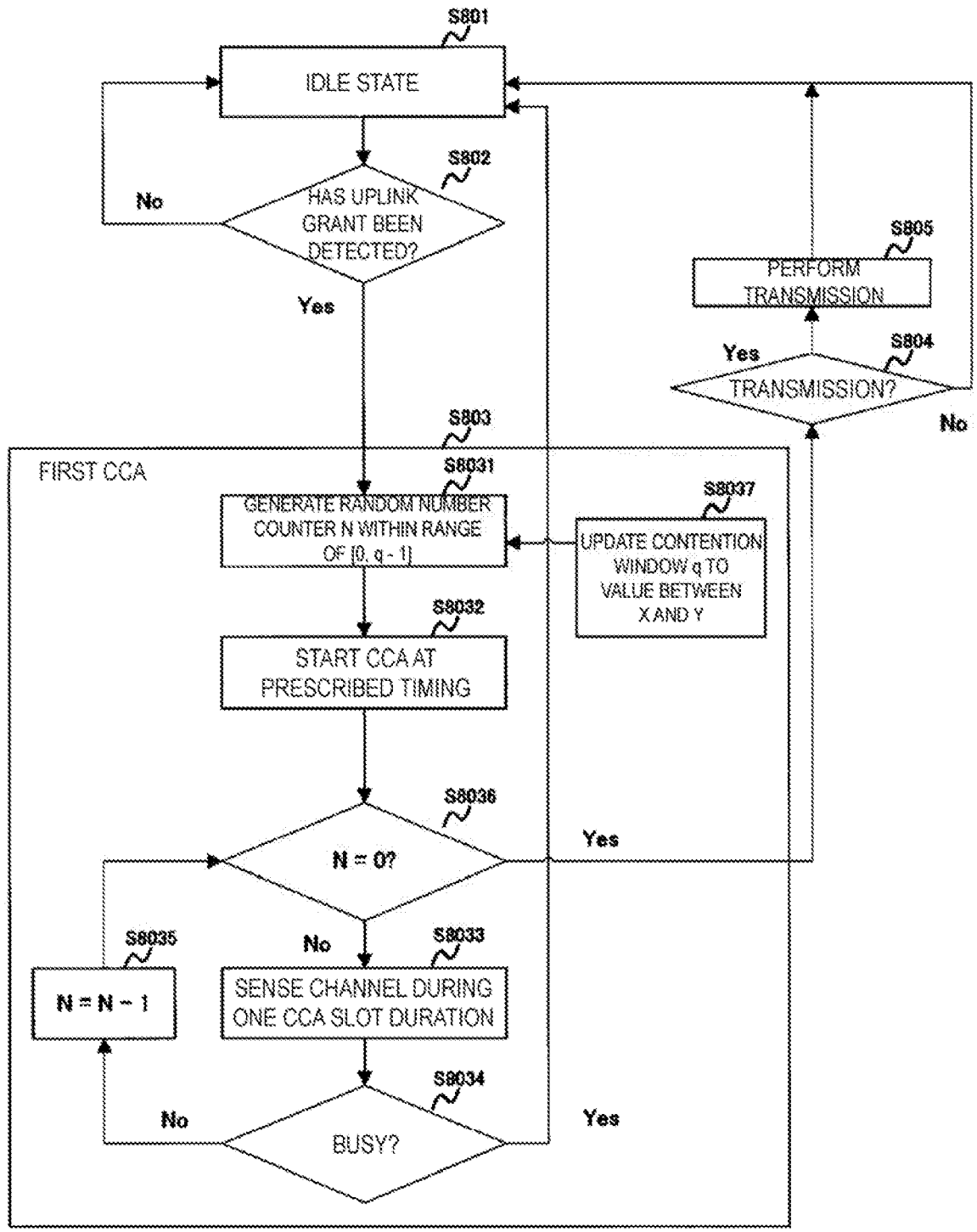
FIG. 8 is a diagram illustrating an example of a procedure of CCA for an uplink transmission according to the present embodiment.

FIG. 8 illustrates an example of a procedure of the first uplink LBT. In a case of detecting the uplink grant (S802) in the idle state (S801), the terminal apparatus performs first CCA (S803). In the first CCA, first, the terminal apparatus randomly generates a counter value N within the range from 0 to q−1 (S8031). Note that, in a case that a numerical value associated with the counter value N is indicated by the base station apparatus using the uplink grant, the terminal apparatus uses the counter value N based on the numerical value instead of generating a counter value. Note that, in a case that the last LBT has not set the counter value to 0, with a value remaining in the counter, the terminal apparatus may use the remaining counter value N instead of generating a counter value N. Then, the terminal apparatus starts CCA at a prescribed timing (S8032). The terminal apparatus senses the channel (medium) during one CCA slot duration (S8033) to determine whether the channel is idle or busy (S8034). The terminal apparatus decrements the counter value N by one (S8035) in a case of determining that the channel is idle, and returns to the idle state (S801) instead of performing the uplink transmission indicated by the uplink grant in a case of determining that the channel is busy. The terminal apparatus then determines whether the counter value is 0 (S8036), and in a case that the counter value is 0, acquires the right to access the channel and proceeds to a transmission operation (S804, S805). On the other hand, in a case that the counter value is not 0, the terminal apparatus senses the channel (medium) during one CCA slot duration again (S8033). Note that, in a case that the counter value N is generated, the value in the contention window q is updated to a value between X and Y according to the channel state (S8037). In a transmission process, the terminal apparatus determines whether to actually perform an uplink transmission at that timing (S804), and in a case of determining to perform the uplink transmission, performs the uplink transmission (S805). In a case of determining not to perform the uplink transmission, the terminal apparatus returns to the idle state (S801) instead of performing the uplink transmission indicated by the uplink grant.

The period of the first CCA may preferably be the same as the ECCA period in the downlink LBT.

Note that the ICCA may be performed before the first CCA as is the case with the downlink LBT. However, even in a case that the ICCA results in the determination that the channel is idle, the uplink is not transmitted and the procedure proceeds to the first CCA operation.

In the second uplink LBT, the CCA check is performed only once before the instructed timing for the uplink transmission. The terminal apparatus attempts the CCA check once. In a case of determining that the channel is idle as a result of the CCA check, the terminal apparatus can acquire the right to access the channel to transmit the uplink.

FIG. 9 illustrates an example of a procedure of the second uplink LBT. In a case of detecting the uplink grant (S902) in the idle state (S901), the terminal apparatus performs second CCA (S903). In the second CCA, the terminal apparatus starts CCA at a prescribed timing (S9031). The terminal apparatus performs the CCA check during a CCA period to sense whether the channel is idle or busy (S9032). In a case of determining that the channel is idle as a result of the second CCA (S903), the base station apparatus acquires the right to access the channel and proceeds to a transmission operation. On the other hand, in a case of determining that the channel is busy as a result of the second CCA (S903), the terminal apparatus returns to the idle state (S901) instead of performing the uplink transmission indicated by the uplink grant. After proceeding to the transmission operation, the terminal apparatus determines whether to actually perform an uplink transmission at that timing (S904), and in a case of determining to perform the uplink transmission, the terminal apparatus performs the uplink transmission (S905). In a case of determining not to perform the uplink transmission, the terminal apparatus returns to the idle state (S901) instead of performing the uplink transmission indicated by the uplink grant.

The period of the second CCA may preferably be the same as the ICCA period in the downlink LBT.

Differences between the downlink LBT and the uplink LBT will be detailed below.

In the downlink LBT, the base station apparatus performs the CCA check. On the other hand, in the uplink LBT, the terminal apparatus performs the CCA check.

In the downlink LBT, LBT processing is started in a case that information (data, buffer, load, traffic) that needs to be transmitted has occurred. On the other hand, for the uplink LBT, LBT processing is started in a case that an uplink transmission is indicated by the base station apparatus.

Note that the ICCA period of the downlink LBT may preferably be the same as the period of the second CCA. Note that the ECCA period of the downlink LBT may preferably be the same as the period of the first CCA.

Next, specific examples are provided regarding switching between a case of transmitting the uplink following the first uplink LBT and a case of transmitting the uplink following the second uplink LBT or transmitting the uplink with no uplink LBT.

By way of example, the procedure of the uplink LBT is switched based on a prescribed field included in the uplink grant (DCI format 0 or 4) indicating an uplink transmission.

The prescribed field refers to, for example, 1-bit information specifying the uplink LBT for the terminal apparatus. In other words, the prescribed field refers to 1-bit information indicating whether the channel has been successfully reserved (provided) in the subframe immediately before the subframe indicated by the uplink grant. In a case that a prescribed 1 bit is indicative of 0 (false, invalid, impossible), the terminal apparatus performs the first uplink LBT before the uplink transmission. In a case that the prescribed 1 bit is indicative of 1 (true, valid, possible), the terminal apparatus performs the second uplink LBT before the uplink transmission or performs no uplink LBT.

Alternatively, the prescribed field refers to, for example, information associated with the counter value N used in the first uplink LBT. In a case that the prescribed field is 0 (invalid, impossible), the terminal apparatus performs the second uplink LBT before the uplink transmission or performs no uplink LBT. On the other hand, in a case that the prescribed field contains a numerical value other than 0 (invalid, impossible), the terminal apparatus generates a counter value N, based on the numerical value to perform the first uplink LBT.

The information associated with the counter value N is, for example, the counter value N. The terminal apparatus sets the value of the prescribed field at the counter value N instead of generating a counter value N by itself.

Moreover, the information associated with the counter value N is, for example, index information indicative of the configured counter value N. In a case that multiple candidates for the counter value N are configured for the terminal apparatus by dedicated RRC and that the value in the prescribed field has been acquired, the configured counter value N corresponding to the information in the field is used.

Moreover, the information associated with the counter value N is, for example, information associated with the contention window q. Multiple candidates for the contention window q are configured for the terminal apparatus by the dedicated RRC. In a case of acquiring the value in the prescribed field, the terminal apparatus generates a counter value N by using the configured value of the contention window q corresponding to the information in the field. Note that the information associated with the contention window q may be the value of the contention window q.

Note that the above-described examples may include switching between a case of transmitting the uplink following the second uplink LBT and a case of transmitting the uplink with no uplink LBT. Specifically, in a case that the prescribed 1 bit is indicative of 0, the terminal apparatus performs the second uplink LBT before the uplink transmission. On the other hand, in a case that the prescribed 1 bit is indicative of 1 (true, valid, possible), the terminal apparatus performs no uplink LBT before the uplink transmission.

The information in the prescribed field may be information indicating whether to generate a gap where LBT is to be performed. For example, in a case that 1 bit in the prescribed field is 1, the terminal apparatus transmits the PUSCH with a gap of prescribed SC-FDMA symbols before the transmission. In a case that the 1 bit in the prescribed field is 0, the terminal apparatus transmits the PUSCH with no gap of prescribed SC-FDMA symbols before the transmission. The prescribed SC-FDMA symbols are, for example, several SC-FDMA symbols at the beginning or end of the subframe or a slot at the beginning or the end of the subframe.

Note that the prescribed field may be used along with any other field. For example, the procedure of the uplink LBT may be switched in accordance with an SRS request field. Specifically, the terminal apparatus performs the second uplink LBT before the uplink transmission in a case that the SRS request field is indicative of 0, and performs no uplink LBT in a case that the SRS request field is indicative of 1. In a case that the SRS request field is indicative of 0, nothing is transmitted in the last one SC-FDMA symbol of the subframe. The terminal apparatus performs the second uplink LBT in the last one SC-FDMA symbol.

By way of example, the procedure of the uplink LBT is switched based on a prescribed field included in DCI different from an uplink grant.

The DCI different from the uplink grant refers to, for example, DCI for notifying the terminal apparatus whether the downlink transmission (transmission burst) has been performed in a subframe indicated in the DCI. Specifically, the subframe indicated in the DCI includes a subframe immediately before the uplink transmission, and a prescribed field in the DCI is information corresponding to a notification as to whether the downlink transmission is to be performed. In a case that the prescribed field in the DCI indicates that the downlink transmission is not to be performed, the terminal apparatus performs the first uplink LBT before the uplink transmission. On the other hand, in a case that the prescribed field in the DCI indicates that the downlink transmission is to be performed, the terminal apparatus performs the second uplink LBT before the uplink transmission or performs no uplink LBT.

The information notified in the DCI different from the uplink grant is, for example, the length of the downlink transmission. The information is indicative of the beginning and/or end of the downlink transmission. Predefinition or pre-configuration of the length of the downlink transmission allows the terminal apparatus to recognize the length of the downlink transmission, based only on the information about the beginning or end of the downlink transmission. As an example, in a case that the length corresponds to one subframe and that the information in the DCI indicates that the downlink transmission starts at the beginning of a prescribed subframe, the terminal apparatus recognizes that the downlink transmission is to be performed in the one indicated sub frame.

Moreover, the DCI different from the uplink grant may preferably be mapped in the non-LAA cell. Specifically, the DCI is mapped in the common search space present in the primary cell or the primary secondary cell, and one piece of DCI allows notification of information corresponding to multiple serving cells.

Furthermore, the DCI different from the uplink grant is scrambled with dedicated RNTI different from C-RNTI (RNTI for downlink transmission notification only, B-RNTI). The RNTI for downlink transmission notification may preferably only be configured individually for multiple terminal apparatuses but may be configured with a value common to the terminal apparatuses.

Moreover, the DCI different from the uplink grant, for example, has the same format size as that of DCI format 1C used for very small-scale scheduling for one PDSCH codeword, notification of an MCCH change, or TDD reconfiguration. Alternatively, the DCI, for example, has the same format size as that of DCI format 3 or DCI format 3A used to transmit a TPC command for the PUCCH or the PUSCH.

Note that the DCI different from the uplink grant may correspond to a notification as to whether the uplink transmission (transmission burst) has been performed in a subframe indicated in the DCI.

Note that the above-described examples may include switching between a case of transmitting the uplink following the second uplink LBT and a case of transmitting the uplink with no uplink LBT. Specifically, in a case that the prescribed field in the DCI indicates that the downlink transmission is not to be performed, the terminal apparatus performs the second uplink LBT before the uplink transmission. On the other hand, in a case that the prescribed field in the DCI indicates that the downlink transmission is to be performed, the terminal apparatus performs no uplink LBT before the uplink transmission.

By way of example, the procedure of the uplink LBT is switched according to the type of uplink channel or signal scheduled to be transmitted.

For example, the terminal apparatus performs the first uplink LBT before a transmission of the PUSCH. The terminal apparatus performs the second uplink LBT before the PRACH or performs no uplink LBT.

For example, the terminal apparatus performs the first uplink LBT before a transmission of the SRS with the PUSCH. The terminal apparatus performs the second uplink LBT before the SRS without the PUSCH or performs no uplink LBT.

By way of example, the procedure of the uplink LBT is switched depending on whether a transmission of a downlink signal or channel from a cell to which the terminal apparatus is connected has been detected before the terminal apparatus transmits the uplink.

For example, a comparison between the received power of the CRS and a threshold is used as a reference for detection of a transmission of a downlink signal or channel from the cell to which the terminal apparatus is connected. In a case that the terminal apparatus determines that the received power of an RE on which the CRS of antenna port 0 (or antenna port 1, 2, 3) is mapped is smaller than a prescribed threshold in the subframe immediately before the subframe for the uplink transmission, the terminal apparatus performs the first uplink LBT before the uplink transmission. On the other hand, in a case that the terminal apparatus determines that the received power of the RE on which the CRS of antenna port 0 (or antenna port 1, 2, 3) is mapped exceeds the prescribed threshold in the subframe immediately before the subframe for the uplink transmission, the terminal apparatus performs the second uplink LBT before the uplink transmission or performs no uplink LBT.

For example, whether the reservation signal has been successfully detected is used as the reference for detection of a transmission of the downlink signal or channel from the cell to which the terminal apparatus is connected. In a case that the length of the downlink transmission is predefined or pre-configured and that the terminal apparatus has successfully detected the reservation signal, whether the downlink transmission is to be performed in the subframe immediately before the subframe for the uplink transmission can be determined based on the time of the detection of the reservation signal (subframe, symbol, RE, Ts) and the length of the reservation signal. In a case of determining that the downlink transmission is not to be performed in the subframe immediately before the subframe for the uplink transmission, the terminal apparatus performs the first uplink LBT before the uplink transmission. On the other hand, in a case of determining that the downlink transmission is to be performed in the subframe immediately before the subframe for the uplink transmission, the terminal apparatus performs the second uplink LBT before the uplink transmission or performs no uplink LBT. A reference as to whether the terminal apparatus has successfully detected the reservation signal is, for example, a comparison between the received power of the RE to which the reservation signal is assigned and a prescribed threshold.

For example, whether the PDCCH or the EPDCCH has successfully been detected is used as the reference for detection of a transmission of the downlink signal or channel from the cell to which the terminal apparatus is connected. In a case that the PDCCH or the EPDCCH has successfully been decoded in the subframe immediately before the subframe for the uplink transmission, the terminal apparatus can recognize that the subframe is reserved by the terminal apparatus as a downlink subframe. In other words, in a case that the PDCCH or the EPDCCH has successfully been decoded in the subframe immediately before the subframe for the uplink transmission, the terminal apparatus performs the first uplink LBT before the uplink transmission. On the other hand, in a case that the decoding of the PDCCH or the EPDCCH fails in the subframe immediately before the subframe for the uplink transmission, the terminal apparatus performs the second uplink LBT before the uplink transmission or performs no uplink LBT.

For example, whether the PDSCH has successfully been detected is used as the reference for detection of a transmission of the downlink signal or channel from the cell to which the terminal apparatus is connected. In a case that the PDSCH has successfully been decoded in the subframe immediately before the subframe for the uplink transmission, the terminal apparatus can recognize that the subframe is reserved by the base station apparatus as a downlink subframe. In other words, in a case that the PDSCH has successfully been decoded in the subframe immediately before the subframe for the uplink transmission, the terminal apparatus performs the first uplink LBT before the uplink transmission. On the other hand, in a case that the decoding of the PDSCH fails in the subframe immediately before the subframe for the uplink transmission, the terminal apparatus performs the second uplink LBT before the uplink transmission or performs no uplink LBT.

For example, whether the DMRS has successfully been detected is used as the reference for detection of a transmission of the downlink signal or channel from the cell to which the terminal apparatus is connected. In a case that the DMRS has successfully been detected in the subframe immediately before the subframe for the uplink transmission, the terminal apparatus can recognize that the subframe is reserved by the base station apparatus as a downlink subframe. In other words, in a case that the DMRS has successfully been decoded in the subframe immediately before the subframe for the uplink transmission, the terminal apparatus performs the first uplink LBT before the uplink transmission. On the other hand, in a case that the DMRS has successfully been detected in the subframe immediately before the subframe for the uplink transmission, the terminal apparatus performs the second uplink LBT before the uplink transmission or performs no uplink LBT. The reference as to whether the terminal apparatus has successfully detected the reservation signal is, for example, a comparison between the received power of an RE to which the DMRS is assigned and a prescribed threshold. In other words, the reference is a comparison between the received power of antenna port 7 or 9 and the prescribed threshold.

By way of example, the procedure of the uplink LBT is switched depending on whether the terminal apparatus has transmitted any uplink signal or channel before transmitting the uplink.

For example, in a case that the terminal apparatus has transmitted the PUSCH in the subframe immediately before the subframe for the uplink transmission, the transmission can be performed without LBT in this subframe because the channel has successfully been reserved for the subframe as an uplink subframe. In other words, in a case that the terminal apparatus has not transmitted the PUSCH in the subframe immediately before the subframe for the uplink transmission, the terminal apparatus performs the first uplink LBT or the second uplink LBT before the uplink transmission. On the other hand, in a case that the terminal apparatus has transmitted the PUSCH in the subframe immediately before the subframe for the uplink transmission, the terminal apparatus performs no uplink LBT.

For example, in a case that the terminal apparatus has transmitted the SRS in the subframe immediately before the subframe for the uplink transmission, the transmission can be performed without LBT because the channel has successfully been reserved for the subframe as an uplink subframe. In other words, in a case that the terminal apparatus has not transmitted the SRS in the subframe immediately before the subframe for the uplink transmission, the terminal apparatus performs the first uplink LBT or the second uplink LBT before the uplink transmission. On the other hand, in a case of having transmitted the SRS in the subframe immediately before the subframe for the uplink transmission, the terminal apparatus performs no uplink LBT.

For example, in a case that the terminal apparatus has transmitted the PRACH in the subframe immediately before the subframe for the uplink transmission, the transmission can be performed in this subframe without LBT because the channel has been successfully reserved for the subframe as an uplink subframe. In other words, in a case that the terminal apparatus has not transmitted the PRACH in the subframe immediately before the subframe for the uplink transmission, the terminal apparatus performs the first uplink LBT or the second uplink LBT before the uplink transmission. On the other hand, in a case of having transmitted the PRACH in the subframe immediately before the subframe for the uplink transmission, the terminal apparatus performs no uplink LBT.

By way of example, the procedure of the uplink LBT is switched according to the configuration provided by the higher layer.

The configuration provided by the higher layer refers to, for example, configuration information specifying the procedure of the uplink LBT. In a case that a configuration specifying the first uplink LBT is provided for the terminal apparatus, the terminal apparatus performs the first uplink LBT before an uplink transmission in the LAA cell for the terminal apparatus. In a case that a configuration specifying the second uplink LBT is provided for the terminal apparatus, the terminal apparatus performs the second uplink LBT before an uplink transmission in the LAA cell for the terminal apparatus. In a case that a configuration specifying that no uplink LBT is performed for the terminal apparatus is provided, the terminal apparatus performs no uplink LBT before performing the uplink transmission in the LAA cell.

The configuration provided by the higher layer refers to, for example, a configuration for cross carrier scheduling for the LAA cell. In a case that the cross carrier scheduling is configured for the LAA cell, the terminal apparatus performs the first uplink LBT. In a case that self scheduling is configured for the LAA cell (in other words, in a case that the cross carrier scheduling is not configured for the LAA cell), the terminal apparatus performs the second uplink LBT or performs no uplink LBT. In other words, in a case that the PDCCH or the EPDCCH in the uplink grant for scheduling of the uplink transmission for the LAA cell is configured to be monitored for a cell other than the LAA cell, the terminal apparatus performs the first uplink LBT before the uplink transmission. On the other hand, in a case that the PDCCH or the EPDCCH in the uplink grant for scheduling of the uplink transmission for the LAA cell is not configured to be monitored for other than the LAA cell, the terminal apparatus performs the second uplink LBT before the uplink transmission or performs no uplink LBT.

The cross carrier scheduling may be configured for each of the downlink grant and the uplink grant. In that case, the above-described examples of switching are regarded as switching as to whether the uplink grant is configured as the cross carrier scheduling.

The configuration provided by the higher layer refers to, for example, configuration of information indicative of a nation(s) where the LAA cell is operated. In a case that the information is indicative of a particular nation(s) (for example, Japan or the Europe), the terminal apparatus performs the first uplink LBT before the uplink transmission for the LAA cell. On the other hand, in a case that the information is indicative of a country other than the particular nation(s) (for example, the U.S. or China), the terminal apparatus performs the second uplink LBT before the uplink transmission for the LAA cell or performs no uplink LBT. The information indicative of the nation(s) where the LAA cell is operated is, for example, Public Land Mobile Network (PLMN). The PLMN is an identifier indicative of a country and an operator. The PLMN is included in the SIB1 and notified to the terminal apparatus. Note that the procedure of the uplink LBT may be switched according to the operating band in addition to the information about the nation(s) where the LAA cell is operated. The information indicative of the operating band can be identified in information about the center frequency of the carrier (EARFCN value) configured by the higher layer.

The particular country is a country where LBT needs to be performed. The country information and the capability of the terminal apparatus may be associated with each other. In other words, the terminal apparatus may be linked with the particular nation(s) in such a manner that the capability required for the terminal apparatus is specified.

The configuration provided by the higher layer refers to, for example, configuration of the first uplink LBT. The procedure of the uplink LBT is switched depending on whether the first uplink LBT has been configured for the terminal apparatus. Specifically, in a case that the first uplink LBT has been configured by the higher layer, the terminal apparatus performs the first uplink LBT before the uplink transmission for the LAA cell. On the other hand, in a case that the first uplink LBT has not been configured by the higher layer, the terminal apparatus performs the second uplink LBT before the uplink transmission for the LAA cell or performs no uplink LBT. The configuration of the first uplink LBT includes, for example, information about the range X and Y for determination of the contention window q, a CCA slot length, a CCA threshold, and the like.

Note that the procedure of the uplink LBT may be switched depending on whether the second uplink LBT has been configured for the terminal apparatus. Specifically, in a case that the second uplink LBT has been configured by the higher layer, the terminal apparatus performs the first uplink LBT before the uplink transmission for the LAA cell. On the other hand, in a case that the second uplink LBT has been configured by the higher layer, the terminal apparatus performs the second uplink LBT before the uplink transmission for the LAA cell. The configuration of the second uplink LBT includes, for example, the value of the contention window q, the CCA slot length, the CCA threshold, and the like.

The configuration of the first uplink LBT and the configuration of the second uplink LBT may preferably be specific to each cell. Note that one piece of configuration information may be configured commonly for all the cells configured as serving cells. This is not applicable to non-LAA cells configured as serving cells.

Note that the switching may be performed based on a combination of multiple configurations provided by the higher layer. In a specific example, in a case that the cross carrier scheduling is not configured for the LAA cell and that notification that the nation(s) where the LAA cell is operated is the particular nation(s) has been provided, the terminal apparatus performs the second uplink LBT before the uplink transmission for the LAA cell or performs no uplink LBT. In a case that the cross carrier scheduling is configured for the LAA cell and that notification that the nation(s) where the LAA cell is operated is other than the particular nation(s) has been provided, the terminal apparatus performs the first uplink LBT before the uplink transmission for the LAA cell.

Moreover, the switching may be performed in a case of combining multiple ones of the above-described examples. In a specific example, in a case that the self scheduling is configured for the LAA cell and that a prescribed field included in the uplink grant indicating the uplink transmission indicates that the first LBT is to be performed, the terminal apparatus performs the first uplink LBT before the uplink transmission for the LAA cell. Otherwise the terminal apparatus performs the second uplink LBT before the uplink transmission for the LAA cell or performs no uplink LBT.

Note that the parameter may be switched depending on the above-described examples. In a specific example, in a case that the terminal apparatus performs the first uplink LBT but the self scheduling is configured for the LAA cell, a value configured by the higher layer (RRC) is applied to the contention window q, and in a case that the cross carrier scheduling is configured for the LAA cell, the contention window q is updated at each transmission opportunity based on the value configured by the higher layer (RRC).

Note that the above-described examples may include switching between a case of transmitting the uplink following the second uplink LBT and a case of transmitting the uplink with no uplink LBT. In other words, in a case that the PDCCH or the EPDCCH in the uplink grant for scheduling of the uplink transmission for the LAA cell is configured to be monitored for a cell other than the LAA cell, the terminal apparatus performs the second uplink LBT before the uplink transmission. On the other hand, in a case that the PDCCH or the EPDCCH in the uplink grant for scheduling of the uplink transmission for the LAA cell is not configured to be monitored for a cell other than the LAA cell, the terminal apparatus performs no uplink LBT before the uplink transmission.

Figure 10:
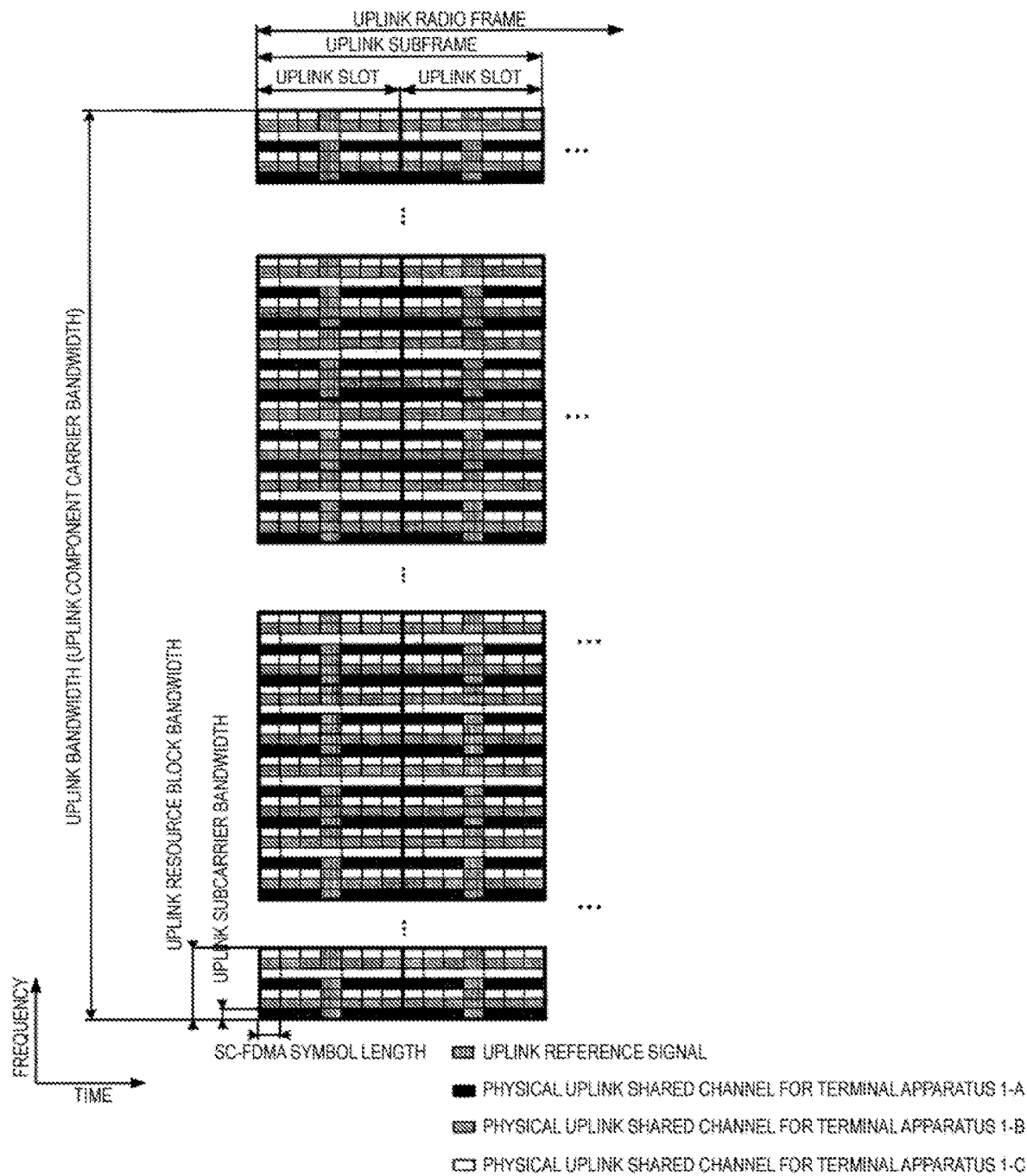
FIG. 10 is a diagram illustrating an example of frequency multiplexing of a physical uplink shared channel according to the present embodiment.

In the LAA cell, the terminal apparatus may allocate the PUSCH to sets (clusters) of contiguous one or multiple subcarriers or one or multiple resource blocks and transmit the PUSCH. In other words, in the LAA cell, the PUSCH may be transmitted not only using one or two clusters, but may be transmitted using multiple clusters. As an example, FIG. 10 illustrates an example of frequency multiplexing of the PUSCH in the LAA cell. In the LAA cell, resources to which PUSCH is allocated may be allocated not contiguously but at intervals of several subcarriers or several resource blocks in the frequency direction. The PUSCH is allocated among different terminal apparatuses in an interlaced manner such that the PUSCH is nested among the multiple sets of subcarriers or multiple sets of resource blocks. Further, as an example, it is preferable that clusters for the PUSCH be mapped such that intervals between the clusters are uniform. With this configuration, transmit power of the uplink is distributed evenly for the bandwidth. In the example in FIG. 10, PUSCHs are allocated at intervals of three subcarriers, and the PUSCHs for three terminal apparatuses are allocated in such a manner as to be interlaced for each subcarrier. This allows the terminal apparatuses to utilize the entire bandwidth with a few allocation resources. Note that the smallest unit of allocation of clusters is described as being one subcarrier with reference to FIG. 10, but is not limited to this example, and multiple subcarriers or multiple resource blocks may be allocated contiguously. Note that the number of terminal apparatuses to be multiplexed is not limited to three, and a maximum number of terminal apparatuses to be multiplexed is determined based on the intervals between clusters or a granularity of resources with which clusters are allocated.

To allow frequency multiplexing or spatial multiplexing among multiple terminal apparatuses in the LAA cell by using the same subframes (time resources), transmission timings for the terminal apparatuses need to be adjusted in such a manner that uplink channels and/or uplink signals from the respective terminal apparatuses are simultaneously received by the base station apparatus. Furthermore, in the LAA cell, the uplink LBT is performed before the uplink transmission. In a case that LBT is performed based on the counter value N, the number of attempts to perform CCA and the time needed for LBT vary according to the counter value N. The relationship between start timings for the uplink transmission and the uplink LBT will be described below.

Figure 11:
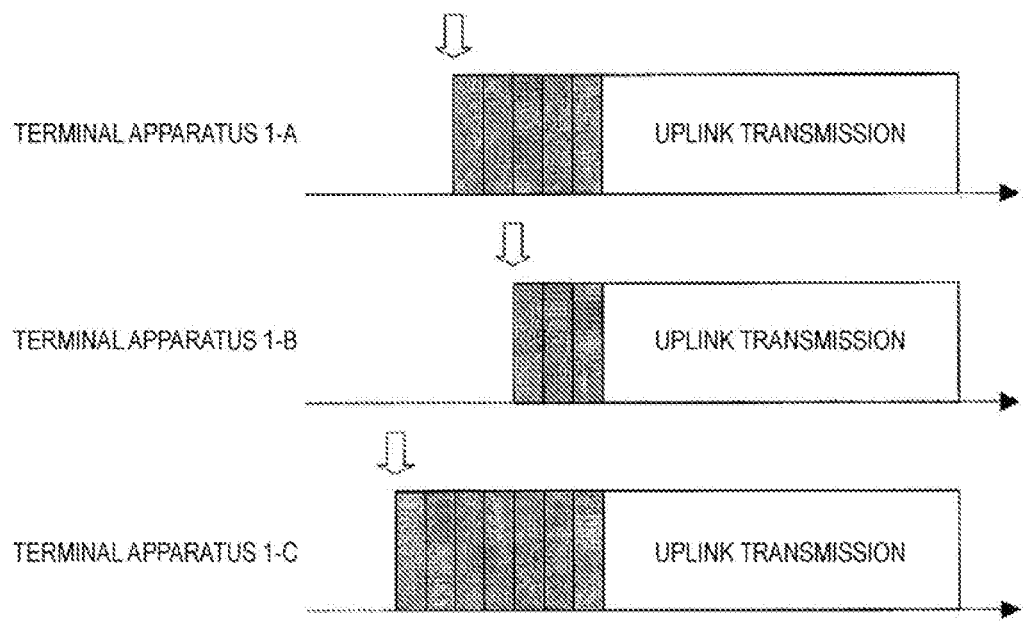
FIG. 11 is a diagram illustrating an example of CCA for an uplink transmission according to the present embodiment.
Figure 11:
Figure 11:

FIG. 11 illustrates an example of the relationship between the start timings for the uplink transmission and the uplink LBT. FIG. 11 is based on operations in accordance with the procedure of the uplink LBT in FIG. 8. The base station apparatus notifies each terminal apparatus of the timing (subframe) for the uplink transmission. The timing for the uplink transmission is implicitly notified, for example, based on a subframe in which the uplink grant is received. The terminal apparatus independently generates a counter value N. The terminal apparatus estimates the time when the uplink LBT is completed from the counter value N and the CCA period to determine the LBT start timing. That is, the terminal apparatus can calculate the start timing for the uplink LBT, based on the start timing for the uplink transmission and the number of the first CCAs (counter value N). In other words, the CCA for the uplink transmission starts (counter value N×CCA period) microseconds before the beginning of the uplink subframe for the terminal apparatus.

The terminal apparatus having determined that the channel is busy as a result of the CCA does not perform the uplink transmission at the indicated timing for the uplink transmission. At this time, the counter value N is not discarded and is taken over by the next uplink LBT. In other words, in a case that any counter value N remains in the counter, no counter value N is generated. Note that the counter value N may be discarded and may not be taken over by the next uplink LBT depending on the type of the DCI format or a particular parameter. For example, in a case of receiving information indicative of the first transmission through a parameter indicative of new data (New data indicator), the terminal apparatus discards the counter value N and does not take over the counter value N to the next uplink LBT. Moreover, the counter value N may be linked with the HARQ process. In other words, the counter value N for the uplink LBT for the PUSCH is independent among different HARQ processes.

Note that the uplink transmission may be performed in the middle of the uplink subframe. At that time, the CCA for the uplink transmission starts (counter value N×CCA period) microseconds before the beginning of the uplink transmission that the terminal apparatus is indicated to perform.

Note that the initial CCA may be performed in the uplink LBT. In that case, the CCA for the uplink transmission starts (initial CCA period+counter value N+CCA period) microseconds before the beginning of the uplink subframe in which the terminal apparatus is indicated to perform the uplink transmission.

Note that, in a case that time is needed to switch from the receiver to the transmitter, the start timing for the uplink LBT is determined with the switching time taken into account. In other words, the CCA for the uplink transmission starts (counter value N×CCA period+time needed to switch from the receiver to the transmitter) microseconds before the beginning of the uplink subframe in which the terminal apparatus is indicated to perform the uplink transmission.

Note that the start timing of CCA for the uplink transmission may be calculated based on the downlink radio frame (downlink subframe). In other words, the CCA for the uplink transmission starts (counter value N×CCA period+ uplink-downlink frame timing adjustment time) microseconds before the beginning of the downlink subframe corresponding to the uplink subframe in which the terminal apparatus is indicated to perform the uplink transmission. Here, the uplink-downlink frame timing adjustment time is $(N_{TA}+N_{TA\_offset}) \times T_S$, $N_{TA}$ is a terminal apparatus-specific parameter having a value from 0 to 20512 to adjust the uplink transmission timing, and $N_{TA}$ offset is a frame configuration type-specific parameter for adjustment of the uplink transmission timing.

Here, in the LAA cell, a value that can be taken by $N_{TA}$ may be limited. In other words, in the LAA cell, the maximum value of $N_{TA}$ is smaller than 20512.

Figure 12:
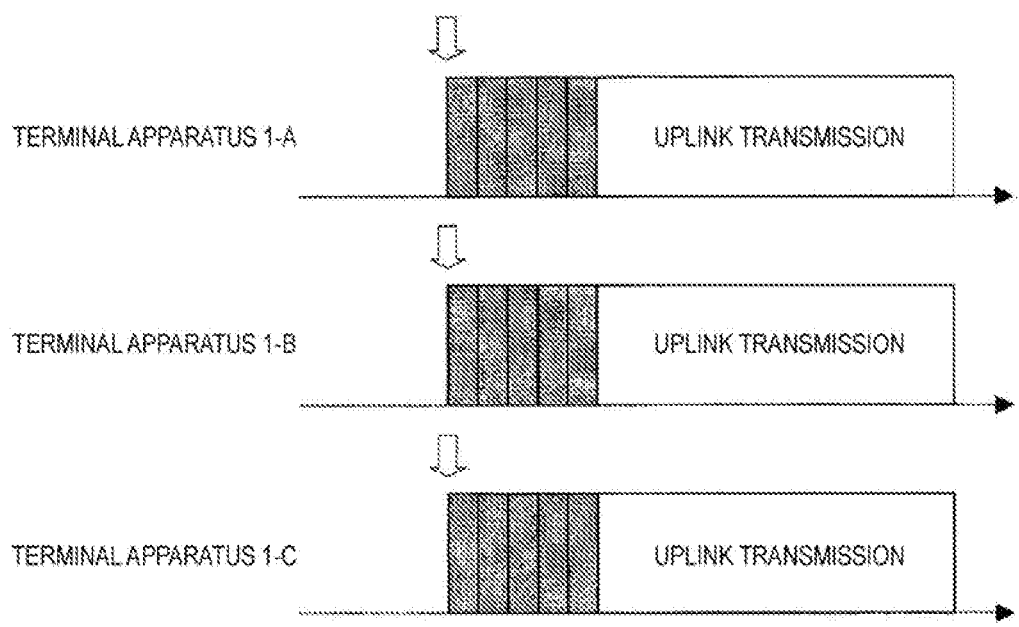
FIG. 12 is a diagram illustrating an example of CCA for an uplink transmission according to the present embodiment.
Figure 12:
Figure 12:

FIG. 12 illustrates an example of the relationship between the start timings for the uplink transmission and the uplink LBT. FIG. 12 is based on operations in accordance with the procedure of the uplink LBT in FIG. 8. The base station apparatus notifies each terminal apparatus of the start timing for the uplink LBT and information associated with the counter value N. The start timing for the uplink LBT is implicitly notified, for example, based on the subframe in which the uplink grant is received. The terminal apparatus can recognize the start timing for the uplink transmission, based on the start timing for the uplink LBT and the counter value N. That is, the terminal apparatus can calculate the start timing for the uplink transmission, based on the start timing for the uplink LBT and the number of the first CCAs (counter value N). In other words, the uplink transmission starts (counter value N×CCA period) microseconds after the beginning of an uplink subframe in which the terminal apparatus is indicated to perform CCA. Here, the same counter value N is configured for all the terminal apparatuses to be multiplexed.

The information associated with the counter value N is, for example, the counter value N. In a case of being notified of the counter value N, the terminal apparatus performs the uplink LBT by using the counter value N.

Moreover, the information associated with the counter value N is, for example, a seed of random number used to generate the counter value N. The terminal apparatus generates the counter value N by using the notified value and another parameter. Such another parameter is, for example, an accumulated value of the HARQ-ACK for the PUSCH, the cell ID, a subframe number, a system frame number, or the like.

The terminal apparatus having determined that the channel is busy as a result of the CCA does not perform the uplink transmission at the indicated timing for the uplink transmission. At this time, the counter value N is discarded and is not taken over to the next uplink LBT.

Note that the initial CCA may be performed in the uplink LBT. In that case, the uplink transmission starts (initial CCA period+counter value N×CCA period) microseconds after the beginning of an uplink subframe in which the terminal apparatus is indicated to perform CCA.

Note that, in a case that time is needed to switch from the receiver to the transmitter, the start timing for the uplink LBT is determined with the switching time taken into account. In other words, the uplink transmission starts (counter value N×CCA period+time needed to switch from the receiver to the transmitter) microseconds after the beginning of an uplink subframe in which the terminal apparatus is indicated to perform CCA.

Note that the uplink transmission may be calculated based on the downlink radio frame (downlink subframe). In other words, the uplink transmission starts (counter value N×CCA period−uplink-downlink frame timing adjustment time) microseconds after the beginning of the downlink subframe corresponding to the uplink subframe in which the terminal apparatus is indicated to perform the CCA. Here, the uplink-downlink frame timing adjustment time is $(N_{TA}+N_{TA\_offset}) \times T_s$, $N_{TA}$ is a terminal apparatus-specific parameter having a value from 0 to 20512 to adjust the uplink transmission timing, and $N_{TA\_offset}$ is a frame configuration type-specific parameter for adjustment of the uplink transmission timing.

Figure 13:
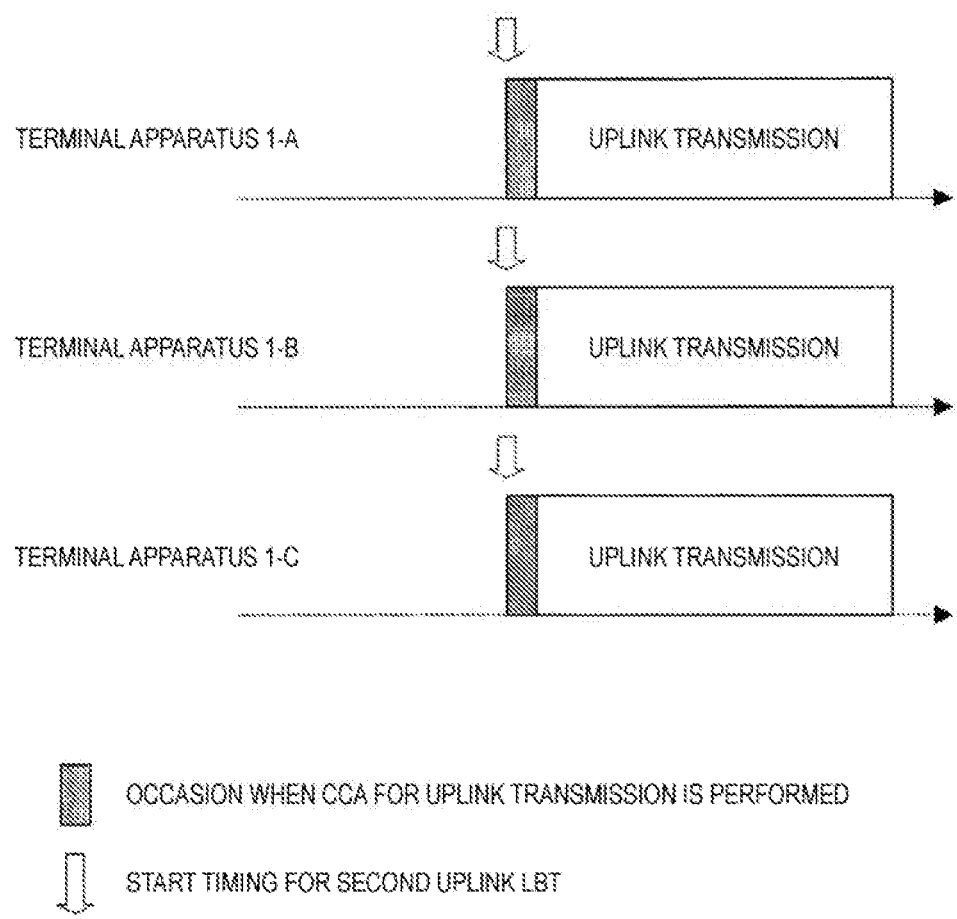
FIG. 13 is a diagram illustrating an example of CCA for an uplink transmission according to the present embodiment.

FIG. 13 illustrates an example of the relationship between the start timings for the uplink transmission and the uplink LBT. FIG. 13 is based on operations in accordance with the procedure of the uplink LBT in FIG. 9. The base station apparatus notifies each terminal apparatus of the timing (subframe) for the uplink transmission. The timing for the uplink transmission is implicitly notified, for example, based on a subframe in which the uplink grant is received. The terminal apparatus determines the time when the uplink LBT is completed based on the CCA period to determine the LBT start timing. In other words, the CCA for the uplink transmission starts (CCA period) microseconds before the beginning of the uplink subframe in which the terminal apparatus is indicated to perform the uplink transmission.

Note that, instead of the timing for the uplink transmission, the start timing for the uplink LBT may be notified. In that case, the terminal apparatus can recognize the timing for the uplink transmission, based on the CCA period. In other words, the CCA for the uplink transmission starts (CCA period) microseconds before the beginning of the uplink subframe in which the terminal apparatus is indicated to perform the uplink transmission.

The terminal apparatus having determined that the channel is busy as a result of the CCA does not perform the uplink transmission at the indicated timing for the uplink transmission.

Figure 14:
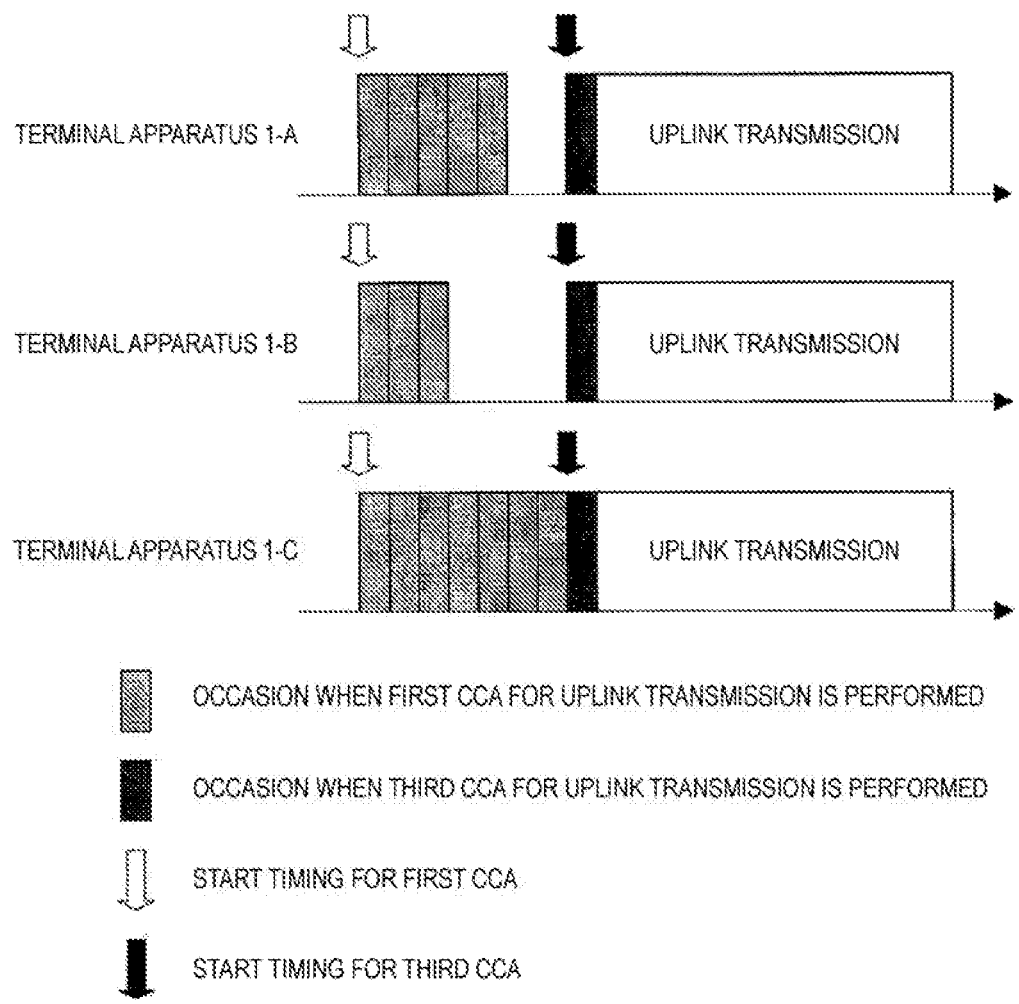
FIG. 14 is a diagram illustrating an example of CCA for an uplink transmission according to the present embodiment.

FIG. 14 illustrates an example of the relationship between the start timings for the uplink transmission and the uplink LBT. FIG. 14 is based on operations in accordance with the procedure of the uplink LBT in FIG. 15 described below. The base station apparatus notifies each terminal apparatus of the timing (subframe) for the uplink transmission. The timing for the uplink transmission is implicitly notified, for example, based on a subframe in which the uplink grant is received. The terminal apparatus starts the first CCA at the start timing for the first CCA. In a case that the counter value N becomes 0, the terminal apparatus waits until a start timing for third CCA. Then, the terminal apparatus performs the third CCA at the start timing for the third CCA, and in a case that the channel is idle during the entire CCA period, performs the uplink transmission.

The start timing for the first CCA corresponds to, for example, the beginning of the subframe before the uplink transmission. In other words, the first CCA for the uplink transmission starts at the beginning of the subframe closest to the beginning of the uplink transmission in which the terminal apparatus is indicated to perform.

Alternatively, the start timing for the first CCA is determined, for example, based on the contention window q for the terminal apparatus. In other words, the first CCA for the uplink transmission starts (contention window q×CCA period) microseconds before the beginning of the uplink transmission in which the terminal apparatus is indicated to perform.

The third CCA for the uplink transmission starts (third CCA period) microseconds before the beginning of the uplink subframe in which the terminal apparatus is indicated to perform the uplink transmission.

The third CCA period for the uplink transmission may preferably be the same as the ICCA period.

Figure 15:
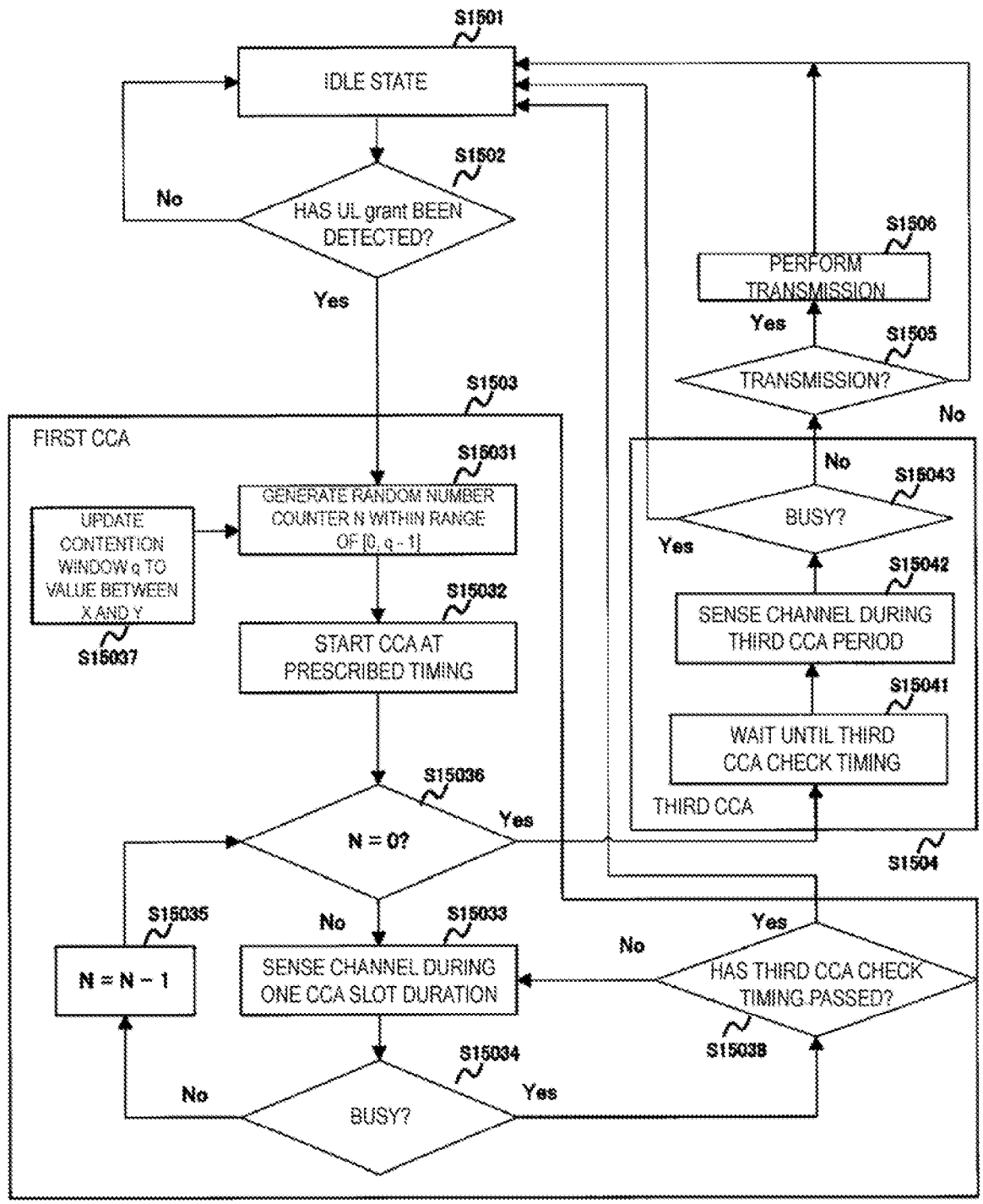
FIG. 15 is a diagram illustrating an example of a procedure of CCA for an uplink transmission according to the present embodiment.

FIG. 15 illustrates an example of the procedure of the uplink LBT. In a case of detecting the uplink grant (S1502) in the idle state (S1501), the terminal apparatus performs the first CCA (S1503). In the first CCA, first, the terminal apparatus randomly generates a counter value N within the range from 0 to q−1 (S15031). Note that, in a case that a numerical value associated with the counter value N is indicated by the base station apparatus using the uplink grant, the terminal apparatus uses the counter value N based on the numerical value instead of generating a counter value. Note that, in a case that the last LBT has not set the counter value to 0, with a value remaining in the counter, the terminal apparatus may use the remaining counter value N instead of generating a counter value N. Then, the terminal apparatus starts CCA at the prescribed timing (S15032). The terminal apparatus senses the channel (medium) during one CCA slot duration (S15033) to determine whether the channel is idle or busy (S15034). The terminal apparatus decrements the counter value N by one (S15035) in a case of determining that the channel is idle, and determines whether a third CCA check timing has passed (S15038) in a case of determining that the channel is busy. In a case that the third check timing has not passed, the terminal apparatus returns to the process of sensing the channel (medium) during one CCA slot duration (S15033). In a case that the third CCA check timing has passed, the terminal apparatus returns to the idle state (S1501) instead of performing the uplink transmission indicated by the uplink grant. After the counter value N is decremented by one, the terminal apparatus determines whether the counter value is 0 (S15036), and in a case that the counter value is 0, proceeds to the operation of the third CCA (S1504). On the other hand, in a case that the counter value is not 0, the terminal apparatus senses the channel (medium) during one CCA slot duration again (S15033). Note that the value in the contention window q obtained in a case that the counter value N is generated is updated to a value from X to Y according to the channel state (S15037). Then, in the third CCA (S1504), the terminal apparatus waits until a timing when the third CCA starts (S15041), and senses the channel during the third CCA period (S15042). In a case of determining that the channel is busy as a result of the third CCA, the terminal apparatus returns to the idle state (S1501) instead of performing the uplink transmission indicated by the uplink grant. On the other hand, in a case of determining that the channel is idle as a result of the third CCA, the terminal apparatus acquires the right to access the channel and proceeds to a transmission operation (S1505, S1506). In a transmission process, the terminal apparatus determines whether to actually perform the uplink transmission at that timing (S1505), and in a case of determining that the uplink transmission is to be performed, performs the uplink transmission (S1506). In a case of determining not to perform the uplink transmission, the terminal apparatus returns to the idle state (S1501) instead of performing the uplink transmission indicated by the uplink grant.

Note that the ICCA may be performed as is the case with the downlink LBT. However, even in a case that the ICCA results in the determination that the channel is idle, the uplink is not transmitted and the procedure proceeds to an ECCA operation.

The above-described constitution allows one subframe to be multiplexed to be transmitted and/or received in multiple terminal apparatuses, with long-term CCA checks performed by random number backoff.

Note that the LAA cell may preferably be operated in accordance with a half duplex scheme. The terminal apparatus does not expect to receive, in a subframe in which an uplink transmission is being performed in one LAA cell, a downlink signal and/or channel from another LAA cell configured as a serving cell. Specifically, the terminal apparatus does not expect to receive, in a subframe for which the PUSCH is scheduled in one LAA cell by DCI format 0/4, the PDCCH or the EPDCCH in all LAA cells configured as serving cells. Furthermore, the terminal apparatus performs, in the subframe, no uplink LBT in the LAA cell configured as a serving cell. Alternatively, the terminal apparatus may determine the result of the uplink LBT of the LAA cell configured as a serving cell to be busy in the subframe. Moreover, the terminal apparatus performs, in a subframe in which a downlink reception is being performed in one LAA cell, no uplink transmission in another LAA cell configured as a serving cell. In a specific example, the terminal apparatus performs no uplink transmission in subframes configured as DMTC occasions. The terminal apparatus does not expect that the PUSCH is scheduled for subframes configured as DMTC occasions. Moreover, in a serving cell operated as an LAA cell, the terminal apparatus generates a guard period by avoiding reception of the end part of the downlink subframe immediately before the uplink subframe. Alternatively, in a serving cell operated as an LAA cell, the terminal apparatus generates a guard period by avoiding reception of the downlink subframe immediately before the uplink subframe and reception of the downlink subframe immediately after the uplink subframe.

Note that the uplink LBT may be performed during the guard period.

A method for allocating resources for the LAA cell will be described below.

Figure 16:
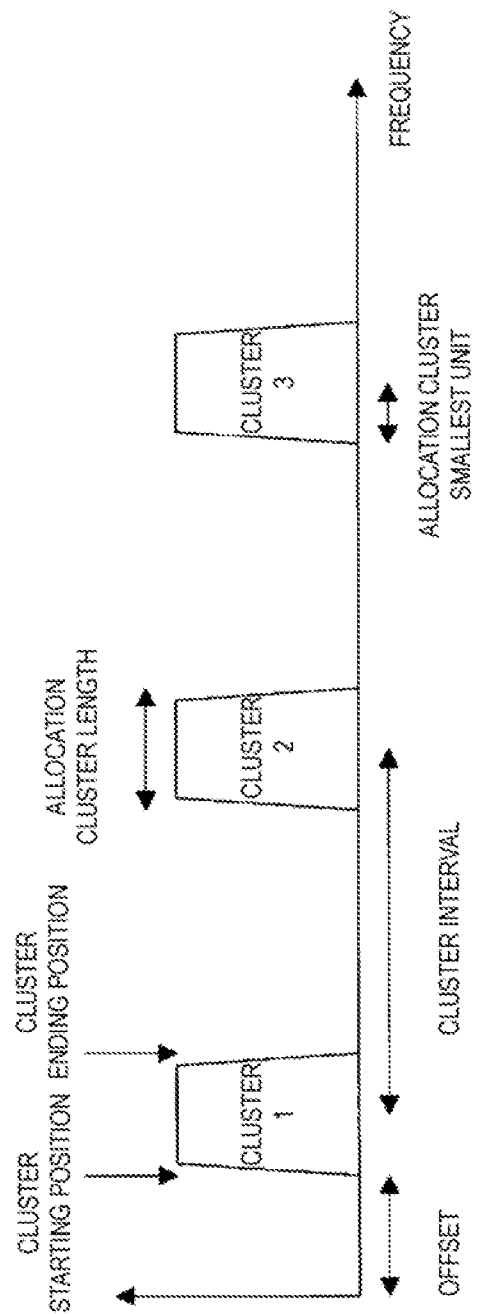
FIG. 16 is a diagram illustrating an example of resource allocation of a physical uplink shared channel according to the present embodiment.

In the LAA cell, as illustrated in FIG. 16, there may be a case that a PUSCH is transmitted while being divided into three or more clusters. For such transmission, the PUSCH to be transmitted in the LAA cell is indicated by an uplink resource allocation type used for indicating two or more sets of contiguously allocated resource blocks (uplink resource allocation type 2, third uplink resource allocation type), which is different from uplink resource allocation type 0 used for indicating one set of contiguously allocated resource blocks or uplink resource allocation type 1 used for indicating two sets of contiguously allocated resource blocks. The uplink resource allocation type (uplink resource allocation type 2, third uplink resource allocation type) may be used for indicating three or more sets of contiguously allocated resource blocks.

Fields of uplink resource allocation type 2 include a combination of information allowing unique identification of positions (location, mapping) of multiple clusters allocated to the terminal apparatus.

As an example, with uplink resource allocation type 2, the terminal apparatus is notified of the number of overall resource blocks allocated for the PUSCH in one subframe, the number of clusters into which the resources are divided, a value of frequency offset between a reference resource block or subcarrier and the clusters resulting from the division, and intervals between the clusters resulting from the division. The number of overall resource blocks allocated for the PUSCH in one subframe, the number of clusters, the value of frequency offset between a reference resource block or subcarrier and the clusters, and the intervals between the clusters may be notified while being included in a DCI format. The terminal apparatus recognizes the resource blocks allocated to the terminal apparatus, based on information of the number of overall resource blocks, the number of clusters, the value of frequency offset, and the intervals between the clusters, which is configured or notified by the base station apparatus.

The value of frequency offset between a reference resource block or subcarrier and the clusters and/or the intervals between the clusters may be configured or notified as an individual parameter (value, field) for each cluster and/or terminal apparatus. Alternatively, the value of frequency offset between a reference resource block or subcarrier and the clusters and/or the intervals between the clusters may be configured or notified as a parameter (value, field) that is common between clusters and/or terminal apparatuses. Note that the common parameter may be configured in the terminal apparatuses beforehand, or may be configured by a higher layer (for example, a dedicated RRC message). Note that the common parameter may be determined in association with prescribed information. The prescribed information is preferably information that is common between terminals in a cell, and is, for example, an uplink system bandwidth.

The number of clusters allocated to the terminal apparatus may be notified while being included in DCI, may be configured in the terminal apparatus beforehand, or may be configured by a higher layer (for example, a dedicated RRC message). The number of clusters may be determined in association with prescribed information. The prescribed information is, for example, an uplink system bandwidth.

Note that in place of the number of overall resource blocks allocated for the PUSCH in one subframe, a length of allocation clusters may be configured or notified. Information of the length of the clusters may be common for the clusters or may be configured or notified individually for each cluster. Further, the information of the length of the clusters may be configured or notified individually for each terminal.

Moreover, uplink resource allocation type 2 may be notified to the terminal apparatus by using information having a similar format to that used for uplink resource allocation type 1, namely, information constituted by a single index in which the respective starting positions and ending positions (resource blocks) of the multiple clusters are combined. It is assumed that the index is information relating only to the starting positions and ending positions of the clusters, and that in the terminal apparatus, the starts and ends of the clusters are indicated alternately from the lower frequency position. Note that instead of using a single index, the starting position and ending position of each cluster may be notified as individual information. In the case that the starting position and ending position of each cluster is indicated, by assuming that allocation resources are not overlapped among the clusters, the number of bits of information constituted by the respective indices can be reduced.

Uplink resource allocation type 2 may be in the same format as the downlink resource allocation type. For example, for indication of resource allocation for the PUSCH using uplink resource allocation type 2, the same format as that of downlink resource allocation type 0 may be applied. For example, for indication of resource allocation for the PUSCH using uplink resource allocation type 2, the same format as that of downlink resource allocation type 1 may be applied.

The smallest unit of allocation clusters in FIG. 16 is a resource block or a resource block group. Note that the smallest unit of allocation clusters may be a subcarrier or a set of multiple contiguous subcarriers. The number of bits of a field is determined in accordance with the smallest unit of allocation clusters. The smallest unit of allocation clusters may be notified with DCI, may be configured by a higher layer, may be configured beforehand, and a value of the smallest unit may be determined in association with other information such as a system bandwidth of the uplink.

Figure 17:
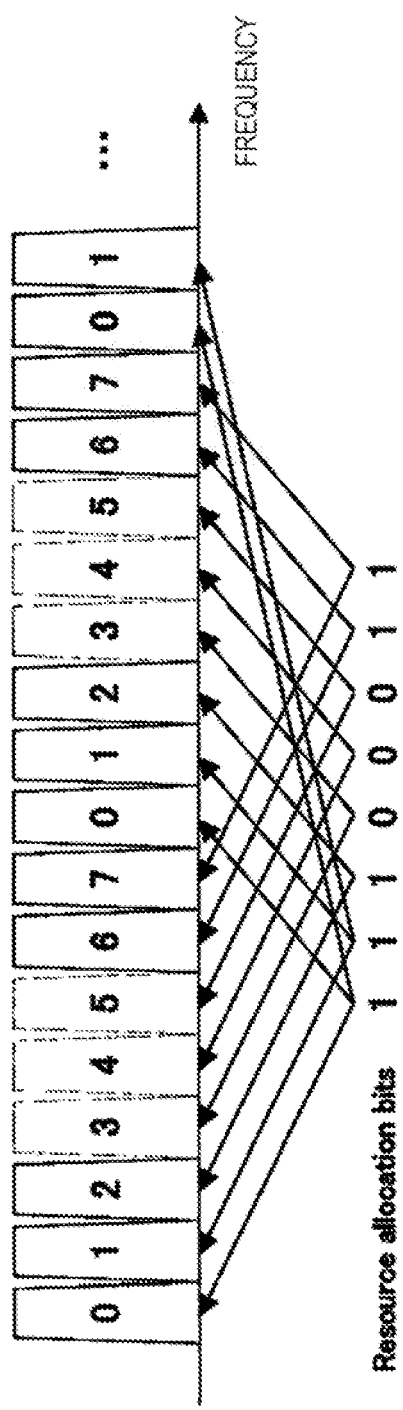
FIG. 17 is a diagram illustrating an example of resource allocation of the physical uplink shared channel according to the present embodiment.

Further, as an example, as illustrated in FIG. 17, notification may be made using subsets of resource blocks that can be allocated and a bitmap that is constituted by bits corresponding to the subsets. For example, as illustrated in FIG. 17, indices of subsets are allocated in ascending order from the lowest frequency and cyclically. Accordingly, clusters can be allocated on a frequency axis at equal intervals. From a bit on the bitmap, the terminal apparatus recognizes a corresponding subset, and in a case that resource allocation is indicated by that bit, transmits the PUSCH by using the resource block of the corresponding subset. The number of bits of the bitmap is determined in accordance with the smallest unit of allocation clusters and the system bandwidth of the uplink.

Uplink resource allocation type 2 is applied in a case of a particular condition. Examples of conditions for applying uplink resource allocation type 2 will be illustrated below.

As an example, uplink resource allocation type 2 is applied (used) in a case of being scheduled by a prescribed DCI format. The prescribed DCI format is, for example, DCI format 0A or 4A and an uplink DCI format other than DCI format 0 or 4. In a case of not being scheduled by the prescribed DCI format, uplink resource allocation type 2 is not applied, and uplink resource allocation type 0 or 1 is applied.

As an example, uplink resource allocation type 2 is applied (used) in association with information of an indicator for identifying a resource allocation type, which is included in DCI format 0 or 4. Specifically, in a case that type 2 is indicated by the information of the indicator, uplink resource allocation type 2 is applied, whereas in a case that type 2 is not indicated by the information of the indicator, uplink resource allocation type 2 is not applied and uplink resource allocation type 0 or 1 is applied.

As an example, uplink resource allocation type 2 is applied (used) in a case of being scheduled by DCI format 0 or 4 for an LAA secondary cell. Meanwhile, in a case of being scheduled by DCI format 0 or 4 for a serving cell other than an LAA secondary cell, uplink resource allocation type 2 is not applied and uplink resource allocation type 0 or 1 is applied.

A terminal apparatus being capable of LAA operation includes capability for transmitting a PUSCH that is divided into multiple clusters by uplink resource allocation type 2.

Note that in the LAA secondary cell, uplink resource allocation types 0 and 1 may not be supported. In other words, in the LAA secondary cell, only uplink resource allocation type 2 may be supported.

Note that, in a case that the operation is in a country within Europe, uplink resource allocation types 0 and 1 may not be supported. For example, in a case that a Public Land Mobile Network (PLMN) of an operator within Europe is received, in an LAA secondary cell that is operated by the base station, uplink resource allocation types 0 and 1 may not be supported.

As an example, uplink resource allocation type 2 is applied (used) in a case that uplink resource allocation type 2 is configured to be applied by the RRC. On the other hand, in a case that uplink resource allocation type 2 is not configured to be applied by the RRC, uplink resource allocation type 2 is not applied, and uplink resource allocation type 0 or 1 is applied.

Note that these conditions may be similarly applied in an LAA Primary Secondary cell (LAA PSCell) as well.

Note that uplink resource allocation type 2 may be applied to a random access response grant for an LAA secondary cell or an LAA primary secondary cell. In other words, the terminal apparatus may interpret information of the field of resource block allocation for the PUSCH, which is included in the random access response grant, as resource allocation type 2. The random access response grant for the LAA secondary cell may be transmitted in the primary cell. The random access response grant for the LAA primary secondary cell may be transmitted in the LAA primary secondary cell.

Uplink resource allocation type 0 may be applied to a random access response grant for a serving cell that is not an LAA secondary cell and an LAA primary secondary cell. In other words, the terminal apparatus may interpret information of the field of resource block allocation for the PUSCH, which is included in the random access response grant, as resource allocation type 0. The random access response grant does not include a resource allocation type bit. The random access response grant for a serving cell that is not an LAA secondary cell and an LAA primary secondary cell may be transmitted in the primary cell.

Note that in the LAA cell, frequency hopping may be further performed on the PUSCH allocated by the above resource allocation type. For example, in the LAA cell, the physical resource block with which the PUSCH is transmitted may differ between slot 0 and slot 1. For example, in the LAA cell, the physical resource block with which the PUSCH is transmitted may differ among SC-FDMA symbols. Parameters that are used for frequency hopping are configured by a higher layer.

In the LAA cell, as illustrated in FIG. 16, in a case that the PUSCH is transmitted while being divided into three or more clusters, the UL DMRS used for demodulation of the PUSCH is also transmitted while being divided into three or more clusters, similarly to the PUSCH. A constitution of an UL DMRS for an LAA cell will be described below.

As an example, an UL DMRS for an LAA cell is constituted by a single sequence in a single subframe, mapped in the respective clusters while being divided, and is transmitted. In other words, in adjacent clusters on the frequency axis, contiguous sequences are used for the UL DMRS. The sequence of the UL DMRS is initialized based on information in an uplink DCI format in which a subframe in which the clusters are mapped and the PUSCH associated with the UL DMRS are indicated, for example. The information in the uplink DCI format is, for example, information relating to a cyclic shift for the UL DMRS and/or an Orthogonal Cover Code (OCC) index. With respect to the sequence of the UL DMRS, the constitution of the sequence of the UL DMRS is referred to as "first UL DMRS".

As an example, the sequence of the UL DMRS for the LAA cell is constituted for each cluster in a single subframe. In other words, even for clusters that are transmitted in the same subframe, the sequences differ from each other for different clusters, and in adjacent clusters on the frequency axis, discontiguous sequences are used for the UL DMRS. In other words, such a sequence of the UL DMRS is generated independently for each of the clusters. Such a sequence of the UL DMRS is initialized based on information in an uplink DCI format in which a subframe in which the clusters are mapped, resource blocks or resource elements in which the clusters are mapped and/or the PUSCH associated with the UL DMRS is indicated, for example. The information in the uplink DCI format is, for example, information relating to a cyclic shift for the UL DMRS and/or an Orthogonal Cover Code (OCC) index. The multiple pieces of information may be included in the DCI format, and each piece of such information may indicate the sequence of the UL DMRS of the corresponding cluster. This constitution of the sequence of the UL DMRS is referred to as "second UL DMRS".

The sequence of the UL DMRS may be determined in accordance with the number of clusters. For example, in a case that the number of clusters in a single subframe is two or less, the first UL DMRS is used. In a case that the number of clusters in a single subframe is more than two, the second UL DMRS is used.

Further, the sequence of the UL DMRS may be determined in accordance with a type of uplink resource allocation type. For example, in a case that uplink resource allocation type 1 is applied, the first UL DMRS is used. In a case that uplink resource allocation type 2 is applied, the second UL DMRS is used.

Further, the sequence of the UL DMRS may be determined in accordance with a frame structure type of the serving cell. For example, in a case that the frame structure type of the serving in which the UL DMRS is transmitted is frame structure type 1 or 2, the first UL DMRS is used. In a case that the frame structure type of the serving in which the UL DMRS is transmitted is frame structure type 3, the second UL DMRS is used.

Further, the sequence of the UL DMRS may be determined in accordance with a length of a cluster. For example, in a case that a length of a single cluster is shorter than three resource blocks (36 subcarriers), the first UL DMRS is used.

In a case that the length of a single cluster is equal to or larger than three resource blocks, the second UL DMRS is used.

Note that in a case that there are three or more clusters in a single subframe, the first UL DMRS and the second UL DMRS may be combined and transmitted. For example, among three clusters, the first UL DMRS may be applied in two clusters and the second UL DMRS may be applied in the remaining one cluster. For example, among four clusters, the first UL DMRS is used for a cluster(s) that is scheduled to have a cluster length shorter than three resource blocks and the second UL DMRS is used for a cluster(s) that is scheduled to have a cluster length equal to or larger than three resource blocks.

Timings for the uplink grant and the PUSCH in the LAA cell will be described below.

In the LAA cell, a relationship between the timings for the uplink grant and the PUSCH may be shorter than four subframes in the FDD cell. Specifically, in the LAA cell, the PUSCH may be transmitted in a subframe that is earlier than four subframes from a subframe in which a DCI format indicating transmission of the PUSCH is received. In other words, in the LAA cell, the PUSCH may be transmitted in a subframe that is one, two or three subframe(s) later than the subframe in which the DCI format indicating transmission of the PUSCH is received. For example, in a case that an uplink DCI format in which uplink resource allocation type 2 is applied is received, the PUSCH may be transmitted in a subframe that is earlier than four subframes from the subframe in which the uplink DCI format is received.

Note that, in a case that the PUSCH is indicated by self scheduling, the PUSCH may be transmitted in a subframe that is earlier than four subframes from the subframe in which the DCI format indicating transmission of the PUSCH is received. In a case that the PUSCH is indicated by cross carrier scheduling, the PUSCH may be transmitted in a subframe that is four subframes later than the subframe in which the DCI format indicating transmission of the PUSCH is received.

Note that, in a case that the DCI format is received in a full subframe, the PUSCH may be transmitted in a subframe that is earlier than four subframes from a subframe in which the DCI format indicating transmission of the PUSCH is received. Note that, in a case that the DCI format is received in a partial subframe, the PUSCH may be transmitted in a subframe that is four subframes later than the subframe in which the DCI format indicating transmission of the PUSCH is received.

Note that in the LAA cell, a terminal apparatus that has a capability of shortening the relationship between the timings of the uplink grant and the PUSCH may transmit the PUSCH in a subframe that is earlier than four subframes from the subframe in which the DCI format indicating transmission of the PUSCH is received. On the other hand, in the LAA cell, a terminal apparatus that does not have the capability transmits the PUSCH four subframes later than the subframe in which the DCI format indicating transmission of the PUSCH is received.

Note that the subframe in which the PUSCH is transmitted may be determined based on a field in a DCI format that indicates the timings for the DCI format and the PUSCH. Note that, in a case that the timings are indicated by the field, the PUSCH may be transmitted in a subframe that is earlier than four subframes from the subframe in which the DCI format indicating transmission of the PUSCH is received.

A PUSCH indicated by a random access response grant for the LAA cell is transmitted six subframes later than a subframe in which the random access response grant is detected. Note that this PUSCH may be transmitted in the first uplink subframe after the above-described six subframes. Note that a terminal apparatus that has a capability of shortening the relationship between the timings of the uplink grant and the PUSCH may transmit the PUSCH in a subframe that is earlier than six subframes from the subframe in which the random access response grant is detected.

Note that "capability information of a terminal apparatus" may be transmitted in a case that a message of terminal capability enquiry (UECapabilityEnquiry) from a base station apparatus has been received.

An example of steps of transmitting the "capability information of a terminal apparatus" will be described.

The base station apparatus transmits a message of terminal capability enquiry (UECapabilityEnquiry) to the terminal apparatus. The message of terminal capability enquiry is used for requesting transmission of a radio access capability of the terminal apparatus. The terminal apparatus transmits a message of terminal capability information (UECapabilityInformation) to the base station apparatus, based on the message of terminal capability enquiry. The terminal capability information message is used for transmitting the radio access capability of the terminal apparatus requested by the base station apparatus. The terminal capability information message includes a terminal capability (UE-EUTRA-Capability) information element. The UE-EUTRA-Capability is used to convey, to the network, the radio access capability parameter of the terminal apparatus at the base station apparatus and the Feature group indicator (FGI) for mandatory features.

The UE-EUTRA-Capability includes at least parameters related to the radio frequency (RF-Parameters) and parameters related to the physical layer (PhyLayerParameters). The RF-Parameters include at least a list of the bands supported by the terminal apparatus (supportedBandListEUTRA) and/or a combination of the bands supported by the terminal apparatus (supportedBandCombination). The supportedBandListEUTRA is a list of the bands (SupportedBandEUTRA) supported by the terminal apparatus. The supportedBandCombination is a list of the parameters (BandCombinationParameters) related to the combination of the bands supported by the terminal apparatus.

The SupportedBandEUTRA includes at least an indicator (FreqBandIndicator) indicating the band supported by the terminal apparatus and information (halfDuplex) indicating whether half-duplex communication or full-duplex communication is supported in the band. The number of bands in which communication is supported by the terminal apparatus is not limited. That is, the terminal apparatus may support communication in one band only, or the terminal apparatus may support communication in a plurality of bands.

The BandCombinationParameters includes parameters (BandParameters) related to each band in the combination of the bands supported by the terminal apparatus. The BandParameters includes an indicator (FreqBandIndicator) indicating the band, parameters (BandParametersUL) related to the uplink in the band, and parameters (BandParametersDL) related to the downlink in the band. The BandParametersUL is a list of the parameters (CA-MIMO-ParametersUL) related to CA and MIMO in the uplink. The BandParametersDL is a list of the parameters (CA-MIMO-ParametersDL) related to CA and MIMO in the downlink. The CA-MIMO-ParametersUL includes information (CA-BandwidthClass) indicating the CA bandwidth class in the uplink, and information (MIMO-CapabilityUL) related to the number of MIMO layers supported in the uplink.

The CA-MIMO-ParametersDL includes information (CA-BandwidthClass) indicating the CA bandwidth class in the downlink, and information (MIMO-CapabilityDL) related to the number of MIMO layers supported in the downlink. The terminal apparatus explicitly includes all the supported CA bandwidth classes in the signalling related to the band combination in the CA-BandwidthClass.

Note that a Feature group indicator (FGI) and the terminal capability information (UECapabilityInformation) message may not be distinguished from each other. For example, information indicating that a function relating to the FGI is supported may be included in the terminal capability information message. For example, a function relating to the FGI may be indicated by the terminal capability information message.

Note that the FGI and/or the terminal capability information message may be transmitted in common for multiple bands (combination of bands). In other words, a terminal apparatus may hold one FGI and/or one piece of terminal capability information for multiple bands (combination of bands) (i.e., common to the multiple bands (combination of bands)), and the terminal apparatus may transmit the FGI and/or terminal capability information in a case that a message of terminal capability enquiry from the base station apparatus has been received. In other words, to the terminal apparatus, the base station apparatus may perform terminal capability enquiry for multiple bands. In other words, to the terminal apparatus, the base station apparatus may not perform the terminal capability enquiry for each of the bands. In other words, one FGI and/or one terminal capability information message may be information related to a capability of a terminal apparatus for multiple bands.

Note that the FGI and/or the terminal capability information message may be transmitted individually for each band. In other words, the terminal apparatus may hold the FGI and/or the terminal capability information for each band, and may transmit the FGI and/or the terminal capability information in a case that a message of terminal capability enquiry from the base station apparatus has been received. In other words, to the terminal apparatus, the base station apparatus may perform the terminal capability enquiry for each band. In other words, one FGI and/or one terminal capability information message may be information related to a capability of a terminal apparatus for one band.

Note that the FGI and/or the terminal capability information message may be transmitted individually for each band belonging to multiple bands (combination of bands). In other words, the terminal apparatus may hold the FGI and/or the terminal capability information for each band belonging to multiple bands (combination of bands), and may transmit the FGI and/or the terminal capability information in a case that a message of terminal capability enquiry from the base station apparatus has been received. In other words, to the terminal apparatus, the base station apparatus may perform terminal capability enquiry for each band belonging to multiple bands (combination of bands). In other words, one FGI and/or one terminal capability information message may be information related to a capability of a terminal apparatus for one band belonging to multiple bands (combination of bands).

Note that the "band" as referred to in the present embodiment may rephrased as a carrier frequency, frequency, operating band, cell, serving cell, and the like.

The terminal capability information message and/or FGI may include part or all of Information (1) to Information (50) below.

Information (1): information indicating that a terminal apparatus supports Carrier Aggregation Information (2): information indicating that a terminal apparatus supports uplink Carrier Aggregation Information (3): information indicating that a terminal apparatus supports dual connectivity Information (4): information indicating that a terminal apparatus supports synchronous dual connectivity Information (5): information indicating that a terminal apparatus supports asynchronous dual connectivity Information (6): information indicating that a terminal apparatus supports multi Timing Advance/multiple Timing Advance Information (7): information indicating that a terminal apparatus supports simultaneous transmission and/or reception for uplink and downlink (simultaneous Rx-Tx)

Information (8): information indicating that a terminal apparatus supports downlink LAA (LAA DL operation)

Information (9): information indicating that a terminal apparatus supports LAA SCell Information (10): information indicating that a terminal apparatus supports simultaneous PUCCH and PUSCH transmission Information (11): information indicating that a terminal apparatus supports uplink LAA (LAA UL operation)

Information (12): information indicating that a terminal apparatus supports LAA PSCell Information (13): information indicating that a terminal apparatus supports LAA SCell with an uplink resource Information (14): information indicating that a terminal apparatus supports PUSCH transmission on LAA SCell Information (15): information indicating that a terminal apparatus supports PUCCH transmission on LAA SCell Information (16): information indicating that a terminal apparatus supports PRACH transmission on LAA SCell Information (17): information indicating that a terminal apparatus supports prescribed resource allocation in LAA SCell (prescribed uplink resource allocation, prescribed resource allocation type, prescribed uplink resource allocation type, uplink resource allocation type 2, third uplink resource allocation type, interlaced resource block allocation in frequency domain (Interlaced PRB allocation in frequency domain), interlaced uplink resource block allocation in frequency domain)

Information (18): information indicating that a terminal apparatus supports contention-based PUSCH transmission on LAA SCell Information (19): information indicating that a terminal apparatus supports simultaneous PUCCH and PUSCH transmission on LAA SCell Information (20): information indicating that a terminal apparatus supports LAA PSCell with an uplink resource Information (21): information indicating that a terminal apparatus supports PUSCH transmission on LAA PSCell Information (22): information indicating that a terminal apparatus supports PUCCH transmission on LAA PSCell Information (23): information indicating that a terminal apparatus supports PRACH transmission on LAA PSCell Information (24): information indicating that a terminal apparatus supports prescribed resource allocation in LAA PSCell (prescribed uplink resource allocation, prescribed resource allocation type, prescribed uplink resource allocation type, uplink resource allocation type 2, third uplink resource allocation type, interlaced resource block allocation in frequency domain (Interlaced PRB allocation in frequency domain), interlaced uplink resource block allocation in frequency domain)

Information (25): information indicating that a terminal apparatus supports contention-based PUSCH transmission on LAA PSCell Information (26): information indicating that a terminal apparatus supports simultaneous PUCCH and PUSCH transmission on LAA PSCell Information (27): information indicating that a terminal apparatus supports an uplink partial subframe Information (28): information indicating that a terminal apparatus supports PUSCH transmission in an uplink partial subframe Information (29): information indicating that a terminal apparatus supports PUCCH transmission in an uplink partial subframe Information (30): information indicating that a terminal apparatus supports PRACH transmission in an uplink partial subframe Information (31): information indicating that a terminal apparatus supports transmission of Uplink Control Information (UCI) in an uplink partial subframe Information (32): information indicating that a terminal apparatus supports transmission of UCI, including HARQ-ACKINACK, in an uplink partial subframe Information (33): information indicating that a terminal apparatus supports multi Timing Advance/multiple Timing Advance between LAA SCells (or between LAA SCell and LAA PSCell)

Information (34): information indicating that a terminal apparatus supports LBT for multiple LAA SCells (or LAA PSCell) (multi-carrier UL LBT)

Information (35): information indicating that a terminal apparatus supports transmission of UCI using PUSCH or PUCCH on LAA SCell (or LAA PSCell)

Information (36): information indicating that a terminal apparatus supports prescribed LBT (LBT of a prescribed category, arbitrary LBT, LBT of an arbitrary category) in uplink transmission (of LAA SCell or LAA PSCell)

Information (37): information indicating that a terminal apparatus supports LBT category 2 in uplink transmission (of LAA SCell or LAA PSCell)

Information (38): information indicating that a terminal apparatus supports LBT category 4 in uplink transmission (of LAA SCell or LAA PSCell)

Information (39): information indicating that a terminal apparatus supports PUSCH transmission on SCell other than LAA SCell Information (40): information indicating that a terminal apparatus supports PUCCH transmission on SCell other than LAA SCell Information (41): information indicating that a terminal apparatus supports PRACH transmission on SCell other than LAA SCell Information (42): information indicating that a terminal apparatus supports PUSCH transmission on PSCell other than LAA PSCell Information (43): information indicating that a terminal apparatus supports PUCCH transmission on PSCell other than LAA PSCell Information (44): information indicating that a terminal apparatus supports PRACH transmission on PSCell other than LAA PSCell Information (45): information indicating that a terminal apparatus supports a typical function Information (46): information indicating that a terminal apparatus supports SRS transmission on LAA PSCell Information (47): information indicating that a terminal apparatus supports SRS transmission in an uplink partial subframe Information (48): information indicating that a terminal apparatus supports SRS transmission on SCell other than LAA SCell Information (49): information indicating that a terminal apparatus supports SRS transmission on PSCell other than LAA PSCell Information (50): information indicating that a terminal apparatus supports SRS transmission on LAA SCell Note that the synchronous dual connectivity associated with Information (4) may be dual connectivity in which MCG and SCG are synchronous with each other.

Note that the asynchronous dual connectivity associated with Information (5) may be dual connectivity in which MCG and SCG are not synchronous with each other. In other words, the asynchronous dual connectivity may be dual connectivity in which MCG and SCG are asynchronous.

Note that supporting multi Timing Advance/multiple Timing Advance associated with Information (6) may be supporting part or all of a function of performing different transmission timing adjustment (timing advance) between a PCell and an SCell, a function of performing different transmission timing adjustment between a PCell and an LAA SCell, a function of performing different transmission timing adjustment between a PCell and a PSCell, a function of performing different transmission timing adjustment between a PCell and an LAA PSCell, a function of performing different transmission timing adjustment between a first SCell and a second SCell, a function of performing different transmission timing adjustment between an SCell and an LAA SCell, a function of performing different transmission timing adjustment between an SCell and a PSCell, a function of performing different transmission timing adjustment between an SCell and an LAA PSCell, a function of performing different transmission timing adjustment between a first LAA SCell and a second LAA SCell, a function of performing different transmission timing adjustment between an LAA SCell and a PSCell, and a function of performing different transmission timing adjustment between an LAA SCell and an LAA PSCell.

Note that an LAA PSCell may be an LAA SCell having an equivalent function to a PCell in dual connectivity.

Note that supporting simultaneous PUCCH and PUSCH transmission associated with Information (10) may be supporting part or all of a function of performing simultaneous PUCCH and PUSCH transmission in a PCell, a function of performing simultaneous PUCCH and PUSCH transmission in a SCell, a function of performing simultaneous PUCCH and PUSCH transmission in a PSCell, a function of performing simultaneous PUCCH and PUSCH transmission in an LAA SCell, and a function of performing simultaneous PUCCH and PUSCH transmission in an LAA PSCell.

Note that the prescribed resource allocation associated with Information (17) is preferably applied to uplink transmission in an LAA SCell. For example, the prescribed resource allocation associated with Information (17) may be applied to part or all of an uplink shared channel (for example, PUSCH), an uplink control channel (for example, PUCCH), a random access channel (for example, PRACH), and an uplink reference signal (for example, a demodulation reference signal (DMRS) or a sounding reference signal (SRS)) in an LAA SCell.

Note that the prescribed resource allocation associated with Information (24) is preferably applied to uplink transmission in an LAA PSCell. For example, the prescribed resource allocation associated with Information (17) may be applied to part or all of an uplink shared channel (for example, PUSCH), an uplink control channel (for example, PUCCH), a random access channel (for example, PRACH), and an uplink reference signal (for example, a demodulation reference signal (DMRS) or a sounding reference signal (SRS)) in an LAA PSCell.

Note that supporting multi Timing Advance/multiple Timing Advance between LAA SCells (or between an LAA SCell and an LAA PSCell) associated with Information (33) may be supporting a function of performing different transmission timing adjustment between a first LAA SCell and a second LAA SCell and/or a function of performing different transmission timing adjustment between an LAA SCell and an LAA PSCell.

Note that Information (36) may be information indicating that LBT of an arbitrary category is supported in uplink transmission in an LAA SCell or an LAA PSCell.

Note that Information (37) may be information indicating that LBT category 2 is supported in an uplink transmission in an LAA SCell or an LAA PSCell.

Note that Information (38) may be information indicating that LBT category 4 is supported in an uplink transmission in an LAA SCell or an LAA PSCell.

Information (46), Information (47) and Information (50) may be information indicating that SRS transmission is supported in at least one of a subframe that is the same as a downlink partial subframe and/or an UpPTS of a special subframe and/or an uplink subframe and/or an SRS subframe of a corresponding cell (LAA SCell and/or PSCell). Note that the SRS subframe is a subframe that is configured based on a parameter provided by the higher layer and is used for SRS transmission.

Information (48) and Information (49) may be information indicating that SRS transmission is supported in at least one of an UpPTS of a special subframe and/or an uplink subframe and/or an SRS subframe of a corresponding cell (SCell and/or PSCell).

In a case that a PCell and an LAA SCell belong to the same TAG, or in a case that a PSCell and an LAA SCell belong to the same TAG, or in a case that an LAA PSCell and an LAA SCell belong to the same TAG, then a timing for performing uplink LBT for SRS transmission in an LAA SCell where only SRS transmission is supported may be based on a timing to which a value of TA is applied, the value of TA being obtained from the PCell/PSCell/LAA PSCell belonging to the same TAG as the LAA SCell. Note that SRS transmission in an LAA SCell where only SRS transmission is supported may also be based on a timing to which a value of TA is applied, the value of TA being obtained from the PCell/PSCell/LAA PSCell belonging to the same TAG as the LAA SCell.

Note that a terminal capability information message or FGI may include not only information from Information (1)

to Information (50) but also other information. In other words, a terminal capability information message or FGI may include part or all of Information (1) to Information (50) and other information.

Note that, in a case that "information indicating that . . . supports . . . " is transmitted by a terminal apparatus, a function that is associated with "information indicating that . . . supports . . . " may be supported by the terminal apparatus. Note that a function being supported by the terminal apparatus may correspond to the function being mounted on the terminal apparatus, the function being tested and mounted on the terminal apparatus, the function being included in the terminal apparatus, and the like.

Note that, in a case that "information indicating that . . . supports . . . " that is independent for each band is transmitted by a terminal apparatus, a function that is associated with "information indicating that . . . supports . . . " may be supported in the corresponding band.

Note that, in a case that "information indicating that . . . , supports . . . " that is independent for each band is transmitted (defined), a terminal capability information message and/or FGI may further include information indicating a band corresponding to "information indicating that . . . supports . . . ". For example, "information indicating that . . . supports . . . " may be an index (index number) indicating a corresponding band.

Note that, in a case that "information indicating that . . . supports . . . " for multiple bands (in common for multiple bands) is transmitted by a terminal apparatus, a function associated with "information indicating that . . . supports . . . " may be supported in corresponding multiple bands.

Note that, in a case that "information indicating that . . . , supports . . . " for multiple bands (in common for multiple bands) is transmitted (defined), a terminal capability information message and/or FGI may further include information indicating bands corresponding to "information indicating that . . . supports . . . ". For example, "information indicating that . . . supports . . . " may be indices (index numbers) of the corresponding bands. For example, "information indicating that . . . , supports . . . " may be an index (index number) indicating a group of the corresponding bands.

Note that "information indicating that . . . supports . . . " may be rephrased as "information indicating whether or not . . . , supports . . . ", "information indicating that . . . , is supported", or the like.

Furthermore, "information indicating that . . . supports . . . " may be "information indicating that . . . does not support . . . ". "Information indicating that . . . , does not support . . . " may be rephrased as "information indicating that . . . is not supported", or the like. Note that, in a case that "information indicating that . . . does not support . . . " is transmitted by a terminal apparatus, a function that is associated with "information indicating that . . . does not support . . . " may not be supported by the terminal apparatus.

Note that a base station apparatus may perform, with respect to a terminal apparatus, scheduling or configuration of parameters associated with transmission (reporting) and/or reception (measurement) of the uplink and the downlink, taking account of (based on) capability information (or FGI) of the terminal apparatus that the base station apparatus has received and capability/function/performance that the base station apparatus supports.

For example, Information (1) above may be transmitted in a case that part or all of Information (2) to Information (50) are transmitted. In other words, Information (1) above may be transmitted in a case that part or all of Information (1) to Information (50) excluding Information (1) are transmitted. In other words, in a case that part or all of functions associated with Information (2) to Information (50) are supported by a terminal apparatus, a function associated with Information (1) above may be supported by the terminal apparatus.

For example, Information (2) above may be transmitted in a case that part or all of Information (1) and Information (3) to Information (50) are transmitted. In other words, Information (2) above may be transmitted in a case that part or all of Information (1) to Information (50) excluding Information (2) are transmitted. In other words, in a case that part or all of functions associated with Information (1) and Information (3) to Information (50) are supported by a terminal apparatus, a function associated with Information (2) above may be supported by the terminal apparatus.

For example, Information (3) above may be transmitted in a case that part or all of Information (1), Information (2), and Information (4) to Information (50) are transmitted. In other words, Information (3) above may be transmitted in a case that part or all of Information (1) to Information (50) excluding Information (3) are transmitted. In other words, in a case that part or all of functions associated with Information (1), Information (2), and Information (4) to Information (50) are supported by a terminal apparatus, a function associated with Information (3) above may be supported by the terminal apparatus.

For example, Information (4) above may be transmitted in a case that part or all of Information (1) to Information (3) and Information (5) to Information (50) are transmitted. In other words, Information (4) above may be transmitted in a case that part or all of Information (1) to Information (50) excluding Information (4) are transmitted. In other words, in a case that part or all of functions associated with Information (1) to Information (3) and Information (5) to Information (50) are supported by a terminal apparatus, a function associated with Information (4) above may be supported by the terminal apparatus.

For example, Information (5) above may be transmitted in a case that part or all of Information (1) to Information (4) and Information (6) to Information (50) are transmitted. In other words, Information (5) above may be transmitted in a case that part or all of Information (1) to Information (50) excluding Information (5) are transmitted. In other words, in a case that part or all of functions associated with Information (1) to Information (4) and Information (6) to Information (50) are supported by a terminal apparatus, a function associated with Information (5) above may be supported by the terminal apparatus.

For example, Information (6) above may be transmitted in a case that part or all of Information (1) to Information (5) and Information (7) to Information (50) are transmitted. In other words, Information (6) above may be transmitted in a case that part or all of Information (1) to Information (50) excluding Information (6) are transmitted. In other words, in a case that part or all of functions associated with Information (1) to Information (5) and Information (7) to Information (50) are supported by a terminal apparatus, a function associated with Information (6) above may be supported by the terminal apparatus.

For example, Information (7) above may be transmitted in a case that part or all of Information (1) to Information (6) and Information (8) to Information (50) are transmitted. In other words, Information (7) above may be transmitted in a case that part or all of Information (1) to Information (50) excluding Information (7) are transmitted. In other words, in a case that part or all of functions associated with Information (1) to Information (6) and Information (8) to Information (50) are supported by a terminal apparatus, a function associated with Information (7) above may be supported by the terminal apparatus.

For example, Information (8) above may be transmitted in a case that part or all of Information (1) to Information (7) and Information (9) to Information (50) are transmitted. In other words, Information (8) above may be transmitted in a case that part or all of Information (1) to Information (50) excluding Information (8) are transmitted. In other words, in a case that part or all of functions associated with Information (1) to Information (7) and Information (9) to Information (50) are supported by a terminal apparatus, a function associated with Information (8) above may be supported by the terminal apparatus.

For example, Information (9) above may be transmitted in a case that part or all of Information (1) to Information (8) and Information (10) to Information (50) are transmitted. In other words, Information (9) above may be transmitted in a case that part or all of Information (1) to Information (50) excluding Information (9) are transmitted. In other words, in a case that part or all of functions associated with Information (1) to Information (8) and Information (10) to Information (50) are supported by a terminal apparatus, a function associated with Information (9) above may be supported by the terminal apparatus.

For example, Information (10) above may be transmitted in a case that part or all of Information (1) to Information (9) and Information (11) to Information (50) are transmitted. In other words, Information (10) above may be transmitted in a case that part or all of Information (1) to Information (50) excluding Information (10) are transmitted. In other words, in a case that part or all of functions associated with Information (1) to Information (9) and Information (11) to Information (50) are supported by a terminal apparatus, a function associated with Information (10) above may be supported by the terminal apparatus.

For example, Information (11) above may be transmitted in a case that part or all of Information (1) to Information (10) and Information (12) to Information (50) are transmitted. In other words, Information (11) above may be transmitted in a case that part or all of Information (1) to Information (50) excluding Information (11) are transmitted. In other words, in a case that part or all of functions associated with Information (1) to Information (10) and Information (12) to Information (50) are supported by a terminal apparatus, a function associated with Information (11) above may be supported by the terminal apparatus.

For example, Information (12) above may be transmitted in a case that part or all of Information (1) to Information (11) and Information (13) to Information (50) are transmitted. In other words, Information (12) above may be transmitted in a case that part or all of Information (1) to Information (50) excluding Information (12) are transmitted. In other words, in a case that part or all of functions associated with Information (1) to Information (11) and Information (13) to Information (50) are supported by a terminal apparatus, a function associated with Information (12) above may be supported by the terminal apparatus.

For example, Information (13) above may be transmitted in a case that part or all of Information (1) to Information (12) and Information (14) to Information (50) are transmitted. In other words, Information (13) above may be transmitted in a case that part or all of Information (1) to Information (50) excluding Information (13) are transmitted. In other words, in a case that part or all of functions associated with Information (1) to Information (12) and Information (14) to Information (50) are supported by a terminal apparatus, a function associated with Information (13) above may be supported by the terminal apparatus.

For example, Information (14) above may be transmitted in a case that part or all of Information (1) to Information (13) and Information (15) to Information (50) are transmitted. In other words, Information (14) above may be transmitted in a case that part or all of Information (1) to Information (50) excluding Information (14) are transmitted. In other words, in a case that part or all of functions associated with Information (1) to Information (13) and Information (15) to Information (50) are supported by a terminal apparatus, a function associated with Information (14) above may be supported by the terminal apparatus.

For example, Information (15) above may be transmitted in a case that part or all of Information (1) to Information (14) and Information (16) to Information (50) are transmitted. In other words, Information (15) above may be transmitted in a case that part or all of Information (1) to Information (50) excluding Information (15) are transmitted. In other words, in a case that part or all of functions associated with Information (1) to Information (14) and Information (16) to Information (50) are supported by a terminal apparatus, a function associated with Information (15) above may be supported by the terminal apparatus.

For example, Information (16) above may be transmitted in a case that part or all of Information (1) to Information (15) and Information (17) to Information (50) are transmitted. In other words, Information (16) above may be transmitted in a case that part or all of Information (1) to Information (50) excluding Information (16) are transmitted. In other words, in a case that part or all of functions associated with Information (1) to Information (15) and Information (17) to Information (50) are supported by a terminal apparatus, a function associated with Information (16) above may be supported by the terminal apparatus.

For example, Information (17) above may be transmitted in a case that part or all of Information (1) to Information (16) and Information (18) to Information (50) are transmitted. In other words, Information (17) above may be transmitted in a case that part or all of Information (1) to Information (50) excluding Information (17) are transmitted. In other words, in a case that part or all of functions associated with Information (1) to Information (16) and Information (18) to Information (50) are supported by a terminal apparatus, a function associated with Information (17) above may be supported by the terminal apparatus.

For example, Information (18) above may be transmitted in a case that part or all of Information (1) to Information (17) and Information (19) to Information (50) are transmitted. In other words, Information (18) above may be transmitted in a case that part or all of Information (1) to Information (50) excluding Information (18) are transmitted. In other words, in a case that part or all of functions associated with Information (1) to Information (17) and Information (19) to Information (50) are supported by a terminal apparatus, a function associated with Information (18) above may be supported by the terminal apparatus.

For example, Information (19) above may be transmitted in a case that part or all of Information (1) to Information (18) and Information (20) to Information (50) are transmitted. In other words, Information (19) above may be transmitted in a case that part or all of Information (1) to Information (50) excluding Information (19) are transmitted. In other words, in a case that part or all of functions associated with Information (1) to Information (18) and Information (20) to Information (50) are supported by a terminal apparatus, a function associated with Information (19) above may be supported by the terminal apparatus.

For example, Information (20) above may be transmitted in a case that part or all of Information (1) to Information (19) and Information (21) to Information (50) are transmitted. In other words, Information (20) above may be transmitted in a case that part or all of Information (1) to Information (50) excluding Information (20) are transmitted. In other words, in a case that part or all of functions associated with Information (1) to Information (19) and Information (21) to Information (50) are supported by a terminal apparatus, a function associated with Information (20) above may be supported by the terminal apparatus.

For example, Information (21) above may be transmitted in a case that part or all of Information (1) to Information (20) and Information (22) to Information (50) are transmitted. In other words, Information (21) above may be transmitted in a case that part or all of Information (1) to Information (50) excluding Information (21) are transmitted. In other words, in a case that part or all of functions associated with Information (1) to Information (20) and Information (22) to Information (50) are supported by a terminal apparatus, a function associated with Information (21) above may be supported by the terminal apparatus.

For example, Information (22) above may be transmitted in a case that part or all of Information (1) to Information (21) and Information (23) to Information (50) are transmitted. In other words, Information (22) above may be transmitted in a case that part or all of Information (1) to Information (50) excluding Information (22) are transmitted. In other words, in a case that part or all of functions associated with Information (1) to Information (21) and Information (23) to Information (50) are supported by a terminal apparatus, a function associated with Information (22) above may be supported by the terminal apparatus.

For example, Information (23) above may be transmitted in a case that part or all of Information (1) to Information (22) and Information (24) to Information (50) are transmitted. In other words, Information (23) above may be transmitted in a case that part or all of Information (1) to Information (50) excluding Information (23) are transmitted. In other words, in a case that part or all of functions associated with Information (1) to Information (22) and Information (24) to Information (50) are supported by a terminal apparatus, a function associated with Information (23) above may be supported by the terminal apparatus.

For example, Information (24) above may be transmitted in a case that part or all of Information (1) to Information (23) and Information (25) to Information (50) are transmitted. In other words, Information (24) above may be transmitted in a case that part or all of Information (1) to Information (50) excluding Information (24) are transmitted. In other words, in a case that part or all of functions associated with Information (1) to Information (23) and Information (25) to Information (50) are supported by a terminal apparatus, a function associated with Information (24) above may be supported by the terminal apparatus.

For example, Information (25) above may be transmitted in a case that part or all of Information (1) to Information (24) and Information (26) to Information (50) are transmitted. In other words, Information (25) above may be transmitted in a case that part or all of Information (1) to Information (50) excluding Information (25) are transmitted. In other words, in a case that part or all of functions associated with Information (1) to Information (24) and Information (26) to Information (50) are supported by a terminal apparatus, a function associated with Information (25) above may be supported by the terminal apparatus.

For example, Information (26) above may be transmitted in a case that part or all of Information (1) to Information (25) and Information (27) to Information (50) are transmitted. In other words, Information (26) above may be transmitted in a case that part or all of Information (1) to Information (50) excluding Information (26) are transmitted. In other words, in a case that part or all of functions associated with Information (1) to Information (25) and Information (27) to Information (50) are supported by a terminal apparatus, a function associated with Information (26) above may be supported by the terminal apparatus.

For example, Information (27) above may be transmitted in a case that part or all of Information (1) to Information (26) and Information (28) to Information (50) are transmitted. In other words, Information (27) above may be transmitted in a case that part or all of Information (1) to Information (50) excluding Information (27) are transmitted. In other words, in a case that part or all of functions associated with Information (1) to Information (26) and Information (28) to Information (50) are supported by a terminal apparatus, a function associated with Information (27) above may be supported by the terminal apparatus.

For example, Information (28) above may be transmitted in a case that part or all of Information (1) to Information (27) and Information (29) to Information (50) are transmitted. In other words, Information (28) above may be transmitted in a case that part or all of Information (1) to Information (50) excluding Information (28) are transmitted. In other words, in a case that part or all of functions associated with Information (1) to Information (27) and Information (29) to Information (50) are supported by a terminal apparatus, a function associated with Information (28) above may be supported by the terminal apparatus.

For example, Information (29) above may be transmitted in a case that part or all of Information (1) to Information (28) and Information (30) to Information (50) are transmitted. In other words, Information (29) above may be transmitted in a case that part or all of Information (1) to Information (50) excluding Information (29) are transmitted. In other words, in a case that part or all of functions associated with Information (1) to Information (28) and Information (30) to Information (50) are supported by a terminal apparatus, a function associated with Information (29) above may be supported by the terminal apparatus.

For example, Information (30) above may be transmitted in a case that part or all of Information (1) to Information (29) and Information (31) to Information (50) are transmitted. In other words, Information (30) above may be transmitted in a case that part or all of Information (1) to Information (50) excluding Information (30) are transmitted. In other words, in a case that part or all of functions associated with Information (1) to Information (29) and Information (31) to Information (50) are supported by a terminal apparatus, a function associated with Information (30) above may be supported by the terminal apparatus.

For example, Information (31) above may be transmitted in a case that part or all of Information (1) to Information (30) and Information (32) to Information (50) are transmitted. In other words, Information (31) above may be transmitted in a case that part or all of Information (1) to Information (50) excluding Information (31) are transmitted. In other words, in a case that part or all of functions associated with Information (1) to Information (30) and Information (32) to Information (50) are supported by a terminal apparatus, a function associated with Information (31) above may be supported by the terminal apparatus.

For example, Information (32) above may be transmitted in a case that part or all of Information (1) to Information (31) and Information (33) to Information (50) are transmitted. In other words, Information (32) above may be transmitted in a case that part or all of Information (1) to Information (50) excluding Information (32) are transmitted. In other words, in a case that part or all of functions associated with Information (1) to Information (31) and Information (33) to Information (50) are supported by a terminal apparatus, a function associated with Information (32) above may be supported by the terminal apparatus.

For example, Information (33) above may be transmitted in a case that part or all of Information (1) to Information (32) and Information (34) to Information (50) are transmitted. In other words, Information (33) above may be transmitted in a case that part or all of Information (1) to Information (50) excluding Information (33) are transmitted. In other words, in a case that part or all of functions associated with Information (1) to Information (32) and Information (34) to Information (50) are supported by a terminal apparatus, a function associated with Information (33) above may be supported by the terminal apparatus.

For example, Information (34) above may be transmitted in a case that part or all of Information (1) to Information (33) and Information (35) to Information (50) are transmitted. In other words, Information (34) above may be transmitted in a case that part or all of Information (1) to Information (50) excluding Information (34) are transmitted. In other words, in a case that part or all of functions associated with Information (1) to Information (33) and Information (35) to Information (50) are supported by a terminal apparatus, a function associated with Information (34) above may be supported by the terminal apparatus.

For example, Information (35) above may be transmitted in a case that part or all of Information (1) to Information (34) and Information (36) to Information (50) are transmitted. In other words, Information (35) above may be transmitted in a case that part or all of Information (1) to Information (50) excluding Information (35) are transmitted. In other words, in a case that part or all of functions associated with Information (1) to Information (34) and Information (36) to Information (50) are supported by a terminal apparatus, a function associated with Information (35) above may be supported by the terminal apparatus.

For example, Information (36) above may be transmitted in a case that part or all of Information (1) to Information (35) and Information (37) to Information (50) are transmitted. In other words, Information (36) above may be transmitted in a case that part or all of Information (1) to Information (50) excluding Information (36) are transmitted. In other words, in a case that part or all of functions associated with Information (1) to Information (35) and Information (37) to Information (50) are supported by a terminal apparatus, a function associated with Information (36) above may be supported by the terminal apparatus.

For example, Information (37) above may be transmitted in a case that part or all of Information (1) to Information (36) and Information (38) to Information (50) are transmitted. In other words, Information (37) above may be transmitted in a case that part or all of Information (1) to Information (50) excluding Information (37) are transmitted. In other words, in a case that part or all of functions associated with Information (1) to Information (36) and Information (38) to Information (50) are supported by a terminal apparatus, a function associated with Information (37) above may be supported by the terminal apparatus.

For example, Information (38) above may be transmitted in a case that part or all of Information (1) to Information (37) and Information (39) to Information (50) are transmitted. In other words, Information (38) above may be transmitted in a case that part or all of Information (1) to Information (50) excluding Information (38) are transmitted. In other words, in a case that part or all of functions associated with Information (1) to Information (37) and Information (39) to Information (50) are supported by a terminal apparatus, a function associated with Information (38) above may be supported by the terminal apparatus.

For example, Information (39) above may be transmitted in a case that part or all of Information (1) to Information (38) and Information (40) to Information (50) are transmitted. In other words, Information (39) above may be transmitted in a case that part or all of Information (1) to Information (50) excluding Information (39) are transmitted. In other words, in a case that part or all of functions associated with Information (1) to Information (38) and Information (40) to Information (50) are supported by a terminal apparatus, a function associated with Information (39) above may be supported by the terminal apparatus.

For example, Information (40) above may be transmitted in a case that part or all of Information (1) to Information (39) and Information (41) to Information (50) are transmitted. In other words, Information (40) above may be transmitted in a case that part or all of Information (1) to Information (50) excluding Information (40) are transmitted. In other words, in a case that part or all of functions associated with Information (1) to Information (39) and Information (41) to Information (50) are supported by a terminal apparatus, a function associated with Information (40) above may be supported by the terminal apparatus.

For example, Information (41) above may be transmitted in a case that part or all of Information (1) to Information (40) and Information (42) to Information (50) are transmitted. In other words, Information (41) above may be transmitted in a case that part or all of Information (1) to Information (50) excluding Information (41) are transmitted. In other words, in a case that part or all of functions associated with Information (1) to Information (40) and Information (42) to Information (50) are supported by a terminal apparatus, a function associated with Information (41) above may be supported by the terminal apparatus.

For example, Information (42) above may be transmitted in a case that part or all of Information (1) to Information (41) and Information (43) to Information (50) are transmitted. In other words, Information (42) above may be transmitted in a case that part or all of Information (1) to Information (50) excluding Information (42) are transmitted. In other words, in a case that part or all of functions associated with Information (1) to Information (41) and Information (43) to Information (50) are supported by a terminal apparatus, a function associated with Information (42) above may be supported by the terminal apparatus.

For example, Information (43) above may be transmitted in a case that part or all of Information (1) to Information (42) and Information (44) to Information (50) are transmitted. In other words, Information (43) above may be transmitted in a case that part or all of Information (1) to Information (50) excluding Information (43) are transmitted. In other words, in a case that part or all of functions associated with Information (1) to Information (42) and Information (44) to Information (50) are supported by a terminal apparatus, a function associated with Information (43) above may be supported by the terminal apparatus.

For example, Information (44) above may be transmitted in a case that part or all of Information (1) to Information (43) and Information (43) to Information (50) are transmitted. In other words, Information (44) above may be transmitted in a case that part or all of Information (1) to Information (50) excluding Information (44) are transmitted. In other words, in a case that part or all of functions associated with Information (1) to Information (43) and Information (43) to Information (50) are supported by a terminal apparatus, a function associated with Information (44) above may be supported by the terminal apparatus.

For example, Information (45) above may be transmitted in a case that part or all of Information (1) to Information (44) and Information (46) to Information (50) are transmitted. In other words, Information (45) above may be transmitted in a case that part or all of Information (1) to Information (50) excluding Information (45) are transmitted. In other words, in a case that part or all of functions associated with Information (1) to Information (44) and Information (46) to Information (50) are supported by a terminal apparatus, a function associated with Information (45) above may be supported by the terminal apparatus.

For example, Information (46) above may be transmitted in a case that part or all of Information (1) to Information (45) and Information (47) to Information (50) are transmitted. In other words, Information (46) above may be transmitted in a case that part or all of Information (1) to Information (50) excluding Information (46) are transmitted. In other words, in a case that part or all of functions associated with Information (1) to Information (45) and Information (47) to Information (50) are supported by a terminal apparatus, a function associated with Information (46) above may be supported by the terminal apparatus.

For example, Information (47) above may be transmitted in a case that part or all of Information (1) to Information (46) and Information (48) to Information (50) are transmitted. In other words, Information (47) above may be transmitted in a case that part or all of Information (1) to Information (50) excluding Information (47) are transmitted. In other words, in a case that part or all of functions associated with Information (1) to Information (46) and Information (48) to Information (50) are supported by a terminal apparatus, a function associated with Information (47) above may be supported by the terminal apparatus.

For example, Information (48) above may be transmitted in a case that part or all of Information (1) to Information (47), Information (49), and Information (50) are transmitted. In other words, Information (48) above may be transmitted in a case that part or all of Information (1) to Information (50) excluding Information (48) are transmitted. In other words, in a case that part or all of functions associated with Information (1) to Information (47), Information (49), and Information (50) are supported by a terminal apparatus, a function associated with Information (48) above may be supported by the terminal apparatus.

For example, Information (49) above may be transmitted in a case that part or all of Information (1) to Information (48) and Information (50) are transmitted. In other words, Information (49) above may be transmitted in a case that part or all of Information (1) to Information (50) excluding Information (49) are transmitted. In other words, in a case that part or all of functions associated with Information (1) to Information (48) and Information (50) are supported by a terminal apparatus, a function associated with Information (49) above may be supported by the terminal apparatus.

For example, Information (50) above may be transmitted in a case that part or all of Information (1) to Information (49) are transmitted. In other words, Information (50) above may be transmitted in a case that part or all of Information (1) to Information (50) excluding Information (50) are transmitted. In other words, in a case that part or all of functions associated with Information (1) to Information (49) are supported by a terminal apparatus, a function associated with Information (50) above may be supported by the terminal apparatus.

Part of the content described in the present embodiment is rephrased as follows.

The terminal apparatus according to the present embodiment includes a reception unit configured to receive a message of terminal capability enquiry and a transmission unit configured to transmit terminal capability information in a case that the message has been received, and in a case that the terminal capability information includes information indicating that uplink LAA is supported, the terminal capability information further includes information indicating whether prescribed resource allocation in an LAA SCell is supported.

In a case that the terminal capability information does not include the information indicating that uplink LAA is supported, the terminal capability information does not include the information indicating whether prescribed resource allocation in an LAA SCell is supported.

The prescribed resource allocation may prescribed be resource allocation in the uplink.

The prescribed resource allocation may be interlaced uplink resource block allocation in a frequency domain.

The terminal apparatus according to the present embodiment includes a reception unit configured to receive a message of terminal capability enquiry and a transmission unit configured to transmit terminal capability information in a case that the message has been received, and in a case that the terminal capability information includes information indicating that uplink LAA is supported, the terminal capability information further includes information indicating that LBT of a prescribed category is supported in uplink transmission.

The LBT of a prescribed category is LBT category 2 or LBT category 4.

LBT category 2 is LBT allowing a signal to be transmitted after a CCA check is performed once, and LBT category 4 is LBT allowing a signal to be transmitted after a CCA check is performed a prescribed number of times.

The base station apparatus according to the present embodiment includes a transmission unit configured to transmit a message of terminal capability enquiry and a reception unit configured to receive terminal capability information in a case that the message has been transmitted, and in a case that the terminal capability information includes information indicating that uplink LAA is supported, the terminal capability information further includes information indicating whether prescribed resource allocation in an LAA SCell is supported.

In a case that the terminal capability information does not include the information indicating that uplink LAA is supported, the terminal capability information does not include the information indicating whether prescribed resource allocation in an LAA SCell is supported.

The prescribed resource allocation may be prescribed resource allocation in the uplink.

The prescribed resource allocation may be interlaced uplink resource block allocation in a frequency domain.

The base station apparatus according to the present embodiment includes a transmission unit configured to transmit a message of terminal capability enquiry and a reception unit configured to receive terminal capability information in a case that the message has been transmitted, and in a case that the terminal capability information includes information indicating that uplink LAA is supported, the terminal capability information further includes information indicating that LBT of a prescribed category is supported in uplink transmission.

The LBT of a prescribed category is LBT category 2 or LBT category 4.

LBT category 2 is LBT allowing a signal to be transmitted after a CCA check is performed once, and LBT category 4 is LBT allowing a signal to be transmitted after a CCA check is performed a prescribed number of times.

Note that the uplink LBT according to the present embodiment may similarly be applied to sidelink LBT for a sidelink transmission. The sidelink transmission is used for device to device communication (D2D) between the terminal apparatuses.

Note that, in a case that one or more configurations (LAA-Config) which are necessary for LAA communication for prescribed serving cell are configured to the terminal apparatus 1, the prescribed serving cell may be regarded as the LAA cell. The configurations which are necessary for the LAA communication are, for example, a parameter associated with a reservation signal, a parameter associated with RSSI measurement and a parameter associated with the second DS configuration.

Moreover, although the description has been given in each of the above-described embodiments by using the terms "primary cell" and "PS cell", these terms may not be necessarily used. For example, "primary cell" in each of the above-described embodiments may be referred to as "master cell", and "PS cell" in each of the above-described embodiments may be referred to as "primary cell".

A program running on each of the base station apparatus 2 and the terminal apparatus 1 according to the present invention may be a program (a program for causing a computer to operate) that controls a Central Processing Unit (CPU) and the like in such a manner as to realize the functions according to the above-described embodiments of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Moreover, the terminal apparatus 1 and the base station apparatus 2-1 or the base station apparatus 2-2 according to the above-described embodiments may be partially realized by the computer. In this case, this configuration may be realized by recording a program for realizing such control functions on a computer-readable recording medium and causing a computer system to read the program recorded on the recording medium for execution.

Moreover, the "computer system" here is defined as a computer system built into the terminal apparatus 1 or the base station apparatus 2-1 or the base station apparatus 2-2, and the computer system includes an OS and hardware components such as peripheral devices. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station apparatus 2-1 or base station apparatus 2-2 according to the above-described embodiments can be realized as an aggregation (a device group) constituted of a plurality of devices. Devices constituting the device group may be each equipped with some or all portions of each function or each functional block of the base station apparatus 2-1 or base station apparatus 2-2 according to the above-described embodiments. It is only required that the device group itself include general functions or general functional blocks of the base station apparatus 2-1 or base station apparatus 2-2. Furthermore, the terminal apparatus 1 according to the above-described embodiments can also communicate with the base station apparatus as the aggregation.

Furthermore, the base station apparatus 2-1 or base station apparatus 2-2 according to the above-described embodiments may be an Evolved Universal Terrestrial Radio Access Network (E-UTRAN). Furthermore, the base station apparatus 2-1 or base station apparatus 2-2 according to the above-described embodiments may have some or all portions of a function of a higher node for an eNodeB.

Furthermore, some or all portions of each of the terminal apparatus 1 and the base station apparatus 2-1 or base station apparatus 2-2 according to the above-described embodiments may be typically achieved as a Large-Scale Integration (LSI) that is an integrated circuit or may be realized as a chip set. The functional blocks of each of the terminal apparatus 1 and the base station apparatus 2-1 or base station apparatus 2-2 may be individually realized as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiments, the cellular mobile station device is described as one example of a terminal apparatus or a communication device, but the present invention is not limited to this, and can be applied to a fixed-type electronic apparatus installed indoors or outdoors, or a stationary-type electronic apparatus, for example, a terminal apparatus or a communication device, such as an Audio-Video (AV) apparatus, a kitchen apparatus, a cleaning or washing machine, an air-conditioning apparatus, office equipment, a vending machine, a robot, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

REFERENCE SIGNS LIST

301 Higher layer
302 Control unit
303 Codeword generation unit
304 Downlink subframe generation unit
305 Downlink reference signal generation unit
306 OFDM signal transmission unit
307 Transmit antenna
308 Receive antenna
309 SC-FDMA signal reception unit
310 Uplink subframe processing unit
311 Uplink control information extraction unit
401 Receive antenna
402 OFDM signal reception unit
403 Downlink subframe processing unit
404 Downlink reference signal extraction unit
405 Transport block extraction unit
406 Control unit
407 Higher layer
408 Channel state measurement unit
409 Uplink subframe generation unit
410 Uplink control information generation unit
411 SC-FDMA signal transmission unit
412 Transmit antenna

The invention claimed is:

1. A terminal apparatus comprising:
reception circuitry configured to receive a message of terminal capability enquiry; and
transmission circuitry configured to transmit terminal capability information in a case that the message has been received, wherein
in a case that the terminal capability information includes first information indicating that uplink Licensed Assisted Access (LAA) is supported,
the transmission circuitry is configured to
in a cell that is other than an LAA secondary cell, transmit a first Physical Uplink Shared Channel (PUSCH) of a first resource allocation type or a second resource allocation type, and
in the LAA secondary cell, transmit a second PUSCH of a third resource allocation type.

2. The terminal apparatus according to claim 1, wherein
a first DCI format used for scheduling the first PUSCH includes a resource allocation type field indicating a resource allocation type of the PUSCH,
a second DCI format used for scheduling the second PUSCH does not include the resource allocation type field, and
resource allocation information for the third resource allocation type indicates a resource block set.

3. The terminal apparatus according to claim 1, wherein the transmission circuitry is configured to
before transmitting the second PUSCH, evaluate whether a channel used for transmitting the second PUSCH is idle, and when the channel is determined as being idle, transmit the second PUSCH.

4. The terminal apparatus according to claim 1, wherein
in a case that the terminal capability information further includes second information indicating that cross carrier scheduling is supported for the uplink LAA, and a configuration relating to the cross carrier scheduling is configured via higher layer signaling for the uplink LAA,
the reception circuitry is configured to
detect the second DCI format in the cell that is other than the LAA secondary cell.

5. A base station apparatus comprising:
transmission circuitry configured to transmit a message of terminal capability enquiry; and
reception circuitry configured to receive terminal capability information in a case that the message has been transmitted, wherein
in a case that the terminal capability information includes first information indicating that uplink Licensed Assisted Access (LAA) is supported,
the transmission circuitry is configured to
for a cell that is other than an LAA secondary cell, transmit a first Downlink Control Channel (DCI) format used for scheduling a first Physical Uplink Shared Channel (PUSCH) of a first resource allocation type or a second resource allocation type, and
for the LAA secondary cell, transmit a second DCI format used for scheduling a second PUSCH of a third resource allocation type.

6. The base station apparatus according to claim 5, wherein
the transmission circuitry is configured to
include, in the first DCI format used for scheduling the first PUSCH, a resource allocation type field indicating a resource allocation type of the PUSCH, and transmit the first DCI format, and
transmit the second DCI format used for scheduling the second PUSCH without
including the resource allocation type field in the second DCI format, and
resource allocation information for the third resource allocation type indicates a resource block set.

* * * * *